(12) United States Patent
Groves et al.

(10) Patent No.: US 12,485,197 B2
(45) Date of Patent: Dec. 2, 2025

(54) SYSTEMS, DEVICES, AND METHODS FOR ASSESSING GERMICIDAL RISKS FOR ENVIRONMENTS AND GENERATING ENVIRONMENTAL PROTECTION PLANS FOR SANITIZING THE ENVIRONMENTS

(71) Applicant: Population Lights, Inc., San Francisco, CA (US)

(72) Inventors: Megan Groves, San Francisco, CA (US); Curtis Barbre, San Francisco, CA (US); Omer Rosenbaum, San Francisco, CA (US)

(73) Assignee: Population Lights, Inc., San Francisco, CA (US)

( * ) Notice: Subject to any disclaimer, the term of this patent is extended or adjusted under 35 U.S.C. 154(b) by 0 days.

(21) Appl. No.: 18/426,305

(22) Filed: Jan. 29, 2024

(65) Prior Publication Data

US 2024/0165287 A1 May 23, 2024

Related U.S. Application Data

(63) Continuation of application No. PCT/US2023/011289, filed on Jan. 20, 2023.
(Continued)

(51) Int. Cl.
*A61L 2/24* (2006.01)
*A61L 2/10* (2006.01)

(52) U.S. Cl.
CPC ........ *A61L 2/24* (2013.01); *A61L 2/10* (2013.01); *A61L 2202/11* (2013.01); *A61L 2202/14* (2013.01)

(58) Field of Classification Search
None
See application file for complete search history.

(56) References Cited

U.S. PATENT DOCUMENTS 9,833,526 B2  12/2017  Agafonov et al.
10,071,262 B2  9/2018  Randers-Pehrson et al.
(Continued)

FOREIGN PATENT DOCUMENTS

JP    2006214762 A  *  8/2006

OTHER PUBLICATIONS

Population Lights, Inc., PCT/US2021/053664, International Search Report and Written Opinion, ISA/US, Nov. 3, 2021, 11 pp.
(Continued)

*Primary Examiner* — Andrew Smyth
(74) *Attorney, Agent, or Firm* — Resonance IP Law, PC

(57) ABSTRACT

Systems, methods, and devices for the generation and execution of an environmental protection plan may be deployed to aid with a reduction of, for example, air-borne and/or surface pathogens within an environment. The environmental protection plan may use one or more sanitizing devices to emit sanitizing radiation (e.g., far UVC light) into the environment to kill or otherwise neutralize pathogens such as viruses and bacteria within the environment. At times, the environmental protection plan may be responsive to one or more aspects (size, objects contained therein) of the environment, a use for the environment, a modeled and/or actual pathogen load within the environment, desired levels of pathogen reduction within the environment, and/or human and/or animal safety limits for the sanitizing radiation.

8 Claims, 35 Drawing Sheets

Related U.S. Application Data

(60) Provisional application No. 63/425,295, filed on Nov. 14, 2022, provisional application No. 63/314,950, filed on Feb. 28, 2022, provisional application No. 63/301,485, filed on Jan. 20, 2022.

(56) References Cited

U.S. PATENT DOCUMENTS

| | | |
|---|---|---|
| 10,195,300 B2 | 2/2019 | Lloyd |
| 10,369,379 B2 | 8/2019 | Randers-Pehrson et al. |
| 10,688,211 B2 | 6/2020 | Barber, III |
| 10,780,189 B2 | 9/2020 | Randers-Pehrson et al. |
| 10,960,091 B2 | 3/2021 | Dijkstra et al. |
| 10,994,153 B2 | 5/2021 | Randers-Pehrson et al. |
| 11,007,291 B2 | 5/2021 | Randers-Pehrson et al. |
| 11,007,380 B2 | 5/2021 | Randers-Pehrson et al. |
| 11,013,934 B2 | 5/2021 | Randers-Pehrson et al. |
| 11,167,051 B2 | 11/2021 | Randers-Pehrson et al. |
| 2014/0022968 A1 | 1/2014 | Apte et al. |
| 2018/0193499 A1* | 7/2018 | Lu .................... A61L 2/10 |
| 2019/0209722 A1 | 7/2019 | Stibich et al. |
| 2020/0246632 A1 | 8/2020 | Naito |
| 2020/0254122 A1 | 8/2020 | Starkweather et al. |
| 2020/0306397 A1 | 10/2020 | Randers-Pehrson et al. |
| 2020/0397936 A1 | 12/2020 | Deros et al. |
| 2021/0010701 A1* | 1/2021 | Nesler ................ F24F 3/14 |
| 2021/0187319 A1 | 6/2021 | Randers-Pehrson et al. |
| 2021/0236672 A1 | 8/2021 | Randers-Pehrson et al. |
| 2021/0236846 A1 | 8/2021 | Randers-Pehrson et al. |
| 2021/0252305 A1 | 8/2021 | Randers-Pehrson et al. |
| 2021/0268309 A1 | 9/2021 | Randers-Pehrson et al. |
| 2021/0268310 A1 | 9/2021 | Randers-Pehrson et al. |
| 2021/0339045 A1 | 11/2021 | Randers-Pehrson et al. |
| 2022/0008602 A1* | 1/2022 | Sood .................... A61L 9/20 |

OTHER PUBLICATIONS

Population Lights, Inc.. International Application No. PCT/US2023/011289 filed Jan. 20, 2023; International Search Report and Written Opinion; ISA/US; Jul. 21, 2023; 18 pp.

* cited by examiner

1502

1701A
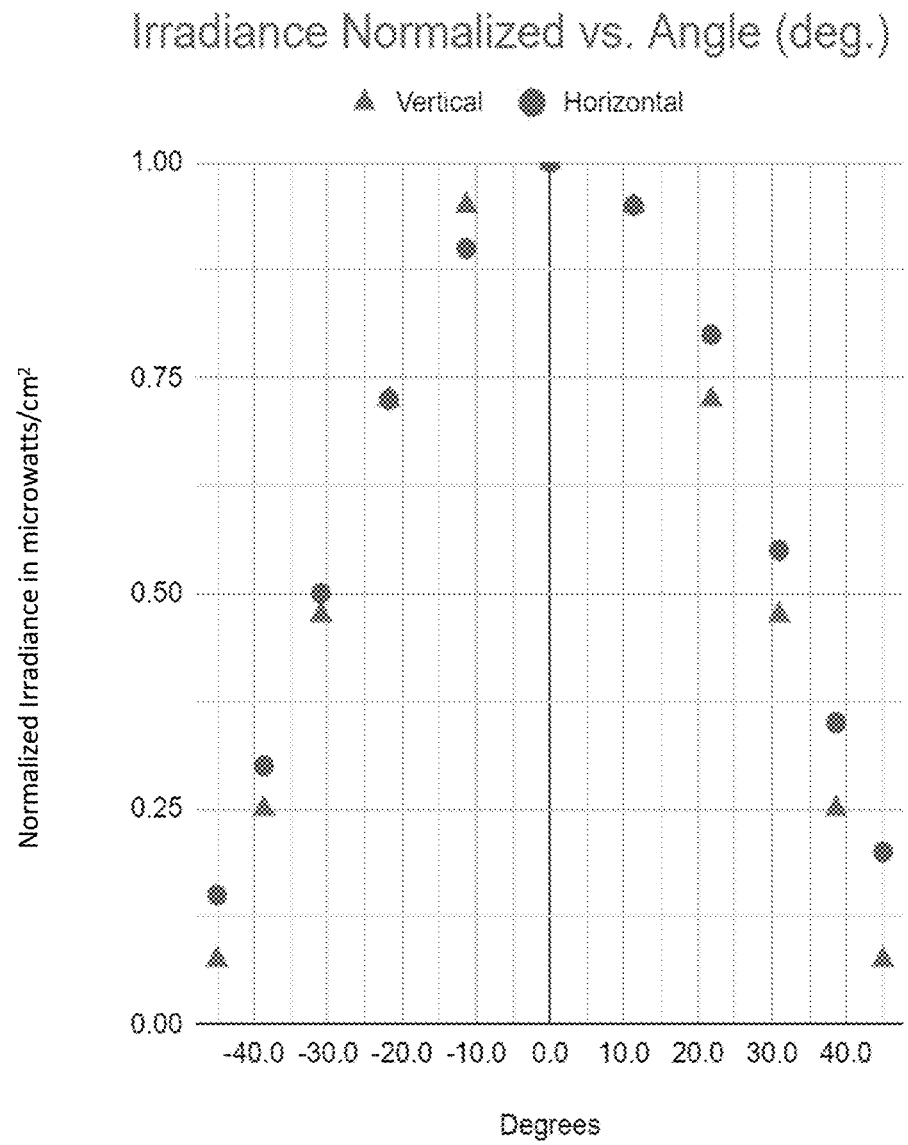
FIG. 17A1

1701B
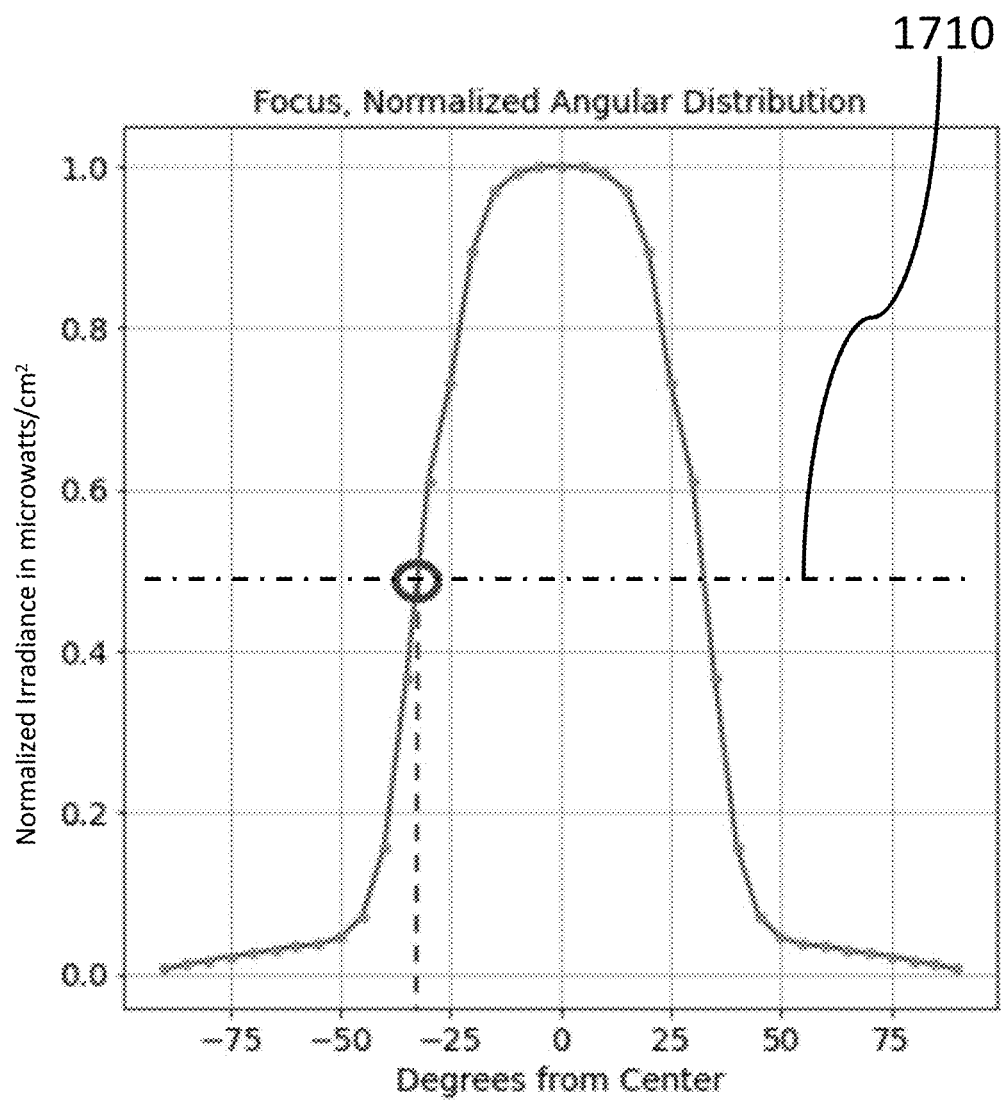
FIG. 17A2

SYSTEMS, DEVICES, AND METHODS FOR ASSESSING GERMICIDAL RISKS FOR ENVIRONMENTS AND GENERATING ENVIRONMENTAL PROTECTION PLANS FOR SANITIZING THE ENVIRONMENTS

RELATED APPLICATIONS

This application is a CONTINUATION of International Application Number PCT/US2023/011289 filed 20 Jan. 2023, which is an INTERNATIONAL (PCT) application that claims priority to U.S. Provisional Patent Application No. 63/301,485 filed on 20 Jan. 2022 and entitled "COMMUNICATIVELY COUPLED SANITIZING DEVICES, SANITIZING SYSTEMS, AND METHODS OF USE THEREOF," and claims priority to U.S. Provisional Patent Application No. 63/314,950 filed on 28 Feb. 2022 and entitled "ENVIRONMENTAL PROTECTION PLANS FOR SANITIZING ENVIRONMENTS," and U.S. Provisional Patent Application No. 63/425,295 filed on 14 Nov. 2022 and entitled "SYSTEMS, DEVICES, AND METHODS FOR ASSESSING GERMICIDAL RISKS FOR ENVIRONMENTS AND GENERATING ENVIRONMENTAL PROTECTION PLANS FOR SANITIZING THE ENVIRONMENTS," all of which are hereby incorporated by reference herein.

FIELD

The present invention is directed to systems, devices, and methods assessing germicidal risks and/or pathogen loads for environments and generating environmental protection plans for sanitizing and/or reducing the pathogen load within the environments.

BACKGROUND

Ultraviolet light has been used in certain industrial and medical settings to destroy pathogens (e.g., bacteria and viruses) and sanitize surfaces and objects. However, a drawback with these technologies is that the wavelengths of most ultraviolet light used cause harm to humans and animals, particularly to their eyes and skin. This safety concern makes wide-scale adoption of this sanitization method difficult.

Ultraviolet light within the far UV-C range (e.g., 180-228 nm) has been shown to be safe for human exposure up to limits designated by, for example, by the American Conference of Governmental Industrial Hygienists (ACGIH) and can therefore be deployed in occupied spaces including offices, food preparation areas and public transport to kill germs within these environments without harming human tissue.

SUMMARY

Sanitizing devices disclosed herein may include a power source, a sanitizing light source, a control system, and a housing. The power source may be electrically coupled to the to the sanitizing light source, and the control system and configured to provide electrical power thereto via, for example, a battery, which may be rechargeable or otherwise. Additionally, or alternatively, power source may be coupled to a power cord configured to couple to an electrical main. On some occasions, power source may couple to an electrical main via a port configured for acceptance of a power cord therein.

The sanitizing light source may be configured to emit sanitizing light into an environment through an aperture in a housing that houses the sanitizing light source, the control system, and the power source responsively to an instruction from the control system. The sanitizing light may have a wavelength within the range of, for example, 200-240 nm, 210-280 nm and/or 390-420 nm.

In some embodiments, the sanitizing light source may be configured to emit the sanitizing light toward one or more reflectors or sensors arranged within the environment so that, for example, operation of the sanitizing device may be optimized and/or light emitted by sanitizing light source may be directed to one or more desired locations within the environment.

The control system may be communicatively coupled to the sanitizing light source and configured to control an intensity of the sanitizing light emitted by the sanitizing light source and/or trigger an operation of the sanitizing light source.

The housing may be configured to house the power source, the sanitizing light source, and the control system and may include at least one aperture through which sanitizing light emitted by the sanitizing light source may exit the housing into the environment.

In some embodiments, the sanitizing device may include a filter configured to filter sanitizing light emitted by the sanitizing light prior to the sanitizing light exiting via the aperture so that the sanitizing light exiting the housing has a particular set of wavelengths and removing other wavelengths, in the range of 200-240 nm, 210-280 nm and/or 390-420 nm.

On some occasions, the sanitizing device may include a sensor that may be configured to monitor a feature of the environment and communicate a result of the monitoring to, for example, the control system and/or an external device such as a server or computer. In some instances, an intensity of the sanitizing light emitted by the sanitizing light source is responsive to receipt of a result of the monitoring performed by the sensor.

In some embodiments, the sanitizing device may further comprise a transceiver configured to communicate information from the control system regarding an operation of the sanitizing device to an external computing device. The transceiver may also be configured to receive instructions regarding its operation via the transceiver.

In some embodiments, the control system and/or a transceiver within and/or in communication with the sanitizing may be configured to communicate with another sanitizing device, control system, and/or transceiver resident within a sanitizing device.

Additionally, or alternatively, the sanitizing device may include a memory communicatively coupled to the control system. The memory may be configured to store, for example, a schedule for an operation of the sanitizing device, information regarding operations of the sanitizing device, information collected by one or more sensors resident in and/or in communication with the sanitizing device, and/or instructions regarding an operation of the sanitizing device.

Exemplary systems disclosed herein may include a plurality of communicatively coupled sanitizing devices that include a power source, a sanitizing light source, a control system, a transceiver configured to communicate with a transceiver resident in another of the sanitizing devices included in the plurality of sanitizing devices and a housing. The system may also include a server communicatively coupled to each of the sanitizing devices included in the plurality of sanitizing devices. The server may be configured to communicate instructions regarding an operation of one or more of the sanitizing devices included in the plurality of sanitizing devices to the respective one or more of the sanitizing devices included in the plurality of sanitizing devices. The instructions communicated to the one or more of the sanitizing devices may include a schedule of operation for each sanitizing device included in the plurality of sanitizing devices.

Communication between components of the system (e.g., between sanitizing devices and/or between a sanitizing device and the server) may be via Internet communications, a mesh network, a near-field communication (NFC) protocol and/or a wireless communication network such as Wi-Fi or BLUETOOTH™.

In some embodiments, the server may be configured to coordinate an operation of one or more of the sanitizing devices included in the plurality of sanitizing devices to collaboratively sanitize air, surfaces, and/or one or more objects present in the environment. At times, the coordination may be performed using reflectors positioned within the environment.

In some embodiments, the system may further include a sensor or monitor that is resident within the sanitizing device and/or external to the sanitizing device. The sensor may be configured to monitor a feature and/or aspect of the environment. On some occasions, a result of the monitoring may be communicated to the control system and, in some instances, coordination between two or more components of the system and/or sanitizing devices included within the system may be responsive to the monitoring performed by the sensor.

Systems, devices, and methods for generating an environmental protection plan are herein disclosed. The environmental protection plan may be include, for example, information regarding configuration(s) and/or use of one or more sanitizing devices that are configured to emit sanitizing radiation into an environment in order to, for example, reduce a number of pathogens present in the air and/or on surfaces of the environment. In some embodiments, the environmental protection plan may include a position for the placement of one or more sanitizing devices within the environment, a schedule for the operation of one or more sanitizing devices within the environment, and/or a layout for the placement of a plurality of sanitizing devices within the environment.

In some cases, an environmental protection plan may be and/or include a set of machine readable instructions such as a programmatic document (e.g. in JSON format) that could be interpreted in various ways by various components (e.g., sanitizing devices, hubs, servers, software applications, etc.). In some embodiments, the environmental protection plan may be and/or include instructions to facilitate the communication of instructions between hardware devices (e.g., sanitizing devices, web servers, environmental monitors, etc.) and/or software applications, facilitate the execution of one or more routines, or sub-routines, included in an environmental protection plan that may operate locally and/or on a cloud-based computer platform. Additionally, or alternatively, an environmental protection plan may be a physical (e.g., a booklet or blueprint plans) and/or computer-based human readable document (e.g., a PDF and/or a set of documents configured for display on a display screen (e.g., computer or mobile computing device display screen).

At times, the environmental protection plan may include positions and/or dimensions for projected half-power cones that represent and/or indicate a distribution of sanitizing radiation emitted by sanitizing devices for the environment.

Generation of an environmental protection plan may include receiving layout information for an environment, environmental usage information for the environment, pathogen information, a desired level of pathogen reduction, and/or irradiance information for a sanitizing device that emits sanitizing radiation, modeling pathogen load for the environment using the layout information, environmental usage information, pathogen information, and/or desired level of pathogen reduction, and generating an environmental protection plan for the reduction of pathogens within the environment, the environmental protection plan incorporating the modeled pathogen load and the irradiance information. In some embodiments, modeling the pathogen load may further use information from the user regarding infection rates for people associated with the environment.

In some embodiments, generation of an environmental protection plan may further comprise receiving a criterion from a user of the environment, the criterion defining a risk zone within the environment that has particular sanitization needs; and wherein the environmental protection plan further incorporates the criterion. At times, the criterion may be indicative of one or more of: what the zone may be used for, potential pathogens that may be present within the zone, a disease load associated with pathogens that may be present within the zone, a count of people traveling through the zone, and/or a duration of time people are likely to stay within the zone.

In some embodiments, generation of the environmental protection plan may include receiving one or more measurements of sanitizing radiation emitted into the environment from a sanitizing device positioned therein, wherein the environmental protection plan further incorporates the one or more measurements of sanitizing radiation emitted into the environment. Optionally, the environmental protection plan includes use of, and/or instructions for the use of, a plurality of projected cones of sanitizing radiation are represented as being emitted by respective sanitizing devices along with areas where at least two projected cones overlap, wherein a first sanitizing device may be represented as being oriented in an approximate parallel direction to a ceiling of the environment so that a first projected cone of sanitizing radiation may be projected outward from a first sanitizing device at an angle of 180 degrees to the ceiling; and wherein a second sanitizing device may be represented as being arranged on the ceiling and configured to emit sanitizing radiation in a direction that may be approximately perpendicular to the ceiling.

Exemplary environmental protection systems that may execute an environmental protection plan and/or a portion thereof may include a set of sanitizing devices configured and operable to emit sanitizing radiation. One or more of the sanitizing devices sanitizing devices of the set may be communicatively connected to a communication network, such as the Internet. In some embodiments, one or more of the sanitizing devices may be further configured to communicate with a transceiver and/or processor contained in a user's computing device (e.g., computer, mobile phone, tablet, etc.). At times, a first sanitizing device of the set of sanitizing devices may include a first sensor configured to provide information to cause the system to perform an operation of first sanitizing device, said operation including one or more of: turning first sanitizing device on or off, increasing sanitizing radiation output of the first sanitizing device sanitizing device, decreasing sanitizing radiation output of the first sd, and/or setting a time duration for the operation of the first sanitizing device. At times, the first sensor may be configured to function a color sensor, a motion sensor, a people and/or head counter, a thermometer, a heat sensor, a sensor to detect pathogens or contaminants, a carbon dioxide sensor, a video camera, a thermal camera, a microphone, a sound/noise sensor, an infrared sensor, a radio frequency sensor, a reflective sensor, an ultrasound sensor, a light monitoring sensor configured to monitor an intensity and/or wavelength of light emitted by first sanitizing device, a proximity sensor, and/or a color UV exposure strip. When the first sensor is configured as a color UV exposure strip, the first sensor may detect a color or wavelength of sanitizing radiation emitted by one or more of the sanitizing devices of the set of sanitizing devices incident thereon, the system being further configured to determine an amount of sanitizing radiation incident at least one of the first sensor and a surface within the environment. Additionally, or alternatively, the first sensor, operating as a color sensor, may detect reflected wavelengths of light and/or sanitizing radiation received from the environment provide information regarding the detected reflected wavelengths to one or more components of the system and/or a processor to infer and/or determine a feature (e.g., intensity, intensity as a function of time, intensity as a function of area, etc.) of incident and/or reflected sanitizing radiation. Additionally, or alternatively, the first sensor, operating as a color sensor, may include a camera that detects and/or reads the color of a UV exposure strip positioned in the environment. Additionally, or alternatively, one or more of the plurality of sensors may be a particulate matter sensor configured detect a number of particulates in ambient air of the environment and provide information about the number of detected particulates in ambient air of the environment to the means for generating an environmental protection plan.

In some embodiments, the first sanitizing device may be mounted at a preferred distance from a surface and/or object positioned within the environment, such that a preferred amount of sanitizing radiation may be incident on the surface and/or object; wherein the preferred distance may be determined based on a concentration, or intensity, of sanitizing radiation that has to reach the surface and/or object to sanitize it and/or reach a desired level of pathogen neutralization for the surface and/or object within a desired timeframe.

The system may also include an information source communicatively coupled to a sanitizing device of the set of sanitizing devices and/or the communication network. In some embodiments, the information source may include data defining limits to human exposure to the sanitizing radiation within a period of time, and wherein the system may be configured to control said sanitizing devices to avoid over-exposing any humans within the period of time.

The system may further include one or more sensors communicatively coupled to a sanitizing device of the set of sanitizing devices and/or the communication network. The sensors may operable and/or configurable to monitor one or more aspects of an environment in which the sanitizing devices are placed. The sensors may be resident within a sanitizing device and/or external to a sanitizing device. A sensor may be, for example, a electrical/piezo monitor configured to function as a feedback and/or monitoring mechanism to measure system compliance with instructions for operation and/or compliance with one or more safety protocols such as human-safe limits on sanitizing radiation level emissions.

One or more servers and/or cloud computing devices that are communicatively coupled to the communication network may also be included in the system. At times, the server may be configurable to monitor and/or control operations of one or more of the sanitizing devices such as when the sanitizing devices are on or off, determining what, if any, data sanitizing devices are receiving from one or more sensors, and/or monitoring the sanitizing devices for one or more error conditions. At times the server may be configured to coordinate an operation of one or more of the sanitizing devices of the set of sanitizing devices to collaboratively sanitize one or more objects and/or surfaces present in the environment.

On some occasions, the system may further include one or more reflectors positioned within the environment, wherein the coordination executed by the server may be performed using the reflectors.

The system may also include means (e.g., processor, a cloud-computing environment, application specific integrated circuit (ASIC), and/or field programmable gate array (FPGA)) for generating, controlling, and/or updating an environmental protection plan for the environment. On some occasions, the means for generating an environmental protection plan may include means (e.g., communication ports) for receiving layout information for the environment, environmental usage information for the environment, pathogen information, a desired level of pathogen reduction, and irradiance information for a sanitizing device that emits sanitizing radiation. Additionally, or alternatively, the means for generating an environmental protection plan may include means for modeling pathogen load for the environment using the layout information, environmental usage information, pathogen information, and/or desired level of pathogen reduction. Additionally, or alternatively, the means for generating an environmental protection plan may include means for generating a plan for the reduction of pathogens within the environment, the plan incorporating the modeled pathogen load and the irradiance information.

In some embodiments, the system and/or one or more components thereof, may be configured to measure one or more of the following parameters: energy draw, irradiance across a coverage area within the environment, cycle time, proximity, airflow, humidity, temperature, and/or human occupancy. Additionally, or alternatively, the system and/or one or more components thereof may be configured to calculate one or more of the following parameters: cycles of full pathogen reduction, types of viruses and bacteria reduced, employee absenteeism, number of people who avoided sickness, chemical exposure, clean air delivery rate (CADR), air change rate, energy drain as compared to other systems, equivalent air changes per hour (eACH), and/or cost savings due to, for example, execution of the environmental protection plan and/or an aspect thereof.

In some embodiments, the system may include one or more proxy devices and/or means associated with a sanitizing device for emitting and detecting a proxy radiation beam, or beacon, indicative of a coverage area of the associated sanitizing device. The proxy means may include, for example, a non-UV, or electromagnetic radiation/light source (e.g., a source of infrared, ultraviolet, or radio waves). Additionally, or alternatively, the proxy means may include camera and image processing means (e.g., processor, computer, and/or graphics card) for detecting the beacon and determining the shape and coverage area of the beacon. In some cases, the proxy means may be configured to modulate the proxy radiation beam to produce a strobed or patterned beam. Additionally, or alternatively, the proxy means may be further configured to create a projected beam pattern including, for example, concentric circles, waves, lines, a checkerboard pattern, a diffraction pattern, or a combination thereof.

In some cases, the proxy radiation beam may be a cone-shaped visible light curtain enabling an installer to aim emission of sanitizing radiation emitted by an associated sanitizing device of the set of sanitizing devices to a desired pathogen reduction area. Additionally, or alternatively, the proxy radiation beam may be a non-visible electromagnetic signal that may be measurable by an external device at various locations in the environment. Additionally, or alternatively, the system may be configured to determine, based on, for example, detection and/or analysis of the proxy radiation beam, an expected UV-C output and/or a pathogen reduction rate in a coverage area of an associated sanitizing device, and to verify the setup and area coverage may be correct to achieve a desired level of pathogen reduction. Additionally, or alternatively, the proxy means may include a non-UV light source configured to emit a beam of visible or non-visible light or electromagnetic radiation in a pattern (e.g., a diffraction pattern) that resembles a pattern of sanitizing radiation emitted by one or more sanitizing devices.

In some embodiments, the means for generating an environmental protection plan may be configured to determine shadowing effects and/or obstructions within the environment that may impact delivery of sanitizing radiation to the environment and/or a portion thereof. In some cases, the means for generating an environmental protection plan may be further configured to determine, for example, optimal installation locations, including heights, for the sanitizing devices, said optimal locations and heights being based on pathogen reduction goals and area coverage for each sanitizing device. Additionally, or alternatively, the means for generating an environmental protection plan may be further configured to determine a risk level metric for high touch areas, high traffic areas, and/or areas requiring more or less pathogen reduction.

On some occasions, the means for generating an environmental protection plan may be further configured to determine a schedule for each sanitizing device in terms of output intensity as a function of time, said schedule being based on pathogen reduction goals and area coverage for each sanitizing device. For example, the system may be further configured to dynamically adjust the output intensity of each sanitizing device to compensate for disruptions to said schedule, wherein the dynamic adjustment may be designed to maintain a desired average area coverage and average pathogen reduction rate throughout an area, and wherein the disruptions include one or more of the following: manual overrides, power outages, and lifespan of a particular sanitizing device. At times, the means for generating an environmental protection plan may be further configured to determine optimal installation locations for one or more sanitizing devices of the set of sanitizing devices, including heights, for the sanitizing devices, said optimal locations and heights being based on pathogen reduction goals and area coverage for each sanitizing device. In some embodiments, the means for generating an environmental protection plan may be further configured to determine a schedule of operation for one or more sanitizing devices of the set of sanitizing devices. The schedule may, for example, set on/off times for one or more sanitizing devices of the set of sanitizing devices, triggers (e.g., occupancy for the environment, date, time of day, etc.) for the turning the one or more sanitizing devices of the set of sanitizing devices on and/or off. Additionally, or alternatively, the schedule may define output intensity (e.g., Watts) of sanitizing radiation emitted by one or more sanitizing devices of the set of sanitizing devices as a function of time. At times, the schedule may be responsive to, for example, a pathogen reduction goal and/or a desired portion of the environment to be irradiated by the sanitizing radiation for one or more sanitizing devices of the set of sanitizing devices. Optionally, the means for generating an environmental protection plan may be further configured to report, for example, the one or more installation locations, the schedule, the pathogen reduction goal, an actual output of sanitizing radiation for one or more sanitizing devices of the set of sanitizing devices, and/or a resultant pathogen reduction within the environment in log files. In some cases, the system may be further configured to determine an actual position and/or orientation for one or more of the sanitizing devices and may be further configured to compare these to the position and orientation indicated in the environmental protection plan for each of the respective sanitizing devices.

In some embodiments the system may be configured to provide implementation information for use in an environmental protection plan proposal or an environmental protection plan implementation process, wherein the implementation information includes implementation instructions, which when executed by the system, cause the system to distribute sanitizing radiation within the environment to according to at least one of a pathogen reduction goal and a sanitizing radiation distribution goal within the environment. At times, when providing the implementation information, the system may be further configured to consider how the environment may be used and/or a level of sanitization required to adequately sanitize the environment. Additionally, or alternatively, the system may be further configured to consider information concerning local outbreaks of disease or third-party pathogen detection sensors that may be positioned within and/or outside of the environment and provide said information to a customer or user on, for example, a one-time, as-needed, periodic, and/or ongoing basis to, for example, enable the customer or user to assess risks and/or more effectively manage risk associated with the environment and/or day-to-day operations within the environment.

In some embodiments, the system may be configured to monitor and/or control the power consumption of one or more of the sanitizing devices. In some instances, one or more of the sanitizing devices may be configured to communicate with one another to, for example, receive instructions and/or provide data.

On some occasions, an operation of one or more of the sanitizing device of the set of sanitizing devices is configured to be activated by information received via the communication network, said information pertaining to at least one of local weather conditions for the environment, infectious disease rates among populations, or sets, of people; manual cleaning times of the environment, an admission rate of a hospital and/or clinic proximate to the environment that may be associated with a pathogen, a disease severity for people that have been admitted to a hospital; air flow conditions within the environment, a count of people within the environment; a count of people traveling through the environment; and/or a number of mobile phones present in the environment.

On some occasions, the system may be configured to generate data that may be usable to develop pathogen load models, pathogen load predictions, and/or pathogen load mitigation strategies for various situations, environments, and/or circumstances. At times, the In some embodiments, the means for generating an environmental protection plan are configured to determine at least one of a distance to and an angle between a sanitizing device of the set of sanitizing devices within the environment and various positions within the environment that correspond to at least one of a height of a person, a height of a surface, and/or a distance between the sanitizing device of the set of sanitizing devices and a floor of the environment.

BRIEF DESCRIPTION OF THE DRAWINGS

The present invention is illustrated by way of example, and not limitation, in the figures of the accompanying drawings in which:

FIG. 17A1 provides a graph plotting normalized sanitizing irradiance from one sanitizing device as a function of degrees from center of a sanitizing device projecting the sanitizing radiation, in accordance with some embodiments of the present invention;

FIG. 17A2 provides a graph plotting a focus of normalized angular distribution of sanitizing irradiance from one sanitizing device as a function of degrees from center of a sanitizing device projecting the sanitizing radiation, in accordance with some embodiments of the present invention;

Figure 1:
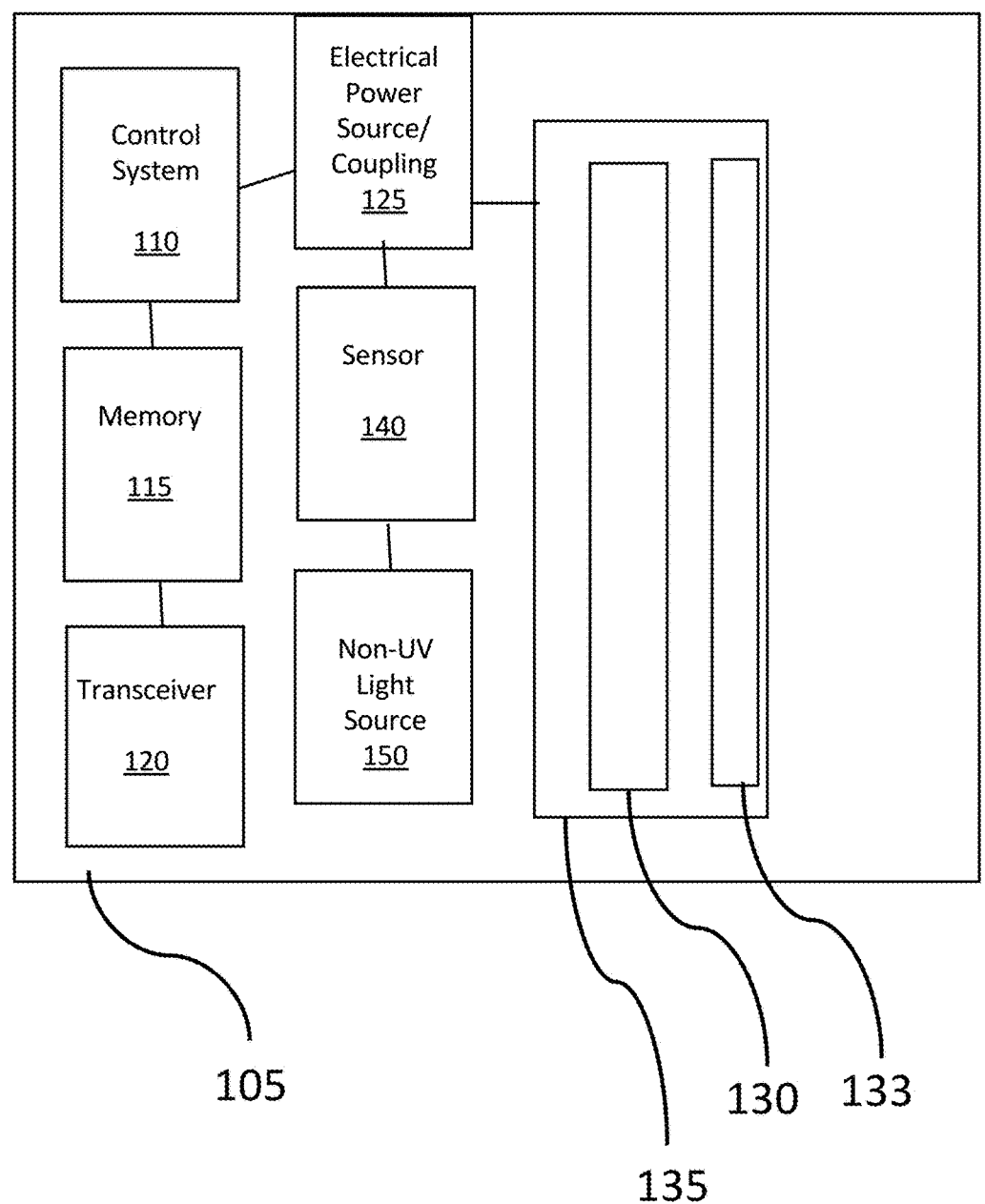
FIG. 1 is a block diagram of a first exemplary sanitizing device according to the present invention, according to embodiments of the present invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

Written Description

Disclosed herein are sanitizing devices that emit, or project, sanitizing radiation, or light, that may kill, or neutralize pathogens such as viruses and bacteria that may be resident in an environment, suspended in the air of the environment, and/or positioned on a surface of objects (e.g., walls, door handle, surfaces, objects, etc.) within the environment that are irradiated with the sanitizing radiation. Exemplary environments include, but are not limited to, work offices, government buildings, restaurants, food prep facilitates or food manufacturing, healthcare environments, train stations, train cars, airports, and airplanes. The wavelengths of light emitted by the sanitizing devices may be selected so that they are effective at neutralizing pathogens but do not harm, or adversely impact, human or animal tissue (e.g., eyes or skin). In some embodiments, the light emitted by the sanitizing devices disclosed herein may be ultraviolet light and/or within the range of far-UVC light and, in some embodiments emits light of a wavelength of, for example, 222 nm, 205 nm, 218 nm, or within a range of approximately 200-240 nm. Additionally, or alternatively, light emitted by the sanitizing devices disclosed herein may be of 405 nm and/or within a range of 395-430 nm.

At times, the sanitizing devices disclosed herein may be used in a networked fashion so that a plurality of sanitizing devices may be used to sanitize an environment. One or more of the plurality of sanitizing devices may be network-enabled and may be communicatively coupled to one another, a server, one or more sensors, and/or one or more software application running on a computer device operated by a user via, for example, a communication network (e.g., the Internet), a private wireless network, and/or a mesh network. This connectivity may enable the user to gather information from, and/or remotely control sanitizing devices. In addition, connectivity of sanitizing devices to a central hub, each other, and/or a server (e.g., web server) may facilitate the integration and/or monitoring of an environment and/or a pathogen load within that environment.

Also disclosed herein are systems, devices, and methods for assessing germicidal risks and/or a pathogen load for environments and generating environmental protection plans for sanitizing the environments or otherwise neutralizing pathogens within the environments. These environmental protection plans may include protocols, sanitizing device layouts, models for achieving various sanitizing outcomes under the same and/or different conditions, and/or instructions for the operation of one or more sanitizing devices positioned within an environment. Often times, the environments are occupied with humans and/or animals for a period of time (e.g., during work hours, during scheduled use times for the environment, etc.) and the occupation of the environment by humans and/or animals may be incorporated into the development of the environmental protection plans.

In some embodiments, the environmental protection plans may be developed by modeling and/or calculating irradiance coverage patterns for the deployment of sanitizing radiation sources in an environment that may, at times, incorporate three-dimensional generic envelopes (length, width, ceiling height) of projected sanitizing radiation superimposed with each other and with objects or surfaces of interest within the environment. These generic envelopes may provide useful and, at times, reusable integrated estimates of sanitization efficacy over a surface or volume with manageable computational complexity. At times, an environmental protection plan for an environment may be designed using, for example, building architectural layouts (e.g., dimensions, positions of objects, locations for high-touch surfaces, surfaces, doors, and/or heating ducts) for the environment. Additionally, or alternatively, environmental protection plans for an environment may be designed using, for example, air circulation and ventilation rates (air changes per hour) and/or estimates of how many humans may be in an environment over a period of time, and/or how long the humans are in the environment. In some instances, the environmental protection plans may be specific to an environments specific sanitization needs and/or areas with high probability of contamination (e.g., high touch surfaces) within the environment.

Environmental protection plans may be designed to provide continuous, periodic, and/or as-needed sanitizing radiation to the environment based on, for example, sanitizing device characteristics, expected occupancy patterns within the environment, expected pathogen loads within the environment, and/or how the environment is expected to be used. In some instances, the environmental protection plans may incorporate balancing sanitizing device position and/or distance from environmental surfaces, coverage area or range for sanitizing devices, minimum levels of sanitizing radiation projected into the environment for effective neutralization of pathogens, maximum levels of sanitizing radiation that may be projected into the environment while maintaining levels of radiation that are safe for humans and/or animals.

In some instances, one or more of the systems, methods, and/or devices disclosed herein may be configured to determine whether an amount of sanitizing radiation emitted into an environment and/or incident on a surface is sufficient to sanitize the environment (e.g., environment 1000) and/or an object therein and/or reduce a pathogen load within the environment to a desired and/or required level.

Turning now to the figures, FIG. 1 is a block diagram of a first exemplary first sanitizing device 100 according to the present invention. First sanitizing device 100 includes a housing 105A, a control system 110, a memory 115, a transceiver 120, an electrical power source/coupling 125, a sanitizing light source 130, an optional filtering device 135, an optional reflector 133, and one or more optional sensor(s) 140. Housing 105A may be configured to house the components of first sanitizing device 100 and may be made of any appropriate material or combination of materials including, but not limited to, plastic and metal. Housing 105A may include one or more ports (not shown) by which a power cord may be coupled to first sanitizing device 100 to provide power to first sanitizing device 100 via electrical power source/coupling 125. In some embodiments, electrical power source/coupling 125 may be a battery that, in some cases, may be rechargeable. Additionally, or alternatively, housing 105A may include one or more ports (not shown) by which communication with sanitization device may be facilitated. These ports may be, for example, switch inputs, USB, fire wire, or ethernet ports.

Control system 110 may be configured to control the operation (e.g., intensity of sanitizing light emitted, activate, de-activate, logging the on/off times, control, monitor, and/or track the length of operation of the first sanitizing device 100, etc.) of first sanitizing device 100, sanitizing light source 130, reflector 133, and/or filtering device 135 according to, for example, one or more methods described herein. In some cases, control system 110 may be and/or include a processor and/or a processor/memory combination. Additionally, or alternatively, control system 110 may include one or more hardware components such as sensors or electrical/piezo monitors that may, in some embodiments, be configured and/or programmed to function as a feedback and/or monitoring mechanism to, for example, measure system compliance with instructions for operation and/or compliance safety protocols or policies. Additionally, control system 110 may be configured to receive and/or transmit information from/to transceiver 120 thereby enabling communication of information to and/or from first sanitizing device 100 to an external device or network such as a mesh network, a cloud computing network, and/or the Internet. Transceiver 120 may be configured to receive and/or communicate information via any appropriate wired and/or wireless communication protocol and/or method including, but not limited to, receipt and/or transmission of a radio frequency signal, an infrared signal, a BLUETOOTH™ signal and/or a Wi-Fi signal. In some embodiments, transceiver 120 may be configured to communicate with an external wireless communication device such as a mobile phone, smart phone, and/or computer. In some instances, first sanitizing device 100 may be communicatively coupled to a mesh network of devices, sensors, and/or hubs that can connect directly to local phones or other devices for information or connect with the Internet and/or a cloud computing infrastructure so that, for example, the first sanitizing device 100 may operate with/without the Internet.

In some embodiments, control system 110 may be configured to control the intensity of light emitted by sanitizing light source 130, power consumption of first sanitizing device 100 and/or sanitizing light source 130, and/or target radiant flux output of sanitizing light source 130 and/or first sanitizing device 100. Additionally, or alternatively, control system 110 may be configured to control a duty cycle of one or more components of sanitizing device 100. In some embodiments an average intensity of sanitizing light emitted by sanitizing light source 130 may be adjusted by adjusting the duty cycle of sanitizing light source 130 by, for example, cycling sanitizing light source 130 on and off. Additionally, or alternatively, a duty cycle of two or more light sources 130 of two or more sanitizing devices 100 that may be configured and/or positioned to sanitize an environment together may be programmed and/or configured to have synchronous duty cycles such that, for example, when a light source 130 is emitting light, a second light source 130 may be off (i.e., not emitting light). The on/off state of the first and second light sources 130 may then alternate over time so that at least one of the first and second light source 130 is emitting sanitizing radiation into the environment. These synchronous duty cycles may be configured/programmed to, for example, maintain an average spatial and/or time coverage for sanitizing radiation within the environment over time.

Instructions for operating control system 110 and/or transceiver 120 may be stored on memory 115. Additionally, or alternatively, data acquired by and/or data regarding the operation of first sanitizing device 100 may be stored in memory 110. For example, memory 110 may store, for example, scheduling information, logs of when the first sanitizing device 100 is powered on and off, run times for the first sanitizing device 100, and information from one or more sensors communicatively coupled to first sanitizing device 100.

In some embodiments, first sanitizing device 100 may be Internet enabled and a first sanitizing device 100 may communicate with other sanitizing devices 100 and/or a processor (e.g., a computer, a cloud computing platform, a user's mobile phone, and/or a command center) to receive instructions and/or provide data regarding operation of the first sanitizing device 100. For example, at times, certain operations of the first sanitizing device 100 may be triggered by information received via the Internet such as weather, infectious disease rates among populations, or sets, of people, manual cleaning times of an environment, an admission rate of a hospital and/or clinic, what medical conditions people are being admitted to a hospital for, air flow conditions within the environment, a count of people within an environment, a count of people traveling through the environment, a number of mobile phones present in a particular area. Additionally, or alternatively, a system (e.g., a reservation or ticketing system) communicatively coupled to first sanitizing device 100 may provide an indication of how many people may be in a particular space at a particular time (e.g., how many people are attending a concert or are scheduled to be present in a classroom), which may be used by the first sanitizing device 100 and/or a processor providing instructions to the first sanitizing device 100 to operate (e.g., turn on/off, set duration of time of operation, set an intensity of sanitizing radiation emitted by one or more sanitizing devices, etc.) the first sanitizing device 100.

Sanitizing light source 130 may be configured to emit light in the far-UVC portion of the electromagnetic spectrum (i.e., 200-240 nm) and, in some cases, may emit light of 222 nm in wavelength and/or light within a range of approximately 200-240 nm in wavelength. Exemplary sanitizing light sources 130 include, but are not limited to, excimer lamps, plasma, micro-plasma lamps, microcavity lamps, UV lamps, UV LEDs, gas discharge lamps, and other gas-excitation-based lamp technologies. In some cases, sanitizing light source 130 may operate cooperatively with filtering device 135 and/or one or more reflector(s) 133 to achieve emission of light that is 222 nm or light within the range of 200-240 nm and/or the focusing or direction of light emitted by the sanitation device in a particular direction or set of directions. Exemplary filtering devices 135 include, but are not limited to, quartz filters, fused silica filters, semi-opaque filters, polarizers, and/or mechanical filters (e.g., slits or orifices in the filtering media of filtering device 135). Exemplary optional reflectors 133 include, for example, mirrors or surfaces configured to reflect some, or all, of the light emitted by sanitizing light source 130 in one or more directions so that the light emitted by sanitizing light source 130 may be focused and/or diffused upon exiting sanitization device 100. In some embodiments, reflector 133 is positioned behind sanitizing light source 130 so that it reflects light generated by sanitizing light source 130 away from an inside of first sanitizing device 100 and/or toward the outside of first sanitizing device 100 (e.g., through an aperture in first sanitizing device 100) so that, for example, sanitizing light may be directed toward air, objects, and/or surfaces external to sanitizing device 100.

First sanitizing device 100 may include one or more sensors 140 that may provide information to control system 110 that may cause control system 110 to perform an operation of first sanitizing device 100 such as turning first sanitizing device 100 on or off, increasing sanitizing radiation output, decreasing sanitizing radiation output, and/or setting a time duration for the operation of first sanitizing device 100. Additionally, or alternatively, one or more sensors 140 may provide information to a transceiver like transceiver 120 for communication to an external device such as a server, a monitor, and/or a computing device operated by a user.

Exemplary sensors 140 include, but are not limited to, motion sensors, people and/or head counters, thermometers, heat sensors, sensors to detect pathogens or contaminants, carbon dioxide sensors, video cameras, thermal cameras, microphones, sound/noise sensors, temperature sensors, infrared sensors, radio frequency sensors, reflective sensors, ultrasound sensors, light monitoring sensors configured to monitor an intensity and/or wavelength of light emitted by sanitizing device 100, and/or proximity sensors. Sensor(s) 140 may operate to provide an indication that a person, or group of people, is in an environment in which a sanitizing device is installed and/or operational so that operation of the first sanitizing device 100 may be initiated to sanitize the air and/or objects or surfaces in the environment and/or an operation of the first sanitizing device 100 may be stopped. In some embodiments, one or more sensors 140 may be a color sensor. The color sensor may operate as a color UV exposure strip. Additionally, or alternatively, the color sensor may detect differences between initialized color or wavelength information in a context and real time color or wavelength info in order to infer the amount of sanitizing far UV-C on surfaces. In this case 'color' refers to optical wavelength since UV-C is transparent optically. Additionally, or alternatively, the color sensor may act to detect reflected wavelengths (spectra) received from the environment and may infer a feature of incident sanitizing radiation from the received reflected light. Additionally, or alternatively, the color sensor may be a camera that reads the color of a UV exposure strip in the environment.

In some embodiments, first sanitizing device 100 may be a component of a sanitizing system that includes, for example, a plurality of sanitizing devices 100 and/or devices to assist with the disbursement of the sanitizing light around an environment or room such as reflectors, mirrors, lenses, light absorption materials (e.g., fabric, foam, opaque lenses, and/or semi-transparent lenses) and/or light reflecting materials such as reflectors or glass. In some instances, for example, a room may include a mirror positioned at each corner of the room to redirect the sanitizing light back into the room and along the walls of a room so that the walls are sanitized. Additionally, or alternatively, reflective devices may be positioned within a room so that air and/or objects positioned below a surface or object (e.g., a table or countertop) are exposed to the sanitizing light when that light is initially projected from above. Additionally, or alternatively, a sanitizing system may include a sanitizing light absorption material positioned in areas of an environment or room where the sanitizing light may be too concentrated and/or to prevent the sanitizing light from reaching a place it is undesired such as outside the room.

In some embodiments, the sanitizing system may include one or more air circulation devices such as fans, to circulate air within a room so that the air in the room is evenly exposed to the sanitizing light from first sanitizing device 100. In some cases, the air circulation devices may be communicatively coupled via, for example, the Internet and/or a mesh network so that they are activated when the first sanitizing device 100 is activated. Additionally, or alternatively a sanitizing device 100 may be programmed to activate when an air circulation device is activated.

In some embodiments, a first sanitizing device 100 and/or a housing 105A may be configured to move and/or rotate in order to, for example, project sanitizing light around an environment or room. This movement and/or rotation may be facilitated by, for example, a movement mechanism 222 as shown in FIG. 21 and discussed below. Alternatively, first sanitizing device 100 and/or a housing 105A may be configured to be ceiling mounted, wall mounted, and/or positioned on a surface such as a table or counter.

At times, first sanitizing device 100 may be mounted so that it is a preferred distance from a surface and/or object. Additionally, or alternatively, first sanitizing device 100 may be mounted a distance from a surface and/or object so that a preferred amount of sanitizing radiation is incident on the surface and/or object. The preferred distance may be determined by determining a concentration, or intensity, of sanitizing light that has to reach a surface of the object to sanitize it and/or reach a desired level of pathogen neutralization within a desired timeframe. For example, it may be determined that a sanitizing device must be less than 3, 6, 8, or 15 feet above a surface of an object to sanitize the surface of the object within a desired timeframe (e.g., 5, 10, or 15 minutes). In this example, first sanitizing device 100 may be positioned in an environment or room with ceilings below 15 feet in height or be suspended from higher ceilings so the first sanitizing device 100 is within 15 feet from the surface of objects within the room. On some occasions, a duration of a desired timeframe may be set by known durations of sanitizing light required to neutralize pathogens to a desired degree.

In some embodiments, sanitizing device 100 may include a non-UV light source 150 configured to emit light of a frequency within, for example, a visible light and/or infrared portion of the electromagnetic spectrum.

Figure 2:
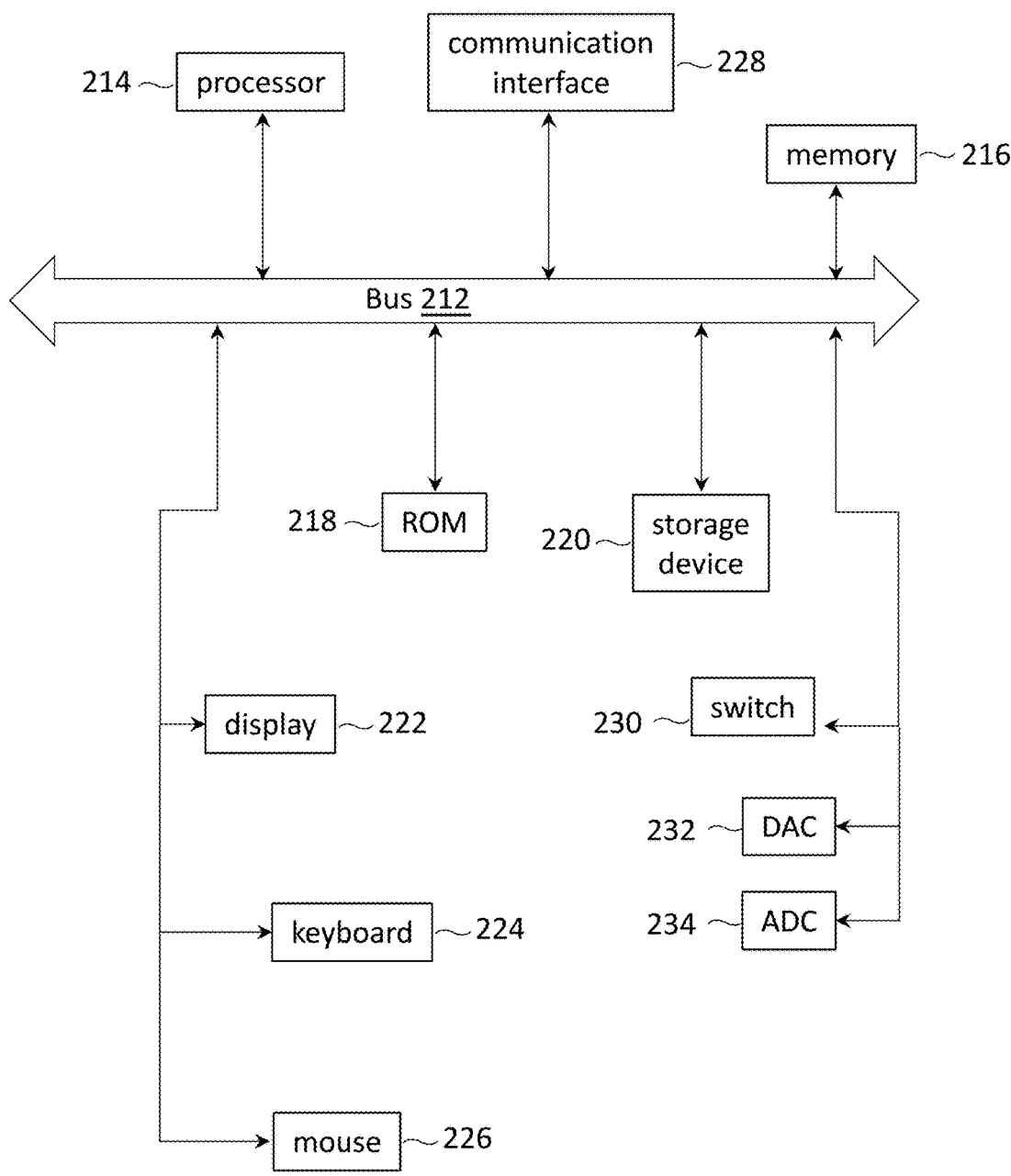
FIG. 2 is a block diagram of an exemplary processor-based system that may store data and/or execute instructions for the processes disclosed herein, in accordance with some embodiments of the present invention.

FIG. 2 provides an example of a processor-based system 200 that may store and/or execute instructions for one or more of the processes described herein. Processor-based system 200 may be resident in a server, like server 440 and/or a sanitizing device like sanitizing device 100. Note, not all of the various processor-based systems which may be employed in accordance with embodiments of the present invention have all of the features of system 200. For example, certain processor-based systems may not include a display inasmuch as the display function may be provided by a client computer communicatively coupled to the processor-based system or a display function may be unnecessary. Such details are not critical to the present invention.

System 200 includes a bus 212 or other communication mechanism for communicating information, and a processor 214 coupled with the bus 212 for processing information. System 200 also includes a main memory 216, such as a random-access memory (RAM) or other dynamic storage device, coupled to the bus 212 for storing information and instructions to be executed by processor 214. Main memory 216 also may be used for storing temporary variables or other intermediate information during execution of instructions to be executed by processor 214. System 200 further includes a read only memory (ROM) 218 or other static storage device coupled to the bus 212 for storing static information and instructions for the processor 214. A storage device 220, which may be one or more of a hard disk, flash memory-based storage medium, a magnetic storage medium, an optical storage medium (e.g., a Blu-ray disk, a digital versatile disk (DVD)-ROM), or any other storage medium from which processor 214 can read, is provided and coupled to the bus 212 for storing information and instructions (e.g., operating systems, applications programs and the like).

System 200 may be coupled via the bus 212 to a display 222, such as a flat panel display, for displaying information to a user. An input device 224, such as a keyboard including alphanumeric and other keys, may be coupled to the bus 212 for communicating information and command selections to the processor 214. Another type of user input device is cursor control device 226, such as a mouse, a trackball, or cursor direction keys for communicating direction information and command selections to processor 214 and for controlling cursor movement on the display 222. Other user interface devices, such as microphones, speakers, etc. are not shown in detail but may be involved with the receipt of user input and/or presentation of output.

The processes referred to herein may be implemented by processor 214 executing appropriate sequences of processor-readable instructions stored in main memory 216. Such instructions may be read into main memory 216 from another processor-readable medium, such as storage device 220, and execution of the sequences of instructions contained in the main memory 216 causes the processor 214 to perform the associated actions. In alternative embodiments, hard-wired circuitry or firmware-controlled processing units (e.g., field programmable gate arrays) may be used in place of or in combination with processor 214 and its associated computer software instructions to implement the invention. The processor-readable instructions may be rendered in any computer language.

System 200 may also include a communication interface 228 coupled to the bus 212. Communication interface 228 may provide a two-way data communication channel with a computer network, which provides connectivity to the plasma processing systems discussed above. For example, communication interface 228 may be a local area network (LAN) card to provide a data communication connection to a compatible LAN, which itself is communicatively coupled to other computer systems. The precise details of such communication paths are not critical to the present invention. What is important is that system 200 can send and receive messages and data through the communication interface 228 and in that way communicate with other controllers, etc.

System 200 may also include one or more switches, dials, or devices 230 that facilitate manual operation (e.g., on/off, intensity of UV light emitted, scheduling of operation, etc.) of one or more sanitization devices like sanitizing device 100. In some embodiments, system 200 may further include one or more digital-to-analog converters (DACs) 232 and/or analog-to-digital converters (ADCs) 234 that may be configured to operate as, for example, input/output modules for data communicated into and/or out of one or more sanitization devices like sanitizing device 100 and/or control one or more operations of one or more sanitization devices like sanitizing device 100.

The sanitizing devices and systems disclosed herein may be used in a variety of situations to improve air quality and deactivate pathogens that may be present on surfaces and objects and/or in the air. For example, the sanitizing devices and systems disclosed herein may be used in common areas like transportation hubs, exercise facilities, schools, and medical facilities to sanitize surfaces and objects used by multiple individuals and the air in these common areas to reduce a likelihood that a person may come into contact with the pathogen and become ill. The sanitizing devices and systems disclosed herein may also be used to sanitize air flowing through heating and air conditioning systems in, for example, office buildings, restaurants, schools, museums, and/or sporting arenas.

Figure 3:
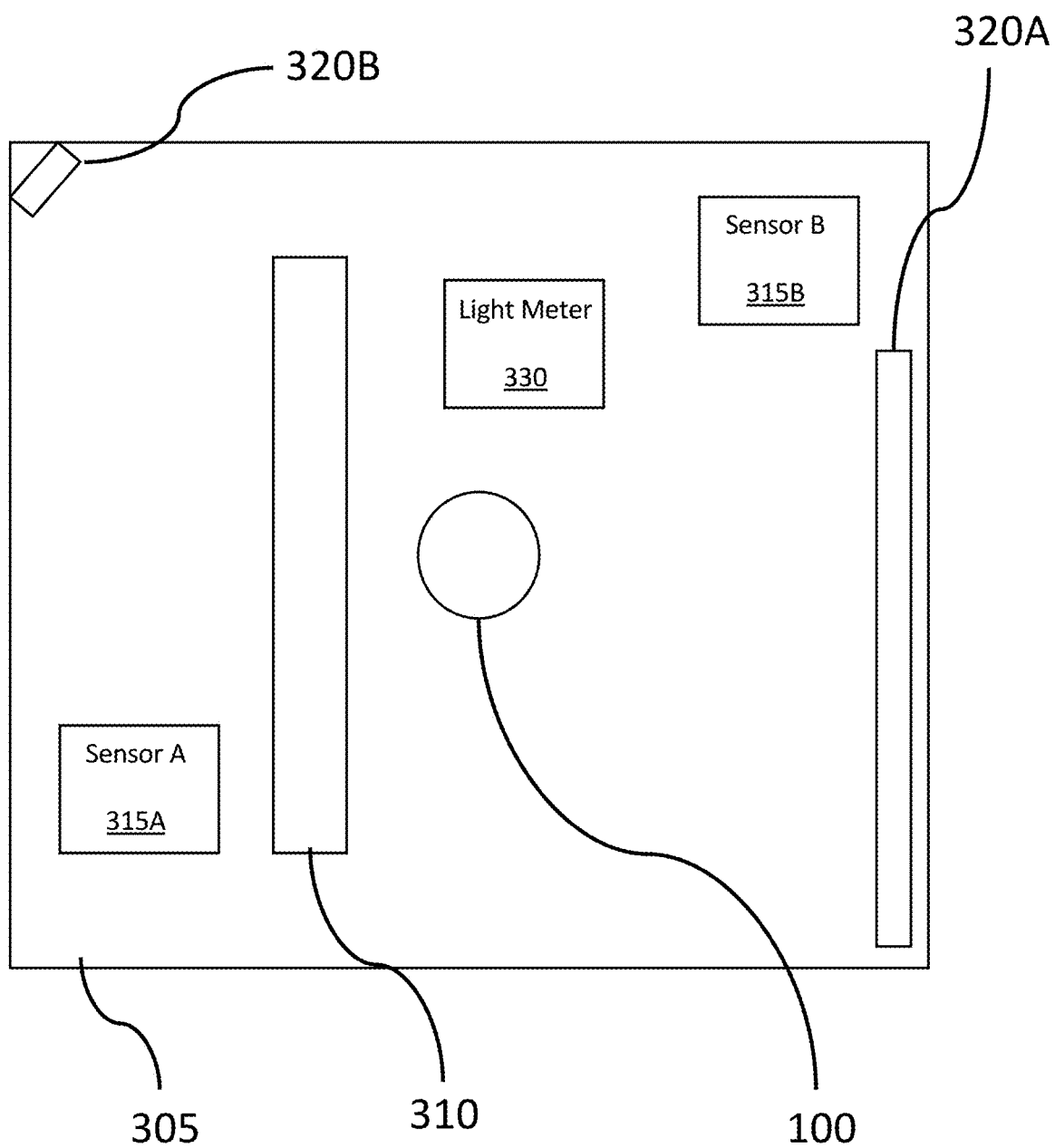
FIG. 3 is a diagram of an exemplary environment in which sanitizing device and/or a sanitizing system may operate to sanitize, or disinfect surfaces, air, and/or objects included therein, according to embodiments of the present invention.

In some embodiments the sanitizing devices and systems disclosed herein may be coupled with air filtration systems in order to, for example, work in conjunction with the air filtration systems to remove particles and/or deactivate pathogens in the air that may be present FIG. 3 is a diagram of an exemplary environment 305 in which first and/or second sanitizing device 100 and/or a sanitizing system may operate to sanitize, or disinfect, surfaces, air, and/or objects included therein. Environment 305 may be, for example, a retail outlet, store, restaurant, food preparation areas/station, transportation hub, public space, bathroom, hotel, school, gym, medical/dental office, airport lounge, elevator, and hotel room. Environment 305 may be defined by one or more walls. Environment 305 includes first and/or second sanitizing device 100, an object 310, a first sensor 315A, a second sensor 315B, a first reflective object 317A, a second reflective object 317B, and a light meter/camera 330. Although only two sensors 315 and reflective objects 320 are depicted in FIG. 3, it will be understood that any number of sensors 315 and/or reflective objects 320 may be used in environment 305.

First and second sensors 315A and 315B may be sensors configured to monitor environment 305 for the presence of, for example, people or pathogens. Additionally, or alternatively, first sensor 315A and/or second sensor 315B may be, for example, a motion sensor, a heat sensor, a sensor to detect pathogens or contaminants, a people counter, a person counter, a temperature sensor, a heat camera, a carbon dioxide sensor, a particulate matter (PM) sensor, a volatile organic compound (VOC) sensor, a sound/noise sensor, a temperature sensor, an ozone sensor, a microphone, a thermometer, a heat sensor, a light intensity sensor, a light color sensor, a proximity sensor, a reflective sensor, a field sensor, a radar sensor, a mm wave sensor, cm wave sensor, and/or an ultrasonic sensor. At times, first and/or second sensors 315A and/or 315B may be an infrared sensor configured to, for example, count a number of people traveling through an infrared (IR) beam and/or a number of particles or pathogens present within a beam of infrared light. Additionally, or alternatively, first and/or second sensors 315A and/or 315B may be an infrared camera, a bolometer, and/or a sensor that counts people by detecting via, for example long-wave infrared, cell phone presence, reflections from surfaces and/or people that may be provided to, for example, an image processing and/or people counting algorithm.

External sensors 315 and/or internal sensor 140 may be configured share some, or all, of the same capabilities and/or operations. For example, in one embodiment, a sensor 315 and/or 140 may be temperature sensor and/or heat camera configured to measure a body temperature of people within, entering, and/or exiting an environment. This information may be conveyed to, for example, a sanitizing device and/or a server communicatively coupled to the server so that, for example, an operation of a sanitizing device 100 may be responsive thereto. For example, if it is determined that an individual with an elevated body temperature has entered an environment, sanitizing device 100 may be activated to neutralize any pathogens the individual may be shedding or breathing into the environment and/or neutralize a potential increased pathogen load caused by an occupant with an elevated body temperature may be shedding or breathing into the environment.

Additionally, or alternatively, sensor 315 and/or 140 may be a light meter that measures an intensity of light (in, for example, microwatts and/or milliwatts) in a particular portion of the environment to see whether, for example, sanitizing device 100 is working properly and/or whether the particular portion of the environment is receiving enough/too much sanitizing light to be effective.

Additionally, or alternatively, sensor 315 may be a photo-responsive material (e.g., dots or strips of material) that may, for example, change color in the presence of light of a certain wavelength, set of wavelengths, and/or intensity or fluence. This may enable a sensor and/or user to, for example, measure an amount of sanitizing light being emitted by sanitizing device 100 and/or verify that sanitizing device 100 is operating properly and/or an area of the environment corresponding to the photo-sensitive material is receiving sufficient sanitizing light to be effectively sanitized.

In one exemplary implementation, a sanitizing device 100 may be placed in a food preparation area so that the area and the food remains sanitized while food is being prepared and/or is waiting to be consumed (e.g., under a heat lamp or on a hot food bar). Additionally, or alternatively, sanitizing device may be used to sanitize an area where raw food such as sushi or salad is being prepared in order to deactivate any food-borne pathogens that may be present on/in the food prior to consumption.

In some instances, information from first sensor 315A and/or second sensor 315B may be communicated to first sanitizing device 100, received by transceiver 120, and used by control system 110 to operate first sanitizing device 100. Additionally, or alternatively, information from first sensor 315A and/or second sensor 315B may be communicated to a processor not resident within first sanitizing device 100 such as a processor operating on a cloud computing platform communicatively coupled to first sensor 315A, second sensor 315B, and/or first sanitizing device 100 via, for example, the Internet and/or a mesh network to control the operation of first sanitizing device 100.

Object 310 may be, for example, a table or a counter on which food is eaten or prepared and/or a volume of air-space adjacent or near the table or counter. Alternatively, object 310 may be a counter over which people exchange information or transact business that may be used in, for example, a hotel or governmental agency. First and/or second sanitizing device 100 may be arranged in environment 305 in a position that facilitates delivery of a sufficient amount (e.g., intensity) of sanitizing light to the surface of object 310 to sanitize the surface of object 310.

In some embodiments, first and/or second sensors 315A and/or 315B may be arranged in portions of environment 305 to monitor the effectiveness of first and/or second sanitizing device 100. For example, in some instances, a sensor 315 may be placed in a dead spot in environment 305 or placed where verification that the device is working is of particular interest such as under object 310 (not shown). Information from first and/or second sensors 315A and/or 315B may be communicated to, for example, sanitizing device 100 and/or a processor communicatively coupled to first and/or second sensors 315A and/or 315B via, for example, the Internet.

In some embodiments, first sanitizing device 100, first and/or second sensors 315A and/or 315B may be configured to generate a report indicating, for example, when a sanitizing device is on, a duration of time the sanitizing device is operating, a sensor readout (e.g., carbon dioxide levels in the environment, when the lights are turned on, how often a motion sensor is activated, etc.). In some cases, these reports may be communicated to a remote entity via a network such as the Internet.

Light meter/camera 330 may be any device configured to measure a wavelength, intensity, and/or fluence of electromagnetic radiation (e.g., infrared, visible, and/or far UVC light) incident thereon and report same to, for example, sanitization device 100 and/or a system (e.g., system 401 and/or 402) or computer system. In some instances, light meter/camera 330 may be similar to light meter, fluence and/or coverage area detector 1010 discussed below.

Figure 4A:
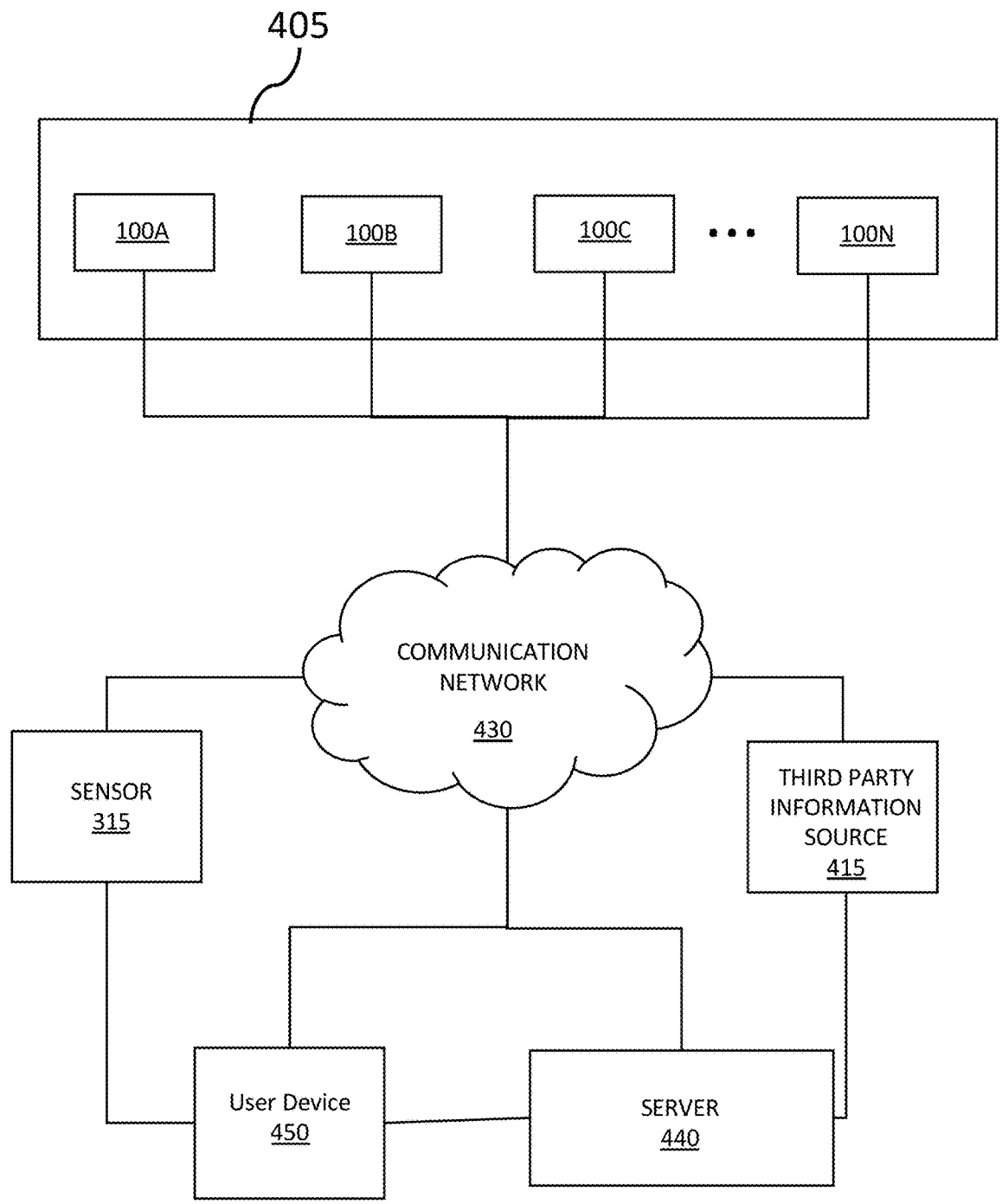
FIG. 4A is a diagram of a first exemplary system deploying a plurality of communicatively connected sanitizing devices, according to embodiments of the present invention.

FIG. 4A is a diagram of a first exemplary system 401 deploying a set 405 of sanitizing devices 100 and/or 100 communicatively connected to on another via a communication network such as the Internet, a mesh network, a private network, and/or a local area network (LAN). System 401 also includes a user device 450, such as a computer, smart phone, or tablet through which a user may interact with one or more of the components of system 401 to receive, for example, information and/or status reports therefrom and/or an environment protection plan, or portions (e.g., scheduling for a duty cycle of one or more sanitizing devices included in system 410 thereof, environment layouts, information regarding risk zones of an environment, etc.). A user may also input information (e.g., environment dimensions, uses for the environments, head counts of people within the environment, cleaning schedules, sanitizing protocols, air flow information, etc.) into user device 450 for uploading to, for example, server 440 via communication network 430. In some embodiments, user device 450 may be configured and/or enabled to provide information such as position (e.g., GPS coordinates, radio frequency signals, and/or Wi-Fi signals) to, for example, one or more sanitizing devices 100 and/or server 400. This communication may be via, for example, communication network 430 and/or a near field communication protocol such as BLUETOOTH™.

Set 405 may have any number (e.g., 2-500) sanitizing devices 100 that may be arranged in any configuration. For example, all sanitizing devices 100 in a set may reside in an environment (e.g., room or region of a room), a building, or a set of buildings. In another example, sanitizing devices 100 in a set may be geographically disperse from one another (e.g., spread out over a housing development, strip mall, set of businesses operating under unified management, and/or a set of users who are subscribers to a service for monitoring and/or controlling the use sanitizing devices 100 within the respective environments for the sanitizing devices 100).

In the example of FIG. 4A, set 405 include sanitizing devices 100A, sanitizing devices 100B, sanitizing devices 100C through to sanitizing devices 100N. Set 405 and/or individual sanitizing devices 100A, sanitizing devices 100B, sanitizing devices 100C through to sanitizing devices 100N may be communicatively coupled to one or more sensors 315, a server 440, and/or a third-party information source 415 via communication network 430. Communication network 430 may be, for example, the Internet and/or a mesh network. One or more sensors 315 may be configured to, for example, monitor one or more aspect of an environment in which sanitizing devices 100A, sanitizing devices 100B, sanitizing devices 100C through to sanitizing devices 100N are placed. Server 440 may be configured (via, for example, a set of instructions stored thereon) to monitor and/or control operations for sanitizing devices 100A, sanitizing devices 100B, sanitizing devices 100C through to sanitizing devices 100N according to, for example, one or more methods disclosed herein. The monitoring of sanitizing devices 100A, sanitizing devices 100B, sanitizing devices 100C through to sanitizing devices 100N may include, but is not limited to, determining when sanitizing devices 100A, sanitizing devices 100B, sanitizing devices 100C through to sanitizing devices 100N, respectively, are on or off, determining what, if any, data sanitizing devices 100A, sanitizing devices 100B, sanitizing devices 100C through to sanitizing devices 100N, respectively, are receiving from one or more sensors like sensor 315, controlling a position and/or orientation of sanitizing devices 100A, sanitizing devices 100B, sanitizing devices 100C through to sanitizing devices 100N, respectively, and/or monitoring sanitizing devices 100A, sanitizing devices 100B, sanitizing devices 100C through to sanitizing devices 100N, respectively, for one or more error conditions. In some embodiments, server 440 may be configured to be operated by a user of system 400 via one or more control panels or computer user interfaces that may be displayed on a display device such as display device 222 discussed below with regard to FIG. 2.

Third party information source 415 may be any source of information that may provide information that is helpful to the monitoring and/or controlling of one or more sanitizing devices 100A, sanitizing devices 100B, sanitizing devices 100C through to sanitizing devices 100N included in within set 405. Exemplary third-party information sources include websites, subscription databases, governmental information sources, environmental data aggregation and/or control platforms that, in some cases, may be Internet enabled, and/or databases. In one example, a third-party information source may be a governmental agency in charge of population health data (e.g., the Centers for Disease Control (CDC)) and server 440 may query third party information source 415 for information pertaining to disease infection rates, which may be geographically specific. Server 440 may then use this information to control the operation of one or more sanitizing devices 100A, sanitizing devices 100B, sanitizing devices 100C through to sanitizing devices 100N/1. For example, if sanitizing devices 100A and sanitizing devices 100B are positioned within a county with relatively high disease infection rates, then server may responsively control an operation of sanitizing devices 100A and/or sanitizing devices 100B so that they operate more frequently and/or for a longer time in order to sanitize environments in that county to mitigate the risks associated with a higher rate of infection in the county. In another example, if all the sanitizing devices 100 included within set 405 are positioned in a city, then server 440 may query third party information source for information regarding the average and/or high temperature in the city so that operation of one or more of the sanitizing devices 100A, sanitizing devices 100B, sanitizing devices 100C through to sanitizing devices 100N may be adjusted accordingly (e.g., more frequent operation when average/high temperatures are conducive to bacteria/pathogen growth and less frequent operation when average/high temperatures are not conducive to bacteria/pathogen growth).

Figure 4B:
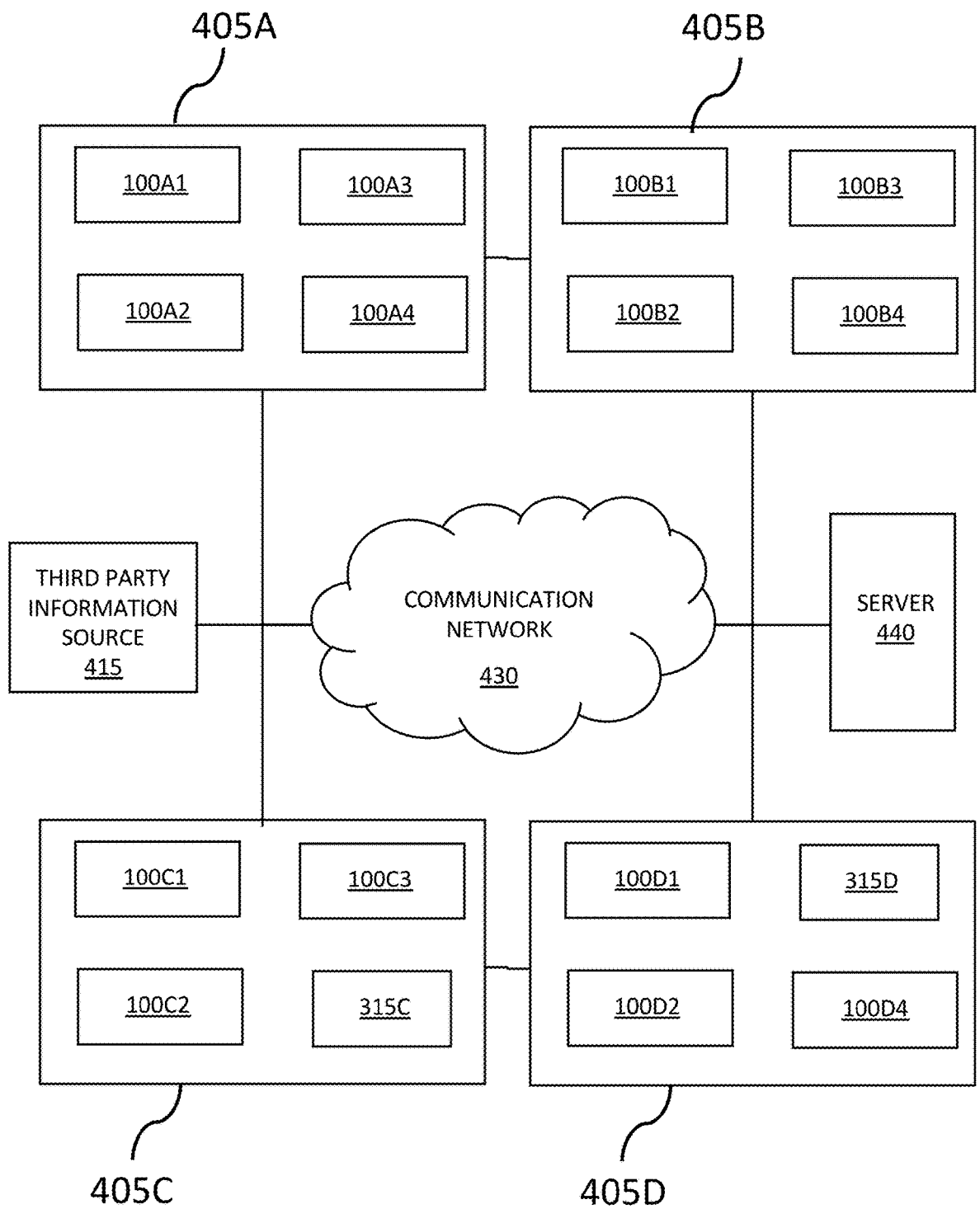
FIG. 4B is a diagram of a second exemplary system deploying a plurality of communicatively connected sanitizing devices, according to embodiments of the present invention.

FIG. 4B is a diagram of a second exemplary system 402 including a plurality of sets of communicatively connected sanitizing devices 405A, 4056, 405C, and 405D that are communicatively coupled to server 440 and/or third-party information source 415 via communication network 430 and/or wired communication links. More specifically, system 402 includes a first set of four sanitizing devices 100A1, 100A2, 100A3, and 100A4; a second set 4056 of four sanitizing devices 100B1, 100B2, 100B3, and 100B4; a third set 405C of three sanitizing devices 100C1, 100C2, 100C3, and a sensor 315C; and a fourth set 405D of three sanitizing devices 100D1, 100D2, 100D3, and a sensor 315D. It will be understood by those of skill in the art that system 402 may have any number (e.g., 2-1000) sets of communicatively connected sanitizing devices 405.

System 402 may operate in a manner similar to system 401 but on a larger scale with a plurality of four sets of sanitizing devices. In the example of FIG. 4B, four sets of sanitizing devices are shown and, in some cases, a sensor 315 may be included in a set 405 as is the case with third and fourth sets 405C and 405D. Sensor 315 positioned within a set 405C and/or 405D may monitor one or more environmental conditions and/or perform operations that may be communicated to, for example, sanitizing devices included in set 405C or 405D, respectively, first and/or second set 405A and/or 405B, and/or server 440.

In some embodiments, sanitizing device 100 may be configured to communicate with one or more additional devices (e.g., sanitizing device 100, server 440, sensor 315, third party information source 415, and/or devices resident within communication network 430 via a mesh network. In one embodiment, two or more sanitizing devices 100 may be deployed and a first sanitizing device 100 may be communicatively coupled to the Internet and the second sanitizing device 100 may not be communicatively coupled to the Internet because, for example, it has poor access to Wi-Fi and/or is housed in an environment that disrupts Wi-Fi communication such as a Faraday cage, an elevator, or in a steel-framed building and/or for an economic and/or implementation advantage to having only some sanitizing devices not be communicatively coupled to the Internet. Utilization of a mesh network between the first and second sanitizing devices 100 allows second sanitizing device 100 to indirectly communicate with the communication network 340 in order to, for example, provide one or measurements taken by the device, operational logs regarding, for example, times of use and/or duration of use, and/or error conditions to first sanitizing device 100 and/or receive information (e.g., instructions or operational data) from first sanitizing device 100. Additionally, or alternatively, utilization of a mesh network may be utilized to accesses information about and/or send control signals to one or more sanitizing device 100, determine when to couple directly to, for example, Wi-Fi, a software application, and/or the Internet when setting up and/or operating through a mesh network, and/or to facilitate control of, and/or cooperation between, a plurality of sanitizing devices 100.

Figure 5:
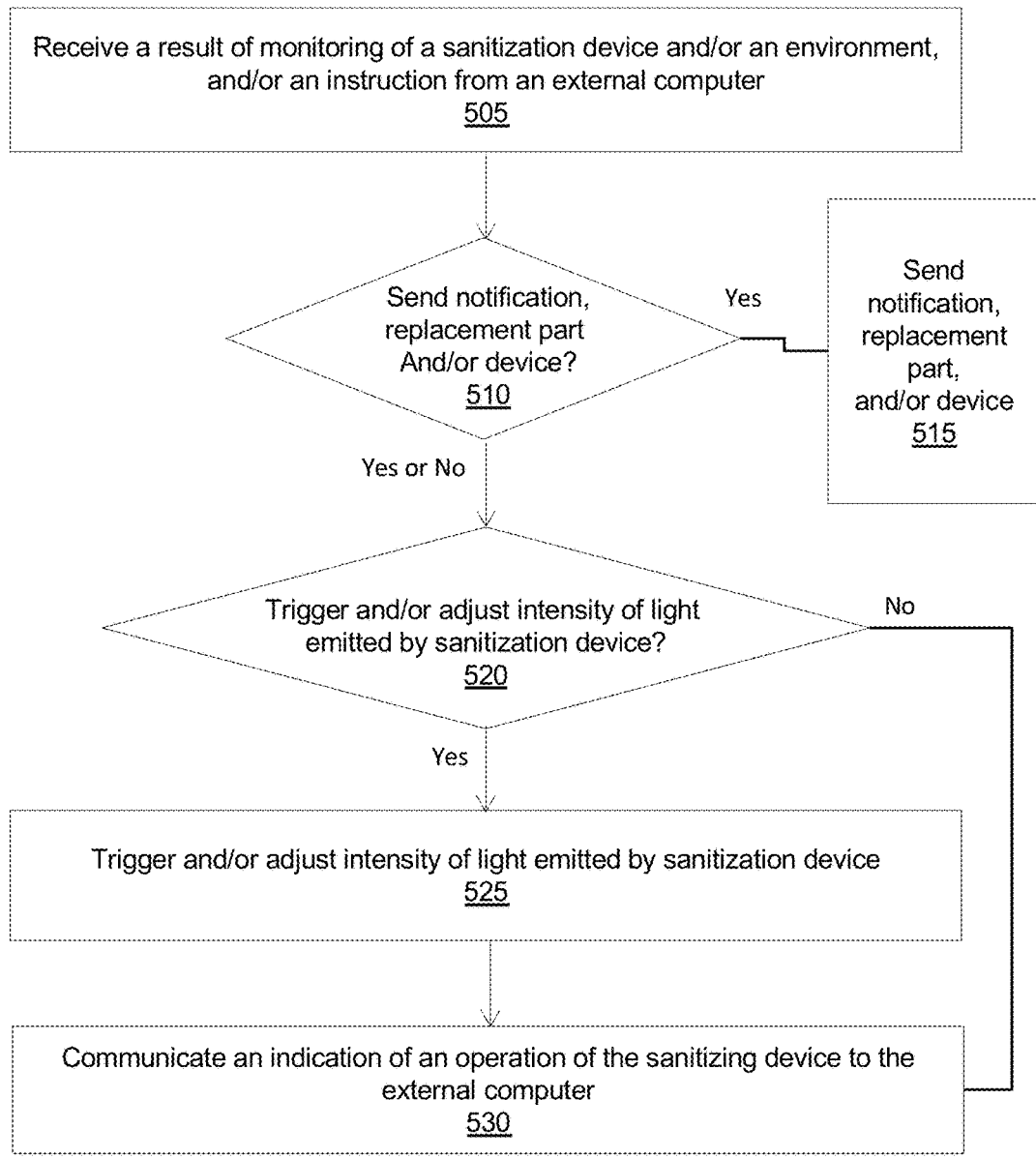
FIG. 5 is a flowchart illustrating a process for operating a sanitizing device, according to embodiments of the present invention.

FIG. 5 is a flowchart illustrating a process 500 for operating a sanitizing device like sanitizing device 100. Process 500 may be executed by, for example, sanitizing device 100, system 401, system 402, and/or components thereof.

In step 505, a result of monitoring of the sanitizing device and/or an environment and/or an instruction from an external computer, such as server 440, may be received by a sanitizing device such as sanitizing device 100. In some embodiments, the monitoring result may be received from a sensor resident within a housing for the sanitizing device, such as sensor 140. Additionally, or alternatively, the monitoring result may be received from an external monitor, such as monitor 315 shown in FIGS. 3, 4A, and 4B and discussed above. Exemplary monitoring results include, but are not limited to, a change in an ambient temperature, humidity, condensation, a sensed motion, a lack of sensed motion, an amount of current the sanitizing device uses over a period of time, an amount of ozone emitted by the sanitizing device and/or a component thereof, and/or an indication of air motion, humidity, condensation, and/or steam within an environment. In some embodiments, the monitoring result may be from a temperature sensor that monitors a temperature of the sanitizing device so that it may be automatically turned off by, for example, a switch such as switch 145, a controller and/or external device such as server 440, and/or an operator in the event of overheating or other malfunction. Additionally, or alternatively a result of the monitoring may be provided to a service or software application that manages and/or controls the sanitizing devices and/or In step 510, a determination of whether a notification and/or replacement part (or sanitizing device) may be made based upon, for example, analysis of the received result and, if so, the notification and/or replacement part (or sanitizing device) may be sent (step 515). For example, if a sanitizing device has used a light source such as sanitizing light source 130 for a time period close to the expected, or optimized, lifetime of the light source (as determined via execution of step 510) then, a notification and/or replacement part (or sanitizing device) may be sent to a user (step 515).

Whether a notification and/or replacement part (or sanitizing device) is sent, in step 520, the received monitoring result may be analyzed to determine whether an intensity of light (in most cases light of a wavelength within the far UVC range) and/or duty cycle for the sanitizing device emitted by the sanitizing device should be adjusted (e.g., increased or decreased) and/or if an operation of the sanitizing device should be triggered (e.g., should the sanitizing device be turned on or off) and, if so, an operation of the sanitizing device may be triggered and/or adjusted accordingly (step 525). When an operation of the sanitizing device is not triggered and/or adjusted (step 520) or following execution of step 525, an indication of the operation of the sanitizing device (e.g., when the sanitizing device is turned on/emitting far UVC light; when the sanitizing device is off; when an intensity of the sanitizing device is adjusted) may be communicated to an external computer (e.g., server 440) and/or a personal computing device (e.g., smart phone or tablet computer) operated by a user via a display device like display device 222 (step 530). In some embodiments, execution of step 530 includes preparation of a report including sanitization levels and/or results (e.g., pathogen load and/or pathogen neutralization) for the environment.

Figure 6:
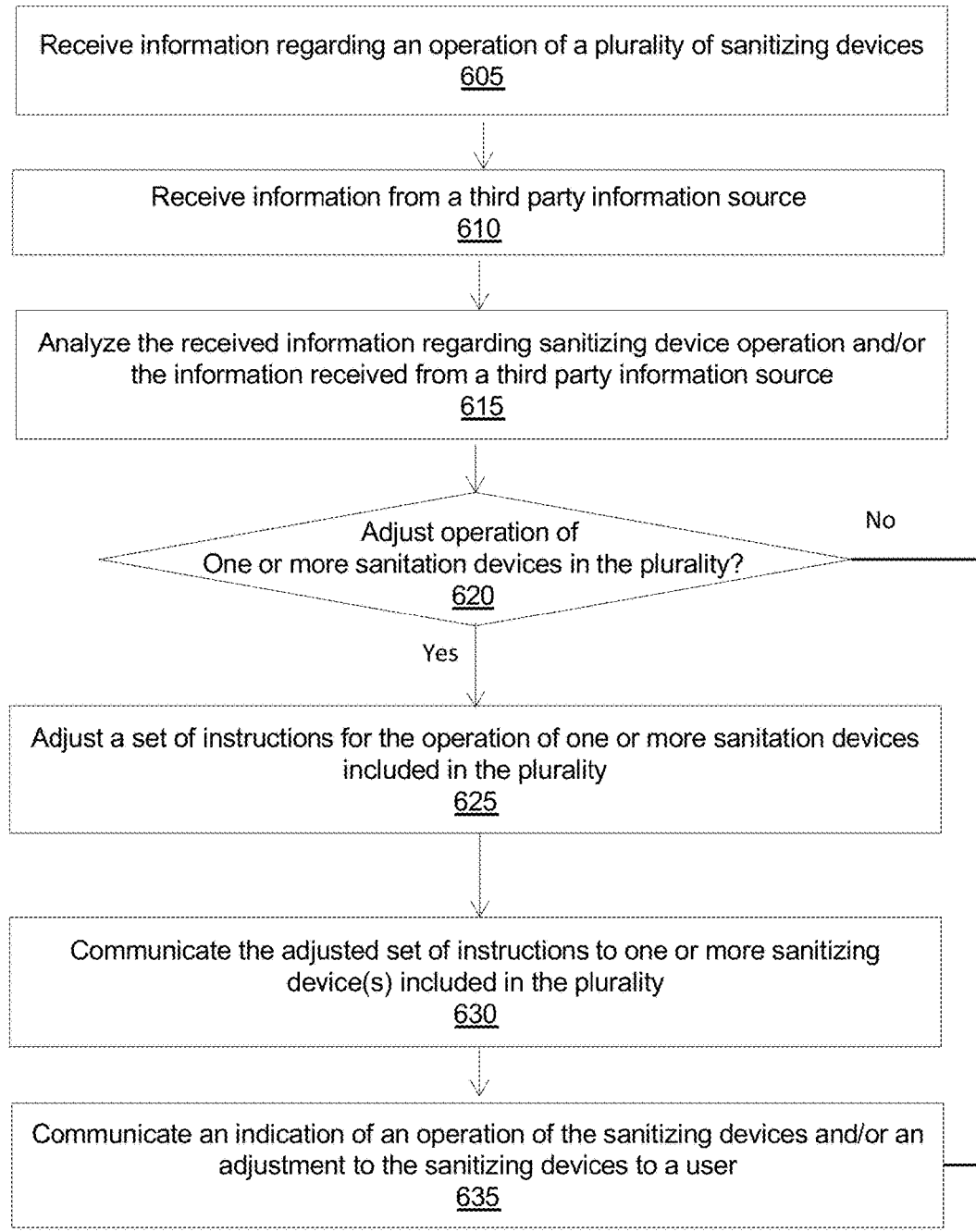
FIG. 6 is a flowchart illustrating a process for centrally operating a plurality of sanitizing devices, according to embodiments of the present invention.

In one embodiment, process 500 may incorporate receipt of an indication of a potential pathogen load within an environment and/or sanitizing light fluence emitted into the environment. Indications of potential pathogen load provide an indication of how many pathogens (e.g., virus and/or bacteria particles) may be present and/or are likely (or predicted) to be within the air and/or on surfaces present within, an environment. Indications of potential pathogen load include, but are not limited to, a count of a number of people (and, in some cases, animals) within the environment, an indication of how long the people are, have been, and/or are expected to be within the environment, a level of air flow and/or air exchange within the environment, whether a degree to which the environment is exposed to external airflow via, for example, a window or door, whether a pathogen source (e.g., food or sick individuals) are present within the environment, a level of humidity, temperature, a count of a number and/or type of pathogens within an air sample from the environment, a count of a number of pathogens present on a surface within the environment, whether water vapor and/or pathogens may, and/or are expected to be, aerosolized within the environment (as may occur within a lavatory or kitchen), In some embodiments, the indication of potential pathogen load may be modeled using, for example, machine learning and/or artificial intelligence. Parameters of an environmental pathogen load model may, for example, measured and/or calculated values of, for example, pathogens present within the air and/or on surfaces of an environment FIG. 6 is a flowchart illustrating a process 600 for centrally operating a plurality and/or set of sanitizing devices such as the sets of sanitizing device included in systems 401 and 402. Process 600 may be executed by and/or in, for example, server 440, system 401, system 402, and/or components thereof.

In step 605, information regarding an operation of one or more sanitizing devices, such as sanitizing device 100 and/or a set of sanitizing devices like set 405, 405A, 405B, 405C, and/or 405D may be received. The information that is received may be, for example, information regarding how long the sanitizing device is in operation and/or when the sanitizing device may need a new sanitizing light source (e.g., light bulb).

A schedule, of operation and/or intensity adjustments for one or more of the sanitizing devices providing information may be received in step 605. The schedule may be used to optimize sanitizing of an environment when, for example, people are likely to be in the environment, when food is likely to be prepared and/or served within an environment, and/or when people are unlikely to be in the environment.

Optionally, information from one or more sensors like sensor 140 and/or 215 may also be received in step 605. Exemplary information that may be received from the one or more sensors includes, but is not limited to, a degree of activity indicated by the sensor, air purification rates, a number of times a motion sensor is activated (e.g., motion is detected) in a time period (e.g., every hour, every 12 hours, every 24 hours, etc.), a number of particulates in the ambient air of an environment, a temperature of an environment, and a position of objects within an environment.

Optionally, in step 610, information from a third-party information source, such as third-party information source 415 may be received. Exemplary third party information includes, but is not limited to, an air quality index (AQI) measurement, a temperature, a level of humidity, and/or an indication of how many individuals within a geographic area are diagnosed with a disease (e.g., the flu, COVID-19, the common cold, etc.), population, or crowd size, counts, audio information about an environment (e.g., conversation noise level), how many times a certain sound (e.g., a tone a machine makes when it is finished executing a process such as processing a credit card or scanning a bar code is heard, etc.) and/or video information that may, for example, track how many people are in a certain space over time.

In step 615, the information received in step 605 and 610 (when received) may be analyzed to determine whether an adjustment in the operation of one or more sanitizing devices included in the plurality of sanitizing devices may be necessary (step 620) and, if so, a set of instructions pertaining to the operation of one or more sanitizing devices included in the plurality of sanitizing devices may be adjusted according to the analysis (step 625) and communicated to the respective one or more sanitizing devices included in the plurality of sanitizing devices (step 630). When an adjustment is not necessary in step 620 and/or following completion of step 630, an indication of an operation of the sanitizing devices and/or an adjustment to the operation of the sanitizing devices may be provided to the user via, for example, a graphic user interface displayed on a display device (step 635).

Figure 7:
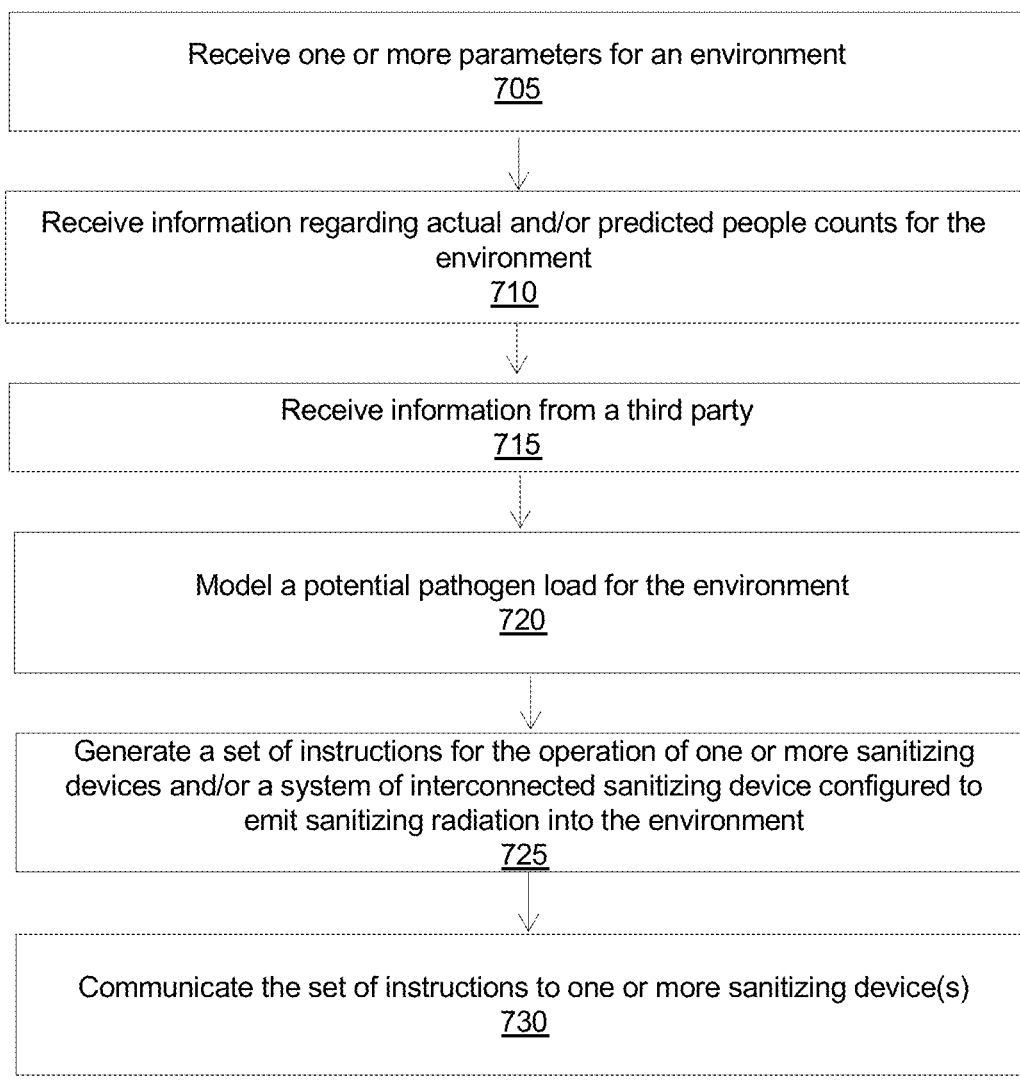
FIG. 7 is a flowchart illustrating a process for modeling a potential pathogen load for an environment, generating a set of instructions for the operation of one or more sanitizing devices like operating a sanitizing device, and communicating the set of instructions to the respective sanitizing device(s) and/or system(s), according to embodiments of the present invention.

FIG. 7 is a flowchart illustrating a process 700 for modeling a potential pathogen load for an environment, generating a set of instructions for the operation of one or more sanitizing devices like operating a sanitizing device like sanitizing device(s) 100 and/or systems system 401 and/or 402, and communicating the set of instructions to the respective sanitizing device(s) and/or system(s). Process 600 may be executed by, for example, sanitizing device 100, system 401, system 402, computing system 800, and/or components thereof. In some embodiments, process 600 may be executed by a processor, or a set of connected processors, that may be resident and/or coupled to a cloud computing environment.

Initially, in step 705, one or more parameters and/or characteristics of an environment may be received. The environment may be interior and/or exterior. Exemplary characteristics include, but are not limited to, size, shape, purpose, capacity, contents (e.g., furniture, surfaces, etc.), heating and/or air conditioning characters for the environment, air quality, humidity, temperature, a rate of air flow within the environment, a rate of air replacement with outside air within the environment, whether there are any high-traffic areas within the environment and, if so, what characteristics (e.g., location, percentage of the environment that includes a high-traffic area, of the high traffic present themselves, high-touch surfaces, and combinations thereof. In some embodiments, the parameters and/or characteristics received in step 705 may be received from a sensor or monitor inside and/or outside the environment and/or a sensor resident within one or more sanitization devices present within the environment such as sensor 140. In some embodiments, execution of step 705 may include receipt of environment dimensions, locations within the environment where sanitizing devices are located, schedules for the operation of sanitization devices within the environment, suggestions for where in an environment to place a sanitizing device, a manner in which to optimize usage and/or placement of sanitizing devices within the environment, and/or a distance between one or more sanitizing devices projecting sanitizing light into the same environment, and a wall, ceiling, floor of the environment and/or surface within the environment.

Optionally, parameters for one or more sanitizing devices within the environment may be received in step 705. Exemplary parameters include a schedule of operation, a fluence, irradiance, intensity, power, magnitude, and/or strength, of the sanitizing radiation emitted by the sanitizing device, an emission path and/or surface area to which each sanitizing device may emit, how long a sanitizing device can emit sanitizing radiation without overheating, whether, and how, sanitizing radiation from a plurality of sanitizing devices within the environment may overlap with one another, a count of people present in the environment, a density of people in all and/or a portion of the environment, environment and/or room layout, physical obstructions (e.g., cubicle walls, sculptures, etc.) that may be present in the environment, air flow within the environment, air exchange within the environment, whether the environment is exposed to open air, whether the environment includes areas within it that do not have sufficient air flow and/or exchange and, if so, what the dimensions of these areas are, how many sanitizing devices there are needed and/or preferred to establish adequate sanitization within the environment, whether sanitizing light from two or more sanitizing devices overlaps, how far the sanitizing device(s) are from surfaces within the environment, features of previous utilization of the one or more sanitizing devices in the same and/or similar environments and/or applications, and/or how much electrical current a sanitizing device is expected to draw when in operation. A density of people within an environment may be determined via, for example, dividing a number of people within the environment (or expected to be within the environment) by square footage and/or cubic footage of the environment and/or a portion of the environment.

In step 710, information regarding an actual and/or predicted people count for, and/or flow of people who may be moving into and/or out of, the environment may be received and/or calculated. When an actual people count is received, it may be received from, for example, a motion sensor, thermal sensor, camera, ticket counter, and/or turnstile that counts a number of people moving across its path. When a predicted people count is received, the prediction may be based on, for example, historical use for the environment and/or capacity for the environment to hold people.

Optionally, in step 715, information relevant to a potential pathogen load for the environment may be received from a third party such as a weather service and/or a department of health. Exemplary third-party information includes, but is not limited to, temperature, humidity, and/or rates of disease and/or infection in a geographic location. A pathogen load may, at times, be determined using a swab test for viruses and/or bacteria counts and/or information from third parties and/or pathogen detection sensor(s).

In step 720, a model of a potential pathogen load for the environment may be generated using, for example, information received in step(s) 705, 710, and/or 715. The model may include, for example, predicted, or modeled, pathogen loads for the environment at various times of day, month, year, etc. Additionally, or alternatively, the model may include predicted, or modeled, pathogen loads for the environment that are responsive to information received from the third party. For example, if the environment is situated in a geographic area (e.g., county or city) that is experiencing an elevated rate of infection of individuals diagnosed with a communicable disease that may be spread via, for example, touching contaminated surfaces and/or inhaling contaminated air (e.g., influenza, respiratory disease, SARS-CoV2, E. coli, norovirus, etc.), then a modeled potential pathogen load may be adjusted accordingly by, for example, application of an elevated potential pathogen risk to the environment that may be, for example, proportional to the infection rate and/or actual and/or predicted people count within the environment.

In some embodiments, the model generated in step 720 may be compared with, for example, experimentally determined pathogen load(s) for the environment in order, for example, validate the model and/or iterate or otherwise update the model. Additionally, or alternatively, execution of step 720 may include use of experimentally determined pathogen load(s) for the environment when generating the model.

In step 725, a set of instructions for the operation of one or more sanitizing devices configured to emit sanitizing radiation into the environment may be generated based upon the modeled potential pathogen load for the environment. The set of instructions may include, for example, operation times (e.g., a schedule or on/off cycle) and/or conditions for one or more of the sanitizing devices, and/or how a plurality of sanitizing devices may be coordinated to achieve a desired level of sanitization within an environment. Additionally, or alternatively, the set of instructions may include instructions to control an intensity, or power, of sanitizing radiation emitted by one or more sanitizing devices, schedules for alternating and/or synchronizing use of two or more lamps positioned in an environment, and/or providing instructions that make operations of one or more sanitizing devices dependent on one or more environmental conditions (e.g., people count, air flow in the environment, what the environment is being used for, etc.) In step 730, the set of instructions may be communicated to the one or more sanitizing devices configured to emit sanitizing radiation into the environment.

Figure 8:
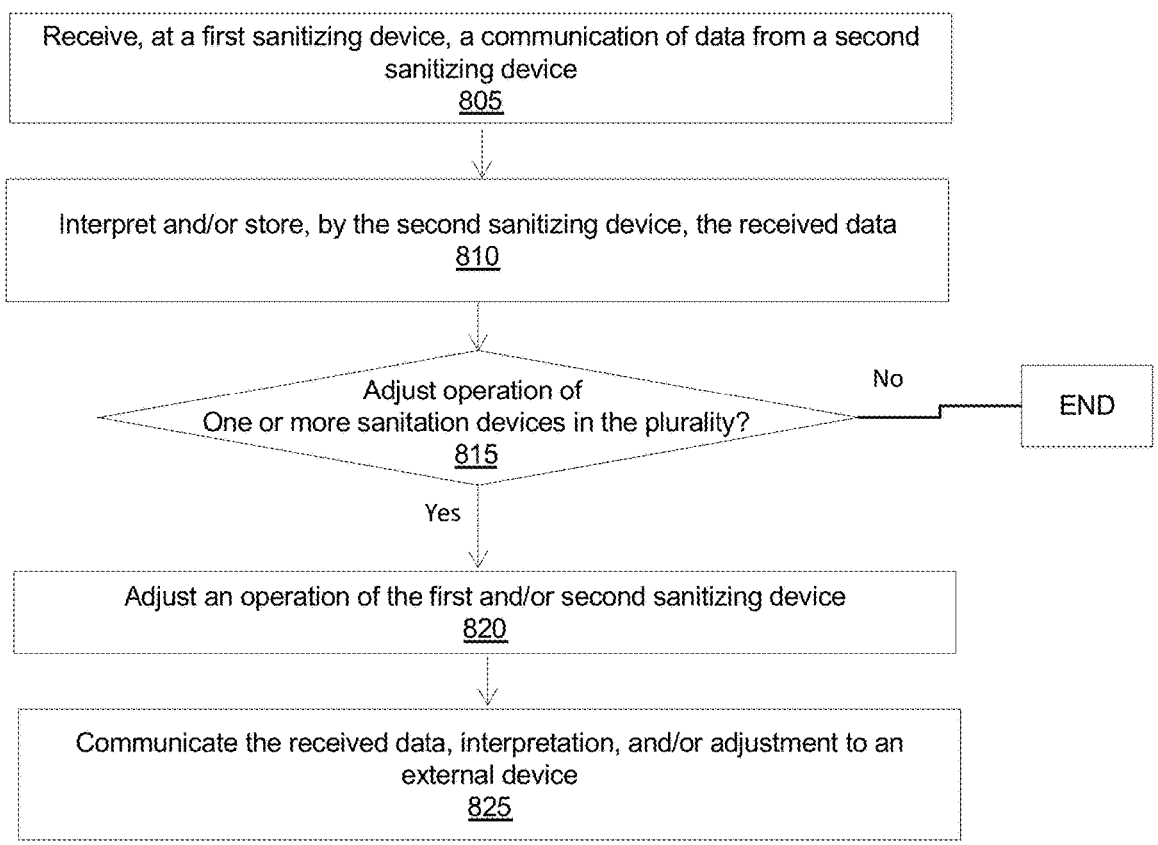
FIG. 8 is a flowchart illustrating a process for communication between a first and a second sanitizing device operating in the environment and modifying an operation of the one or more sanitizing devices responsively to the received communication, according to embodiments of the present invention.

FIG. 8 is a flowchart illustrating a process 800 for communication between a first and a second sanitizing device operating in the environment and modifying an operation of the one or more sanitizing devices responsively to the received communication in order to, for example, provide sanitizing radiation within the environment sufficient to sanitize the environment by killing 80-99.999% of the pathogens therein. Process 800 may be executed by, for example, sanitizing device 100, system 401, system 402, computing system 200, and/or components thereof.

In step 805, a first sanitizing device may receive data communicated from a second sanitizing device. Exemplary data received in step 805 includes, but is not limited to, data regarding operation (run times, ozone emission, current draw, etc.) of the second sanitizing device, instructions regarding an operation of the first sanitizing device, and/or data from a third party relayed to the first sanitizing device from the second sanitizing device.

The received data may then be interpreted by, for example, a processor resident in the first sanitizing device and/or stored in, for example, a memory resident within the first sanitizing device (step 810). Interpretation of the received data includes, but is not limited to, determining how often and/or to what degree to sanitize the environment, determining whether an amount of radiation emitted by the first and/or second sanitizing device is sufficient to sanitize the environment (e.g., environment 1000) and/or an object therein. In step 915, it may be determined whether an adjustment to an operation (e.g., run time, a position of a sanitizing device, on/off time, duty cycle, schedule, fluence, intensity of sanitizing radiation emitted, etc.) of the first and/or second sanitizing device is needed to, for example, optimize sanitizing device operation and/or sanitization of the environment and/or an object therein. If not, then process 800 may end. If so, then an operation of the first and/or second sanitizing devices may be adjusted (step 820). In some embodiments, an adjustment of an operation of the first and/or second device may be triggered by, for example, an indication from one of the sanitizing devices is not operating properly (e.g., emitting too much, or not enough, sanitizing radiation, ozone, or heat (e.g., may be over heating)) and, in these instances, the malfunctioning sanitizing device may be turned off and other sanitizing devices in the environment may be provided with instructions that instruct the other sanitizing devices to adjust their operation (e.g., expand an area subject to the sanitizing radiation, redirect sanitizing radiation, operate for a longer duration of time) to sanitize a portion of the environment that would otherwise be covered by the malfunctioning sanitizing device, and/or compensate for the total amount of sanitization energy and/or radiation within a volume of space with airflow between zones, or portions of the environment. Optionally, an indication of the adjustment may be communicated to an external device such as a computer or processor for storage and/or further analysis (step 825).

Figure 9:
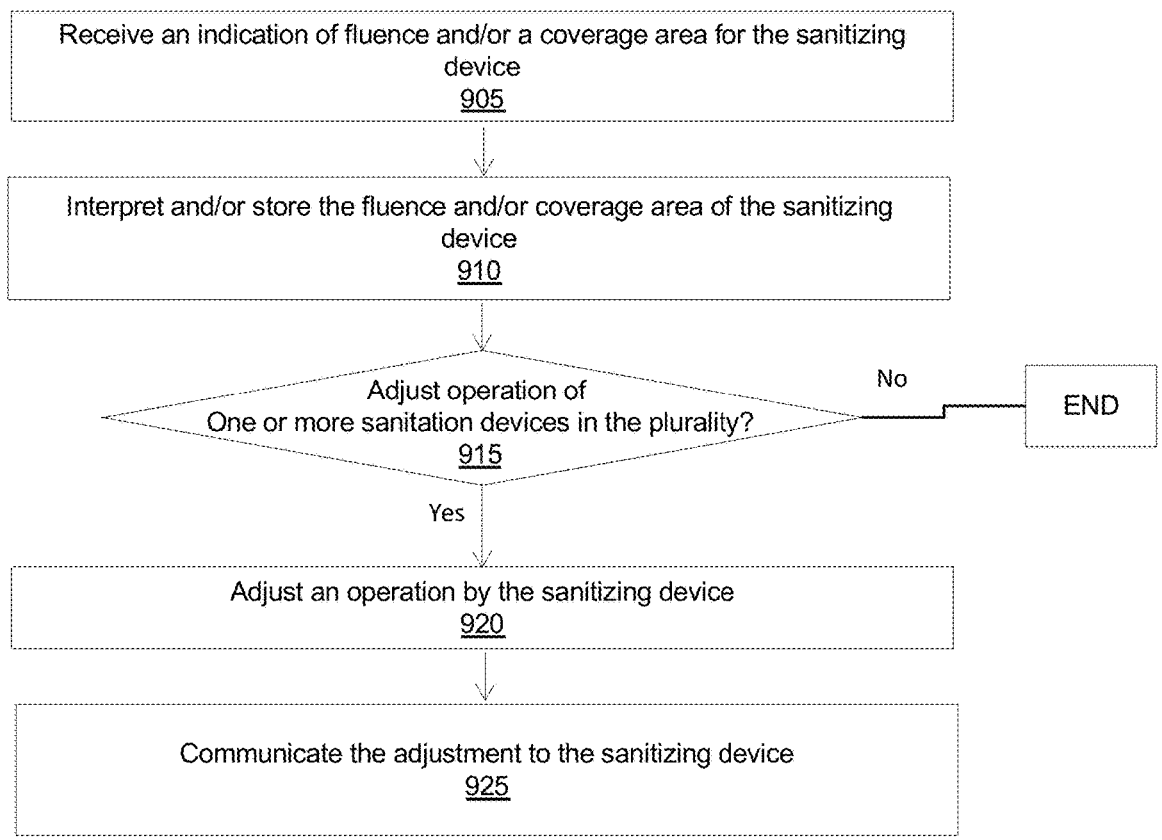
FIG. 9 is a flowchart illustrating a process for directly and/or indirectly determining a level of fluence, or an intensity of sanitizing radiation, emitted by one or more sanitizing devices operating in an environment and/or a sanitizing radiation coverage area for the one or more sanitizing devices operating in the environment and modifying an operation of the one or more sanitizing devices responsively to the determined fluence level and/or coverage area, according to embodiments of the present invention.

FIG. 9 is a flowchart illustrating a process 900 for directly and/or indirectly determining a level of fluence, an intensity of sanitizing radiation emitted by one or more sanitizing devices operating in the environment and/or sanitizing radiation incident on a surface or air volume in the environment, a sanitizing radiation coverage area for the one or more sanitizing devices operating in the environment and modifying an operation of the one or more sanitizing devices responsively to the determined fluence level and/or coverage area, and/or an amount of sanitizing radiation required to achieve a targeted level of pathogen reduction in an environment. Process 900 may be executed by, for example, sanitizing device 100, system 401, system 402, computing system 800, and/or components thereof.

Figure 10:
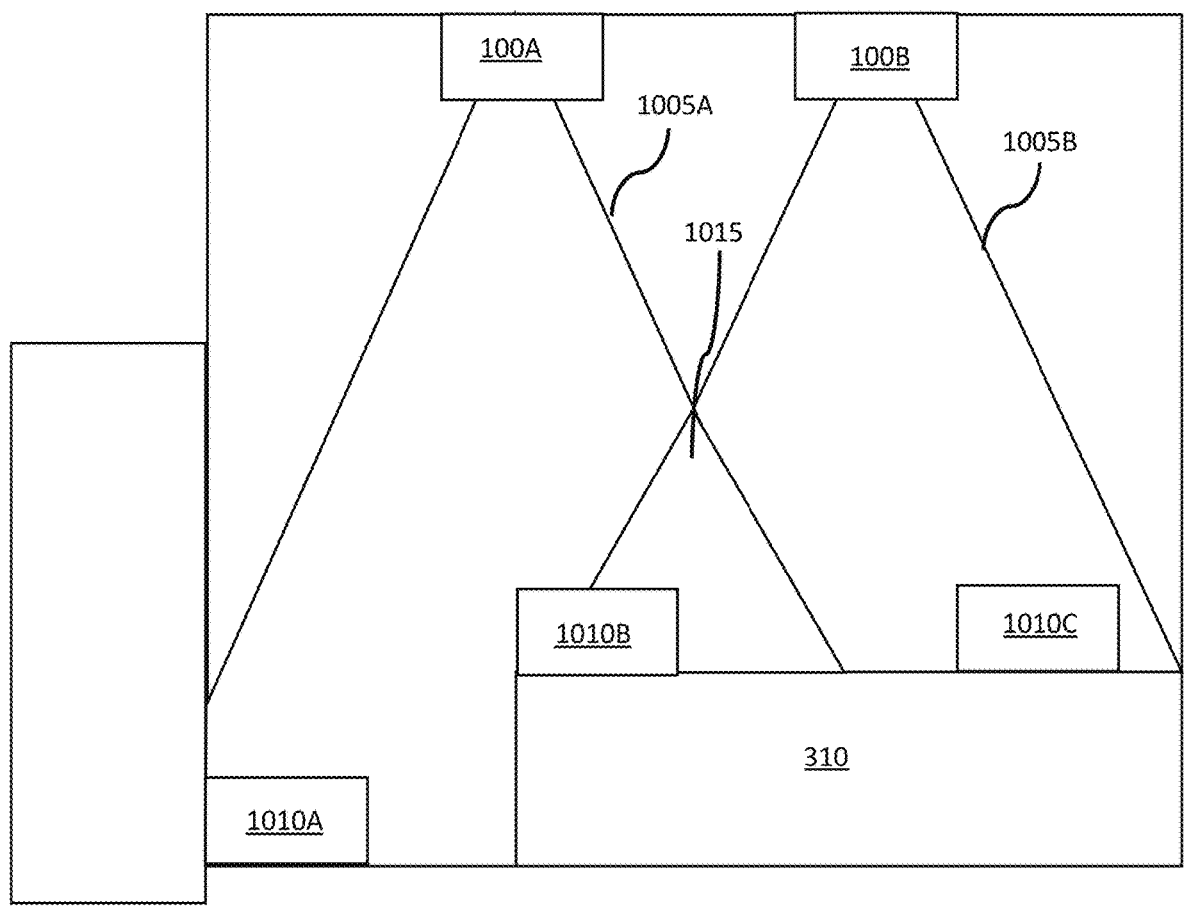
FIG. 10 is a side-view block diagram of an exemplary environment, according to embodiments of the present invention.

FIG. 10 is a side-view block diagram of an exemplary environment 1000 configured to execute process 900. Environment 1000 includes a plurality of sanitizing devices 100A and 100B that, in some embodiments, may be included in a system such as system 401 and/or 402 that emit sanitizing radiation in a first cone of radiation 1005A emitted by sanitizing device 100A) and a second cone of light 1005B (emitted by sanitizing device 100B) and possibly a third, fourth, etc. sanitizing devices and cones of light with an overlapping zone 1015 that includes a portion of the environment that falls within first cone of radiation 1005A and second cone of radiation 10056 and therefore is inundated with more sanitizing radiation than the portions of the environment exposed to first cone of radiation 1005A or second cone of radiation 10056. Environment 1000 also includes an object 310 (e.g., table or counter) and a plurality of light meters, fluence and/or coverage area detectors 1010A, 1010B, and 1010C. Exemplary light meters, fluence and/or coverage area detectors 1010A, 1010B, and 1010C are devices configured to measure an amount of light (e.g., UV, infra-red, visible, etc.) that may be emitted by, for example, one or more of the sanitizing devices 100 and/or a component thereof (e.g., non-UV light source 150 and/or sanitizing light source 130). Additionally, or alternatively, light meters, fluence and/or coverage area detectors 1010A, 1010B, and 1010C may be configured to measure the location, angle, distance of the light meters, fluence and/or coverage area detectors 1010A, 1010B, and 1010C relative to the sanitizing radiation emitting device via, for example, a radio frequency (RF) beacon or non-light-based signal to determine the expected degree of irradiance by geometrical calculations and or modelling.

In some cases, non-UV light source 150 and/or sanitizing light source 130 may be configured to emit modulated radiation that may be detected by a light meter, fluence, and/or coverage area detector. The detected modulated light may then be used to isolate light from the sanitizing device from ambient light so that an intensity, or power, of light emitted by sanitizing devices, fluence and/or coverage area detectors may be determined. Exemplary fluence and/or coverage area detectors include light meters, cameras, and/or smart phones that include a light meter and/or camera. As depicted in FIG. 10, first light meters, fluence and/or coverage area detector 1010A detects light 1005A emitted by first sanitizing device 100A, second light meter, fluence, and/or coverage area detector 1010B detects light 1005A emitted by first and second sanitizing devices 100A and 100B, and third fluence and/or coverage area detector 1010C detects light 1005A emitted by second sanitizing device 100B.

In some embodiments, non-UV light source 150 may be a laser or other device configured to emit a narrow beam of visible or non-visible (e.g., infrared) light radiation that emits light in, for example, a circular or conical diffraction pattern that resembles the pattern of sanitizing radiation emitted by the sanitizing device. The circle of light projected into a space or onto a surface (or surfaces) of an environment by a non-UV light source 150 configured this way may indicate a path of the sanitizing radiation when it is emitted into the environment.

In step 905 of process 900, an indication of a detected fluence and/or coverage area of a sanitizing device may be received by a processor or computing device from, for example, one or more light meter, fluence, and/or coverage area detectors such as fluence and/or coverage area detectors 1010A, 1010B, and 1010C.

The received indication(s) may then be interpreted and/or stored in, for example, a memory and/or database (step 910). Interpretation of the received indication(s) includes, but is not limited to, determining whether an amount of radiation incident on the one or more fluence and/or coverage area detector(s) is sufficient to sanitize the environment (e.g., environment 1000) and/or an object therein. In step 915, it may be determined whether an adjustment to an operation (e.g., run time, on/off time, fluence, intensity of sanitizing radiation emitted, etc.) is needed to sufficiently sanitize environment and/or an object therein. If not, then process 900 may end. If so, then an operation of the one or more sanitizing devices may be adjusted (step 920) and the adjustment may be communicated to the one or more sanitizing devices (step 925).

In some embodiments, data gathered from one or more sanitization devices may be communicated to a central processing and/or storage location, such as a server and/or a database. This data may be processed and/or analyzed in order to, for example, determine patterns (e.g., usage patterns, failure patterns, etc.) and/or develop or train models to predict, for example, sanitization device usage and/or efficacy. In some cases, the data may be categorized and/or organized according to one or more characteristics so that, for example, models and/or algorithms for the use of sanitization devices may be developed and/or adapted for using sanitization devices in situations that may share one or more of the characteristics. In this way, usage and/or efficacy patterns for the sanitization devices that are in use may be used to predict usage and/or efficacy patterns for newly installed sanitization devices. These patterns and/or models may be used to, for example, pre-program sanitization devices and/or provide pre-programmed options from which a user may select a pattern, or model, for use when setting up a sanitization device and/or modifying an operation thereof. At times, the modeling and/or algorithm development may implement one or more machine learning or neural network technologies, gradient descent or other solution convergence algorithms or software programs when, for example, searching for patterns in the data and/or developing models or routines for the use of sanitization devices in one or more types of situations and/or environments.

In some embodiments, the sanitization devices, monitors, and systems disclosed herein and/or data collected and/or gathered therefrom and/or received from a third party (e.g., local disease outbreak reports, individual human testing (e.g., swab tests or cultures), and/or swab tests of surfaces within an environment) may be analyzed and/or processed to develop, for example, models, predictions, and/or mitigation strategies for various situations, environments, and/or circumstances. At times, the models, predictions, and/or mitigation strategies may be developed using cross organization strategies and/or learning systems. For example, if data is collected regarding use of a sanitizing device or system from a pediatric ward of a hospital and processed, or input into a machine learning system to develop a model or routine for use; this model or routine may be used to develop a model and/or schedule of use for different type of organization such as a child day care center or elementary school. In another example, data is collected regarding use of a sanitizing device or system from a train station may be used to develop a model or routine/schedule of use for location that has high head count of people traveling through it per day such an airport, subway system, or shopping center/store.

Additionally, or alternatively, data from an audit or other inspection of an environment with regard to levels of sanitization within the environment may be used to build and/or update models and/or routines for usage for the sanitization devices, monitors, and systems disclosed herein.

In some embodiments, data collected and/or gathered from the sanitization devices, monitors, and systems disclosed herein may be used to identify patterns of use e.g., head counts correlated with time) for an environment and/or develop models for use of sanitization devices, monitors, and systems disclosed herein within the environment to provide effective sanitization and/or environment monitoring. In some cases, the data and/or identified patterns may be used, along with data from third parties, to develop a model and/or routine for use of sanitization devices, monitors, and systems disclosed herein. For example, if data is received from a public health department, public health agency, and/or medical facility (e.g., hospital) regarding an increase in individuals diagnosed with a virus or other infection proximate to a monitored environment, this information may be used to adjust the model and/or routine accordingly by, for example, increasing operation times for sanitization devices and/or systems and/or increasing an intensity of the sanitizing radiation emitted by same. In another example, the third party may be a source of information regarding where people within an environment have been and/or what potential pathogens they may have been exposed to. For example, if a group of people waiting in line at to exit an airplane are known to have been potentially exposed to pathogens due to, for example, someone on the airplane being sick and/or a departure airport is known to be located in a geographic region associated with a pathogen, sanitizing devices positioned proximate to the group of people waiting in line may be provided with instructions to sanitize the environment with a greater amount of sanitizing radiation (e.g., longer duration and/or greater intensity) than would otherwise be applied to the environment.

In another example, the third party may provide information concerning the potential presence of a food-born pathogen that may have contaminated a supply of food and this information may be used to change a schedule of operations for one or more sanitizing devices in the environment.

Figure 11:
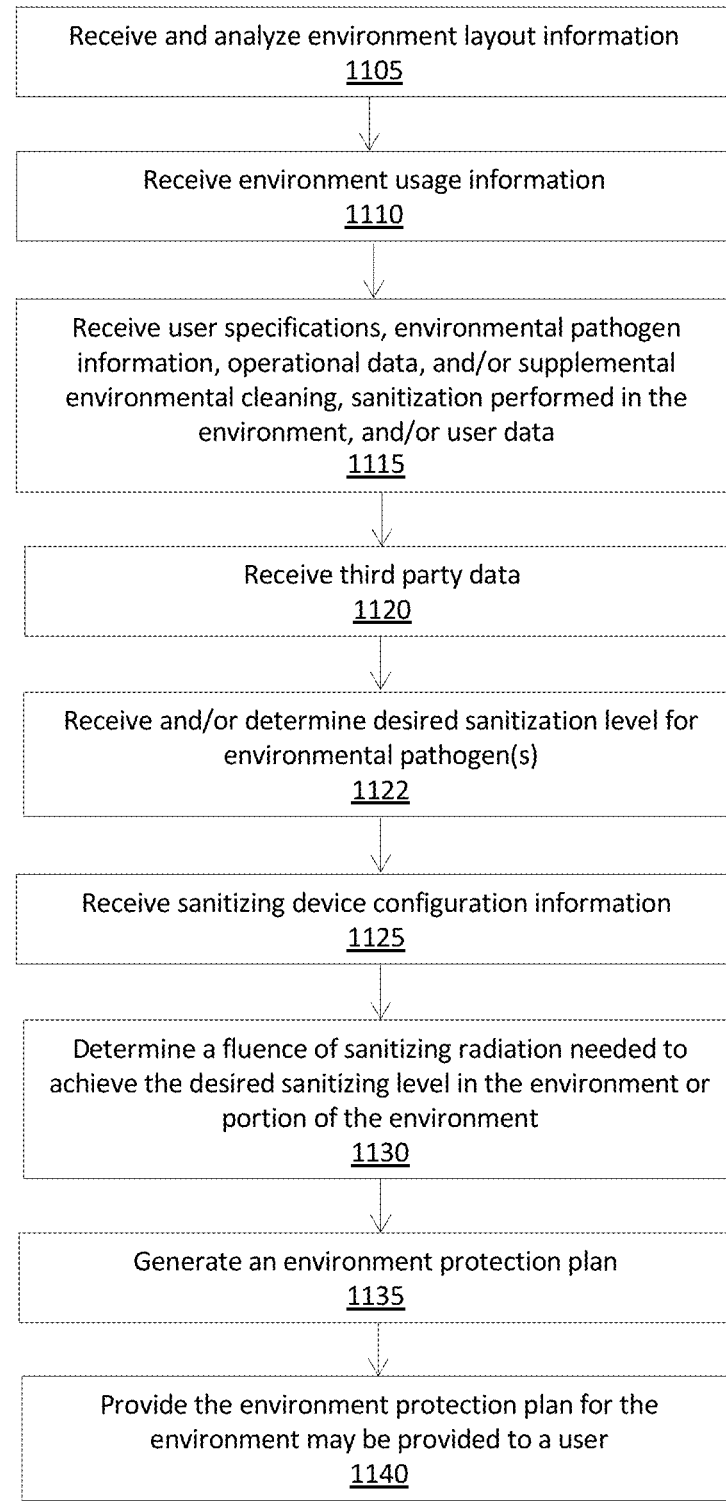
FIG. 11 provides a flowchart showing a process for the generation of a protection plan for an environment, in accordance with some embodiments of the present invention.

FIG. 11 is a flowchart illustrating a process 1100 for the generation of an environmental protection plan using one or more sanitizing device(s) like sanitizing device 100 for an environment. Process 1100 may be executed by, for example, any of the sanitizing device(s) and/or systems described herein. In some cases, one or more steps of process 1100 may be performed by and/or using a machine learning network such as a deep neural network. An environmental protection plan may be configured for operation and/or execution by one or more systems disclosed herein such as system 401 and/or system 402. Environmental protection plans may be configured to achieve desired levels of sanitization within an environment within a preferred time span (e.g., 3-45 minutes) and may include, for example, a layout of where sanitizing devices are to be positioned within an environment, types and parameters of utilization for the sanitization devices, schedules of operation for the sanitization devices, duty cycles of operation for the sanitization devices, instructions for the reporting of information from the sanitization devices to a software application managed by an operation and/or an administrator, instructions for inter-communication between the sanitization devices via, for example, a mesh network, Wi-Fi, and/or the Internet.

Initially, in step 1105, environmental layout information may be received and/or analyzed. Exemplary environmental layout information may include blueprints, environment dimensions, objects within the environment, orientations for one or more objects within the environment, whether the environment has any walls and, if so, where they are, a material comprising and/or covering one or more objects within the environment and/or doors, windows, and/or openings within and/or adjacent to the environment. Exemplary analysis of environment layout information includes, but is not limited to, determining where reflections, shadows and/or sanitizing radiation obstructions may be present within the environment. Additionally, or alternatively, environmental layout information may include and/or be a result of a spatial analysis of an environment. A spatial analysis may include, for example, information and/or an analysis of two-dimensional and/or three-dimensional space of the environment and/or zones within an environment. In some embodiments, a spatial analysis may include information about a volume of an environment/zone, airflow through an environment/zone, how human beings and/or sources of potential contaminants (e.g., food, high touch areas, trash cans, etc.) are positioned within a space and/or potential rates of airborne and/or surface/contact transmission of pathogens.

Optionally, in step 1110, environment usage information may be received. Exemplary environmental usage includes, for example, a purpose of the environment (e.g., food preparation, transportation hub, office building, elevator, conference room, etc.), how many people are typically in and/or transition through the environment and an average length of time people are present within the environment.

In step 1115, user specifications, environmental pathogen information, operational data, and/or supplemental environmental cleaning, sanitization performed in the environment, and/or user data may be received. Environmental pathogen information includes, but is not limited to, a pathogen load for the environment, a predicted or estimated pathogen load for the environment, types of pathogens that may be present within an environment and/or a level of sanitization (e.g., 80-99.99% sanitized) of these pathogens desired by the user.

Optionally, in step 1120, exemplary third party data may be received from, for example, third party information source 415 and may include, for example, types of pathogens detected in an area proximate to the environment such as a co-working space, adjacent businesses, city, or state.

In step 1122, a desired sanitization level (e.g., 80% reduction in pathogen count, 90% reduction in pathogen count, and/or 99.99% reduction in pathogen count) for the environment and/or a zone or portion of the environment may be received and/or determined. At times, information regarding how much sanitizing radiation must be projected into the environment (or a portion thereof) over how long a time period to achieve the desired sanitization level for one or more types of pathogens may also be received and/or determined via execution of step 1122. In some embodiments, the information received in step 1122 may be similar to that provided by graph 1704 of FIG. 17D, discussed below. Additionally, or alternatively, step 1122 may be performed by determining one or more pathogens that are of concern within a given environment and the desired reduction rate of those pathogens within the environment. For example, if the target pathogen is SARS CoV-2, the environment potentially has aerosolized SARS CoV-2 pathogens and SARS CoV-2 pathogens present on surfaces within the environment, and the time it takes to transmit an infectious does of the SARS CoV-2 pathogens between two people who are not wearing any facial covering (e.g., mask), may be fifteen minutes, the desired sanitization level may be set to a 90% reduction (e.g., 1 $\log_{10}$ reduction in pathogen count) in the count of active aerosolized SARS CoV-2 pathogens every 30 minutes and a 90% reduction (e.g., 1 $\log_{10}$ reduction in pathogen count) in the count of active SARS CoV-2 pathogens present on a surface within the environment every 15 minutes.

In step 1125, sanitizing device configuration information may be received. Sanitizing device configuration information includes, but is not limited to, fluence of sanitizing radiation emitted by the sanitizing device, a coverage area for the sanitizing device, an intensity of sanitizing radiation emitted by the sanitizing device, a desired level of sterilization of a particular pathogen, a desired timeframe for to achieve a target level of sanitization for a pathogen or group of pathogens, and operational parameters of the sanitizing device. In some embodiments, sanitizing device configuration information may include an average lifespan for sanitizing device components sanitizing radiation source like sanitizing light source 130, a sensor, like sensor 140, and/or a control system like control system 110 under, for example, usage condition as and/or duty cycle(s) recommended and/or required by the environmental protection plan. Additionally, or alternatively, sanitizing device configuration information may include information about error conditions that are and/or may occur with one or more sanitizing devices within an environment and the environmental protection plan for the environment may include one or more contingency plans for overcoming an error condition and/or instructions that may inform a user when an error condition has, or may, occur.

In step 1130, an intensity, irradiance level, and/or fluence of sanitizing radiation needed to achieve a desired level of pathogen sanitization within the environment, or a portion of the environment, may be determined and/or received. In some embodiments, the determined intensity and/or fluence of the sanitizing radiation may be responsive to human threshold limits for exposure of tissue (e.g., skin and/or eyes) to the sanitizing radiation as provided in, for example, graph 1704 of FIG. 17 so that, for example, sanitizing radiation dose and distance requirements may be determined and/or established that provide effective pathogen reduction while staying within healthy limits of human exposure to the sanitizing radiation in a variety of settings and spatial envelopes. In some embodiments, execution of step 1130 may include generating a map of a distribution of sanitizing irradiance within the environment to determine, for example, what irradiance levels for sanitizing radiation may be incident upon regions, surfaces, and/or zones within the environment. At times, a result of the execution of step 1130 may be generation of an irradiance map that shows preferred amounts of sanitizing radiation that may be present within the environment. This map may be analyzed to determine if, for example, sufficient levels of sanitizing radiation are expected to be delivered the environment and/or zones within the environment to provide for target sanitization rates within the environment and/or zone.

Figure 15A:
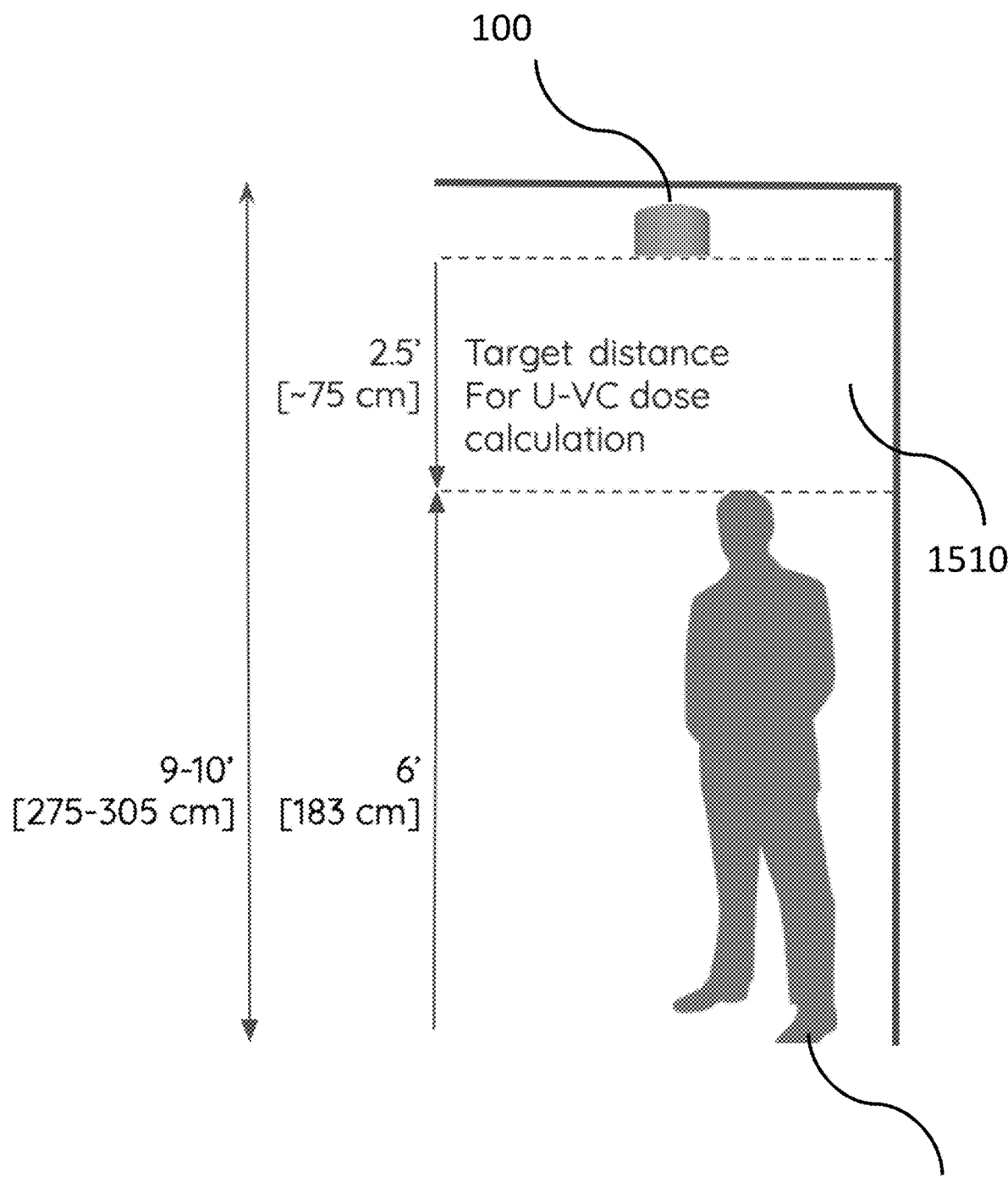
FIG. 15A provides an exemplary diagram of a portion of an environment, in accordance with some embodiments of the present invention.

In step 1135, an environmental protection plan may be generated using the information received in steps 1105, 1110, 1115, 1120, and/or 1125 and/or determined in step 1130. The environmental protection plan may include, for example, a layout for placing one or more sanitizing device(s) in the environment and/or a schedule of operating the one or more sanitizing device(s) within the environment to achieve a desired level of sanitization within the environment. On some occasions, execution of step 1135 may include determining, or calculating, a distance to and/or angle between a sanitizing device within the environment and various positions within the environment that may correspond to, for example, a height of a person, a surface (e.g., table or counter), and/or the floor. In some embodiments, the environment protection plan may provide instructions for one or more sanitizing devices to perform one or more processes (e.g., process 500, 600, 700, 800, and/or 900, or portions thereof, as described herein. In step 1140, the environment protection plan may be provided to the user and/or a system operated by the user. In exemplary embodiment, an environment protection plan may be developed to provide a desired level of sanitizing radiation within an environment that is 9 feet high where an average head height of 6 feet/183 cm of a human being corresponds to the height in an environment where coverage of sanitizing radiation at a particular target pathogen reduction rate and/or fluence or intensity across the environment is desired. FIG. 15A provides an exemplary diagram of a portion of an environment 1500 where the ceiling height is 9-10 feet, a person 105 who is 6 feet high is positioned within environment 1500, and a sanitizing device 100 is hung from the ceiling and descends approximately 6 inches down into the room. A distance between the height of person 1505 and the sanitizing device 100 is approximately 2.5 feet and this target region 1510 corresponds to a region within the environment where a coverage of sanitizing radiation throughout region 1510 (or a lower boundary of region 1510) is desired to be uniform, or nearly uniform. The environment protection plan for environment 1500 may be configured so that the sanitizing radiation intensity, or fluence, at the lower boundary of region 1510 falls below a maximum threshold value for sanitizing radiation intensity that may be set by, for example, safety standards and/or exposure limits for people present within environment 1500. Additionally, or alternatively, the environment protection plan for environment 1500 may be configured to provide a target dose of sanitizing radiation within region 1510 that kills one or more types of pathogens within a set time period (e.g., 1, 2, 5, 10 minutes).

In some embodiments, generation of the environmental protection plan may include implementation of one or more smart schedules for one or more sanitizing devices included in the plan. These smart schedules may set times for duty cycles (e.g., on/off) for sanitizing devices based on, for example, usage patterns for the environment so that, for example, sanitizing devices are not in operation when the environment is not scheduled to be used and/or sanitizing radiation emitted by various sanitizing devices may be balanced to reduce hotspots (i.e., areas of overly concentrated sanitizing radiation within the environment) and/or areas of unacceptably low amounts of sanitizing radiation within the environment may be compensated for.

Additionally, or alternatively, in some embodiments, generation of the environmental protection plan may include analyzing the environment layout information to determine portions of the environment that may need more, or less, sanitizing radiation to achieve a target pathogen reduction rate. These determinations may be used to, for example, position sanitizing devices within the environment and/or set duty cycles and/or fluence rates for the sanitizing devices positioned in the environment. At times, analyzing the environment layout information to determine portions of the environment that may need more, or less, sanitizing radiation to achieve a target pathogen reduction rate and/or generation of an environmental protection plan may be done via execution of one or more steps of process 1400 discussed below with regard to FIG. 4.

Figure 15B:
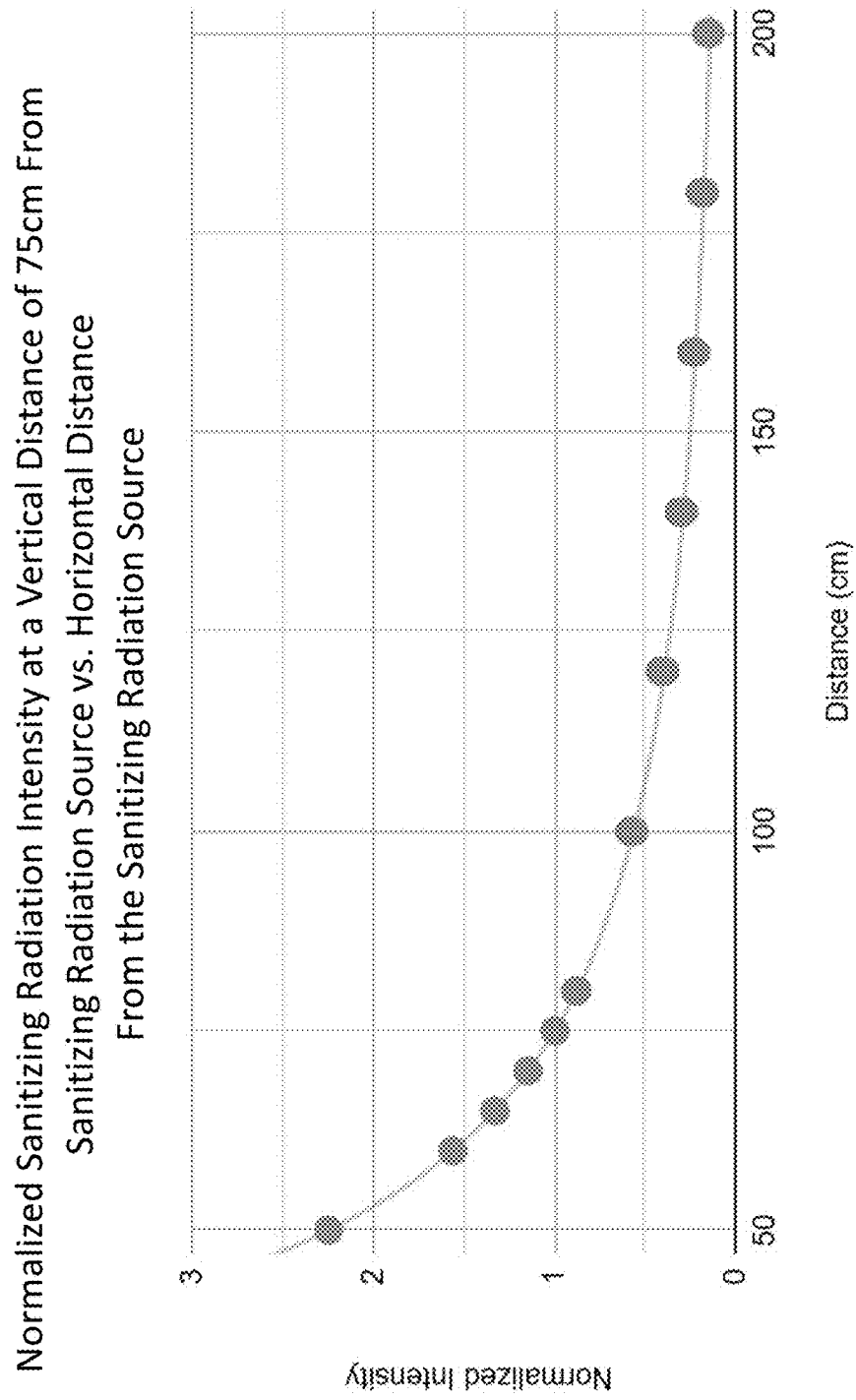
FIG. 15B provides a graph of normalized sanitizing radiation intensity as a function of distance from a sanitizing radiation source, in accordance with some embodiments of the present invention.

FIG. 15B provides a graph 1501 that plots normalized sanitizing radiation intensity as a function of distance from a sanitizing radiation source (e.g., sanitizing device 100). As may be seen via graph 1500, normalized intensity exponentially decays as a function of distance from a sanitizing radiation source according to the inverse square law. In particular, FIG. 15A illustrates an inverse square intensity falloff of sanitizing radiation emitted by the sanitizing radiation source normalized at a distance of 75 cm from the sanitizing radiation source and the normalized angular dependence of output of sanitizing radiation relative to the sanitizing radiation source centerline. The modelled normalized intensity curve used for calculation of a protection plan is derived from actual measurements of device output, which may or may not follow exactly the inverse-square law due to geometrical realities (non-point source of radiation), but which provides the most useful, accurate and relevant information. In some instances, a magnitude of sanitizing radiation intensity (i.e., irradiance) as a function of distance from a centerline of projected sanitizing radiation (e.g., centerlines 1510A and 1510B shown in FIGS. 15D and 15E, respectively) may be calculated and/or modeled using the following relationship:

$$Ee = f(z); [W/cm^2] \qquad \text{Equation 1}$$

Where:

Ee=a magnitude of sanitizing radiation intensity in W/cm² z=a distance from a source of sanitizing radiation in cm

Figure 15C:
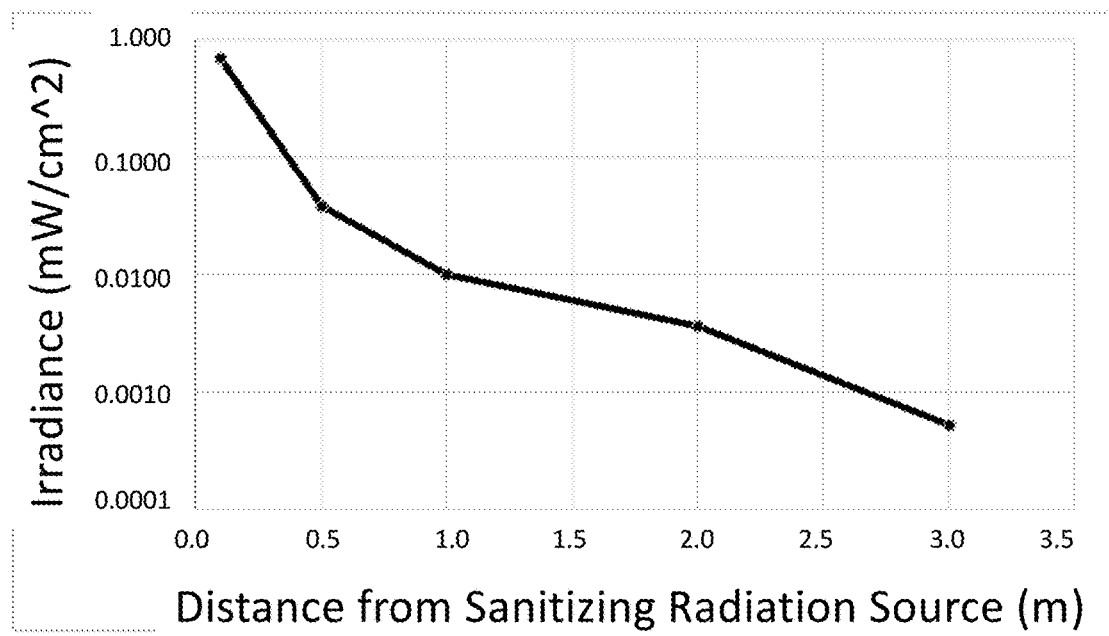
FIG. 15C provides a graph of irradiance as a function of distance from a sanitizing radiation source, in accordance with some embodiments of the present invention.

FIG. 15C provides a graph 1502 that plots irradiance (in mW/cm²) from the sanitizing radiation source as function of distance (in m) from the centerline of sanitizing radiation emitted by the sanitizing radiation source.

Figure 15D:
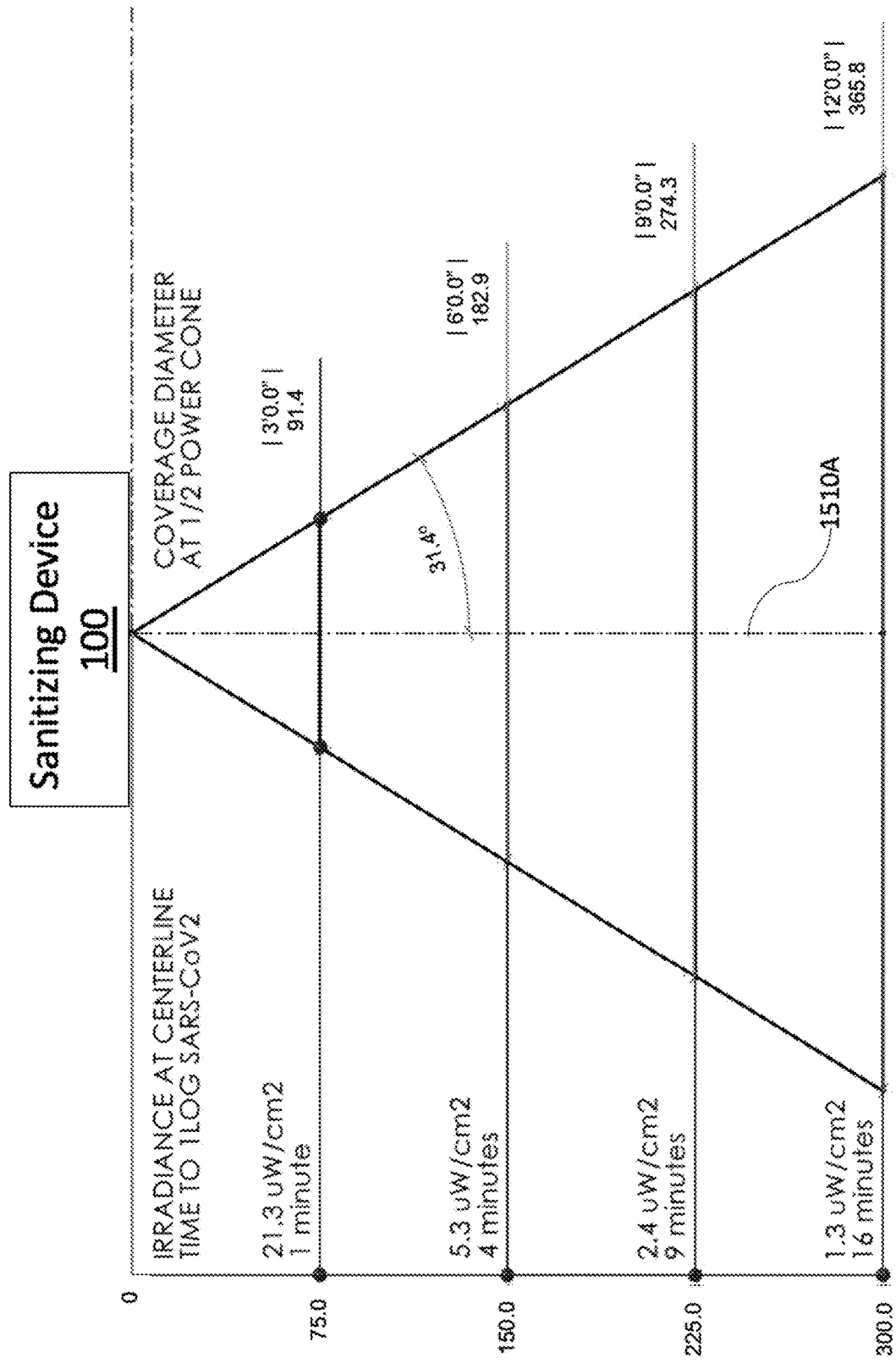
FIGS. 15D and 15E provide diagrams of a relationship between exemplary sanitizing irradiance coverage areas and time needed to kill a prescribed number of pathogens as a function of distance away from a sanitizing radiation source and/or an area or spatial distribution an effect of the sanitizing radiation upon pathogen neutralization and/or reduction, in accordance with some embodiments of the present invention.
Figure 15E:
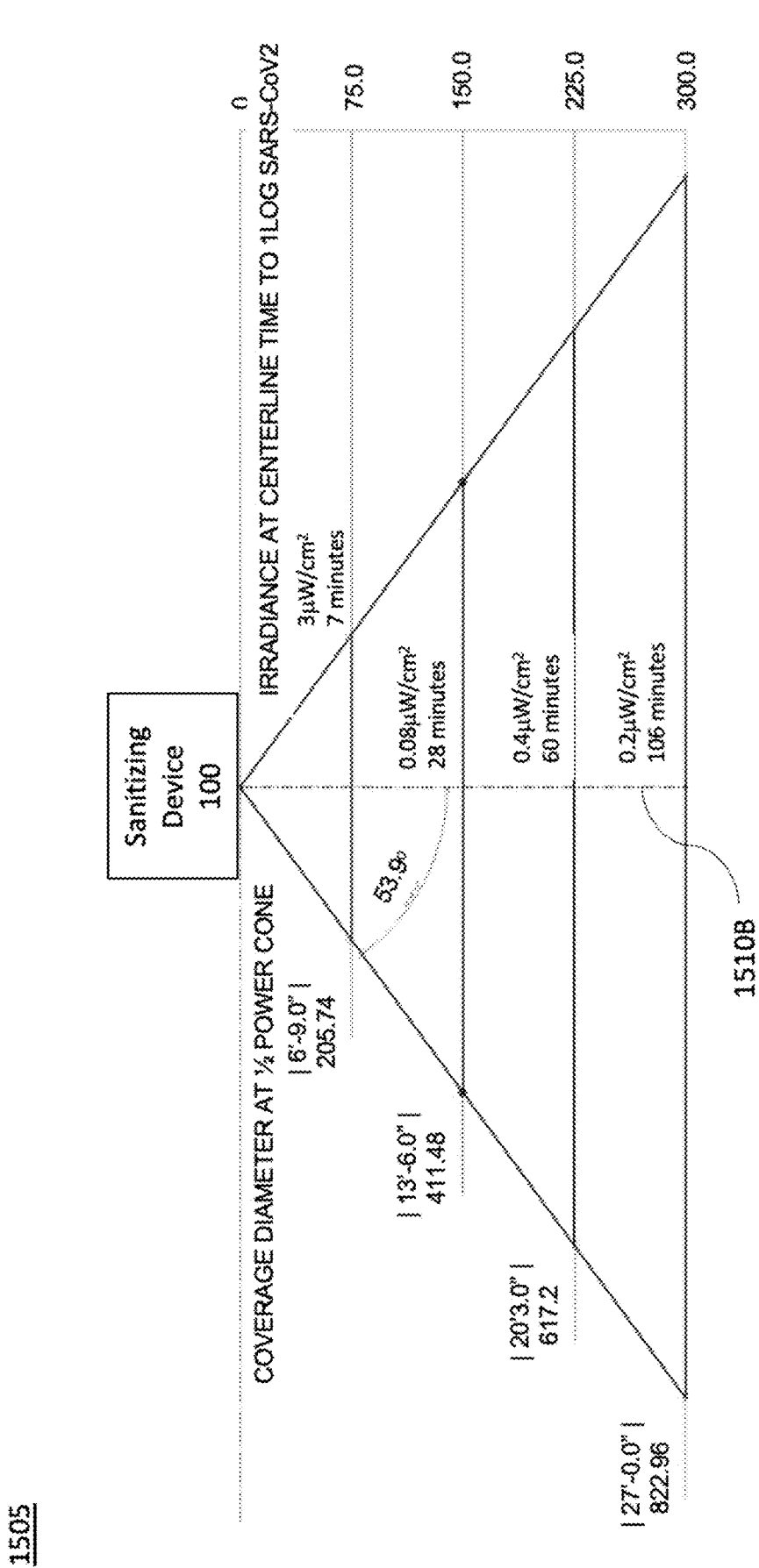

It is expected that sanitizing radiation will be emitted from a sanitizing device, like sanitizing device 100, in, for example, a conical and/or diffuse fashion so that a concentration, or intensity, of sanitizing radiation will decrease as distance from the sanitizing radiation source increases in a manner consistent with Equation 1. In addition, an area upon which the sanitizing radiation is incident increases in size as distance from the sanitizing radiation source increases in a manner that is consistent with Equation 1. FIGS. 15D and 15E provides a side view diagram 1504 and 1505, respectively, of an irradiance pattern or area/space within which sanitizing radiation will spread once emitted from sanitizing device 100. In FIG. 15D, the spread of the sanitizing radiation is relatively narrow, at an angle of 31.4 degrees from a centerline 1510A, and in FIG. 15E, the spread of the sanitizing radiation is relatively broad (i.e., at an angle of 53.9 degrees from a centerline 1510B, FIGS. 15D and 15E also show an exemplary relationship between a distance from a sanitizing device 100 and a magnitude of sanitizing irradiance that is incident on space (e.g., air and/or a surface) positioned at various vertical distances from sanitizing device 100 as measured along a central axis 1510 and a corresponding duration of time needed that is to kill a prescribed portion, in this case, 90%, of pathogens at each of the respective distances from sanitizing device 100.

In particular, FIG. 15D illustrates that at a distance of 75 cm from sanitizing device 100 (e.g., standing height for most adults), sanitizing device 100 delivers a fluence of sanitizing radiation of 21.3 microwatts/cm² and that within 1 minute, 90% of aerosolized SARS-CoV2 pathogens at this distance from sanitizing device 100 are killed. At a distance of 150 cm from sanitizing device 100 (e.g., sitting height for most adults), sanitizing device 100 delivers a fluence of sanitizing radiation of 5.3 microWatts/cm² and within 4 minutes 90% of aerosolized SARS-CoV2 pathogens at this distance from sanitizing device 100 are killed. At a distance of 225 cm from sanitizing device 100, sanitizing device 100 delivers a fluence of sanitizing radiation of 2.4 microWatts/cm² and within 9 minutes 90% of aerosolized SARS-CoV2 pathogens at this distance from sanitizing device 100 are killed. At a distance of 300 cm from sanitizing device 100 (i.e., on the floor of this exemplary environment), sanitizing device 100 delivers a fluence of sanitizing radiation of 1.3 microWatts/cm² and within 16 minutes 90% of aerosolized SARS-CoV2 pathogens at this distance from sanitizing device 100 are killed.

The sanitizing device of FIG. 15E illustrates that at a distance of 75 cm from sanitizing device 100 (e.g., standing height for most adults), sanitizing device 100 delivers a fluence of sanitizing radiation of 3 microWatts/cm² and within 7 minute 90% of aerosolized SARS-CoV2 pathogens at this distance from sanitizing device 100 are killed. At a distance of 150 cm from sanitizing device 100 (e.g., sitting height for most adults), sanitizing device 100 delivers a fluence of sanitizing radiation of 0.8 microWatts/cm² and within 28 minutes 90% of aerosolized SARS-CoV2 pathogens at this distance from sanitizing device 100 are killed. At a distance of 225 cm from sanitizing device 100, sanitizing device 100 delivers a fluence of sanitizing radiation of 0.4 microWatts/cm² and within 60 minutes 90% of aerosolized SARS-CoV2 pathogens at this distance from sanitizing device 100 are killed. At a distance of 300 cm from sanitizing device 100 (i.e., on the floor of this exemplary environment), sanitizing device 100 delivers a fluence of sanitizing radiation of 0.2 microWatts/cm² and within 106 minutes 90% of aerosolized SARS-CoV2 pathogens at this distance from sanitizing device 100 are killed.

Figure 16A:
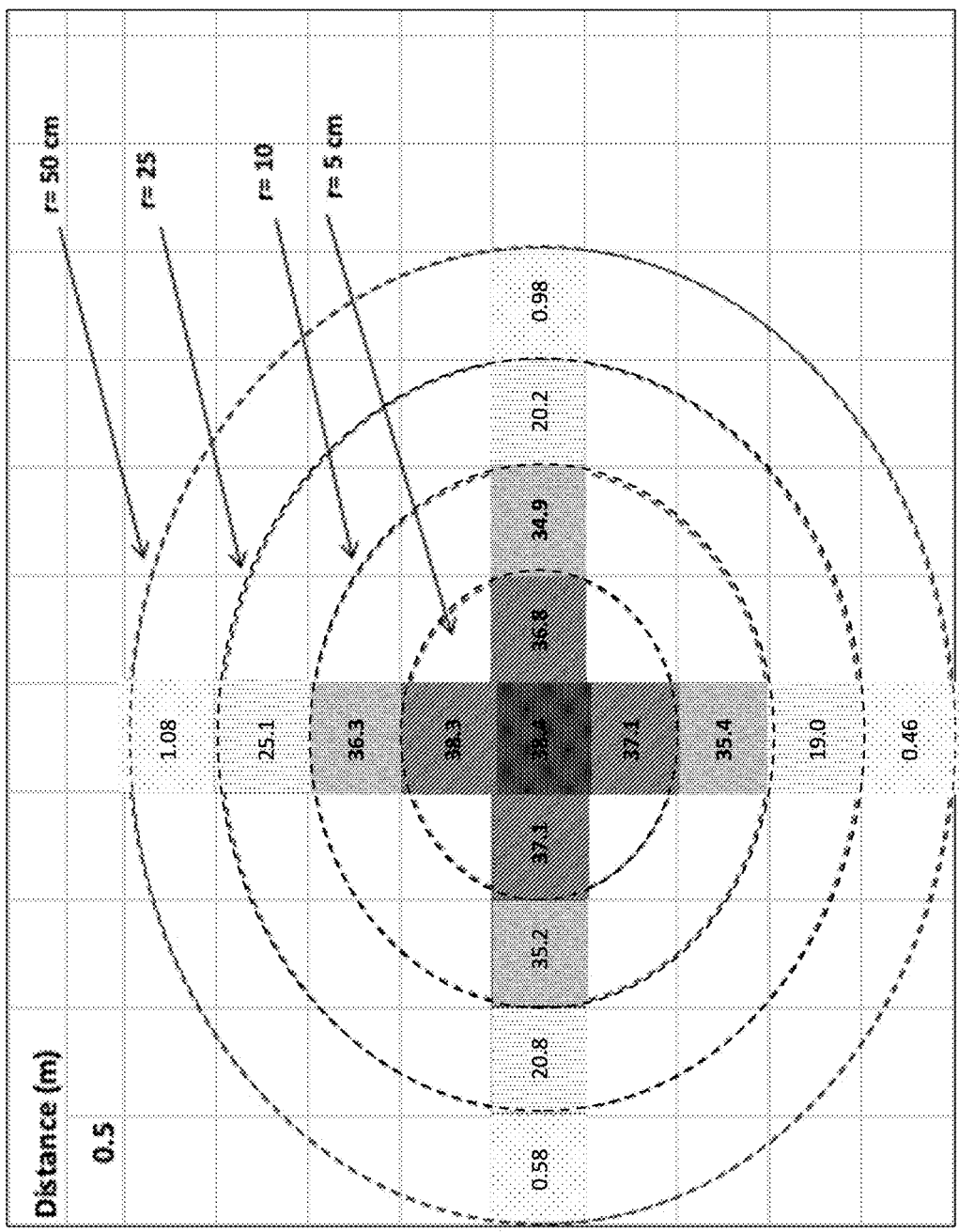
FIG. 16A provides a two-dimensional graph plotting irradiance measurements in $mW/cm^2$ as a function of distance from a sanitizing radiation source in the X and Y directions at a distance of 0.5 m in the Z direction, in accordance with some embodiments of the present invention.

FIGS. 16A, 16B, 17A1, 17A2, 17C, and 17D provide diagrams, or graphs, of empirically measured values for irradiance in different situations/under different conditions (e.g., distances from the sanitizing device and/or an angular distribution of irradiance within an environment) that may be used to determine, for example, how much irradiance a particular sanitizing device may emit into an environment at a particular distance from a sanitizing device like sanitizing device 100. For example, FIG. 16A provides a first polar graph 1601 plotting empirically measured values for irradiance in mW/cm² at a distance of 0.5m away from a sanitizing device positioned at an intersection of the X and Y axis (i.e., center line 1510, not shown) as a function of a radial distance from an intersection of the X and Y axis.

Figure 16B:
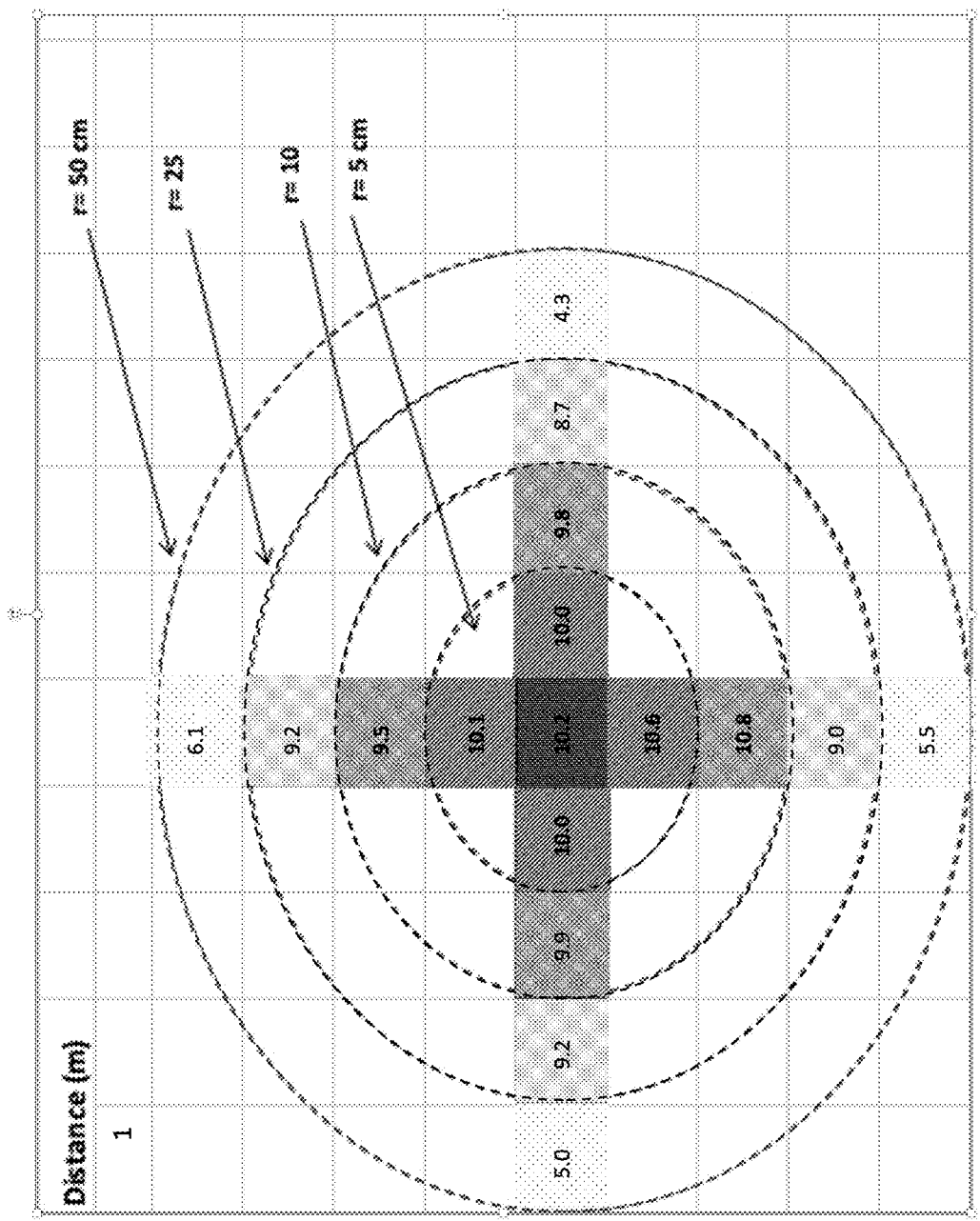
FIG. 16B provides a two-dimensional graph plotting irradiance measurement in $mW/cm^2$ as a function of distance from a sanitizing radiation source) in the X and Y directions at a distance of 1 m in the Z direction, in accordance with some embodiments of the present invention.

FIG. 16B provides a second polar graph 1602 plotting empirically measured values for irradiance in mW/cm² at a distance of 1m away from a sanitizing device positioned at an intersection of the X and Y axis (i.e., center line 1510, not shown) as a function of a radial distance from an intersection of the X and Y axis.

As may be seen in FIGS. 16A and 16B, irradiance measurements have the highest values closest to the intersection of the X and Y axis and the magnitude of the irradiance measurement decreases as a magnitude of a radius (representing a distance away from the centerline in the X and Y directions) of the polar plot increases.

FIG. 17A1 provides a first scatter plot graph 1701A plotting normalized sanitizing irradiance from one sanitizing device as a function of degrees from a center of projecting the sanitizing radiation from the sanitizing device which shows a 0.5 value for irradiance present at points −40 degrees and 40 degrees from the center of emission of the sanitizing radiation (half-power angles), wherein the triangles represent normalized irradiance in the vertical direction and circles represent normalized irradiance in the horizontal direction. The data shown in scatter plot 1701A is similar to the data shown in FIG. 16A and shows the angular distribution of irradiance in the horizontal and vertical directions for a single sanitizing device.

FIG. 17A2 provides a second scatter plot graph 1701B plotting a smoothed normalized angular distribution of sanitizing irradiance in the horizontal and vertical directions from the sanitizing device used to generate the data shown in FIG. 17A1 as a function of degrees from center of a sanitizing device projecting the sanitizing radiation over a wider field of view that scatter plot 1701A. Second scatter plot 1701B also provides an indication that the normalized irradiance level is 0.5 at an angle of 32 degrees from center. FIG. 17A2 also shows a threshold irradiance value 1710 of 5.4 microwatts/cm² is also provided by graph 1702. Threshold irradiance value 1710 may refer to a target lower threshold for an irradiance value to be delivered to the environment across a distance within the environment in order to kill pathogens at a desired rate. In some cases, threshold 1710 may correspond to an irradiance value required to kill a particular percentage (e.g., 90-99.99%) of pathogens and/or a particular type of pathogen (e.g., SARS CoV-19, influenza, *e. coli*, norovirus, *salmonella*, etc.) within a desired time frame (e.g., 1-240 minutes).

Data regarding fluence magnitudes as a function of vertical distance and angle such as the data shown in FIGS. 16A, 16B, 17A1, and 17A2 may be used to determine how one or more sanitizing devices may be used (sometimes together) to provide a desired level of fluence to a particular volume of space and/or air positioned within an environment at a particular distance from the one or more sanitizing devices. For example, two sanitizing devices may be positioned proximate to another to provide a desired amount of fluence to air at a particular height within an environment. FIG. 17B provides one example of how this may be accomplished. In particular, FIG. 17B provides a graph 1702 plotting irradiance in microwatts/cm$^2$ as a function of position in the X- and/or Y-direction within an environment where there are two sanitizing devices, like sanitizing devices 100, emitting sanitizing radiation within the environment at a position of approximately 150 cm and 530 cm. A threshold irradiance value 1710 of 5.4 microwatts/cm$^2$ is also provided by graph 1702. By viewing graph 1702, a user and/or environment protection plan preparation software may determine that two sanitizing devices are sufficient to provide sanitizing radiation within the environment across a distance of 485 cm from a sanitizing radiation source across a distance in the Y-direction of 585 cm (i.e., from a position of 55 cm to a position of 630 cm) and/or may determine that more sanitizing devices are needed to provide adequate sanitizing radiation within target ranges for an environment that may be, for example, larger than 485 cm in length and/or width.

Figure 17B:
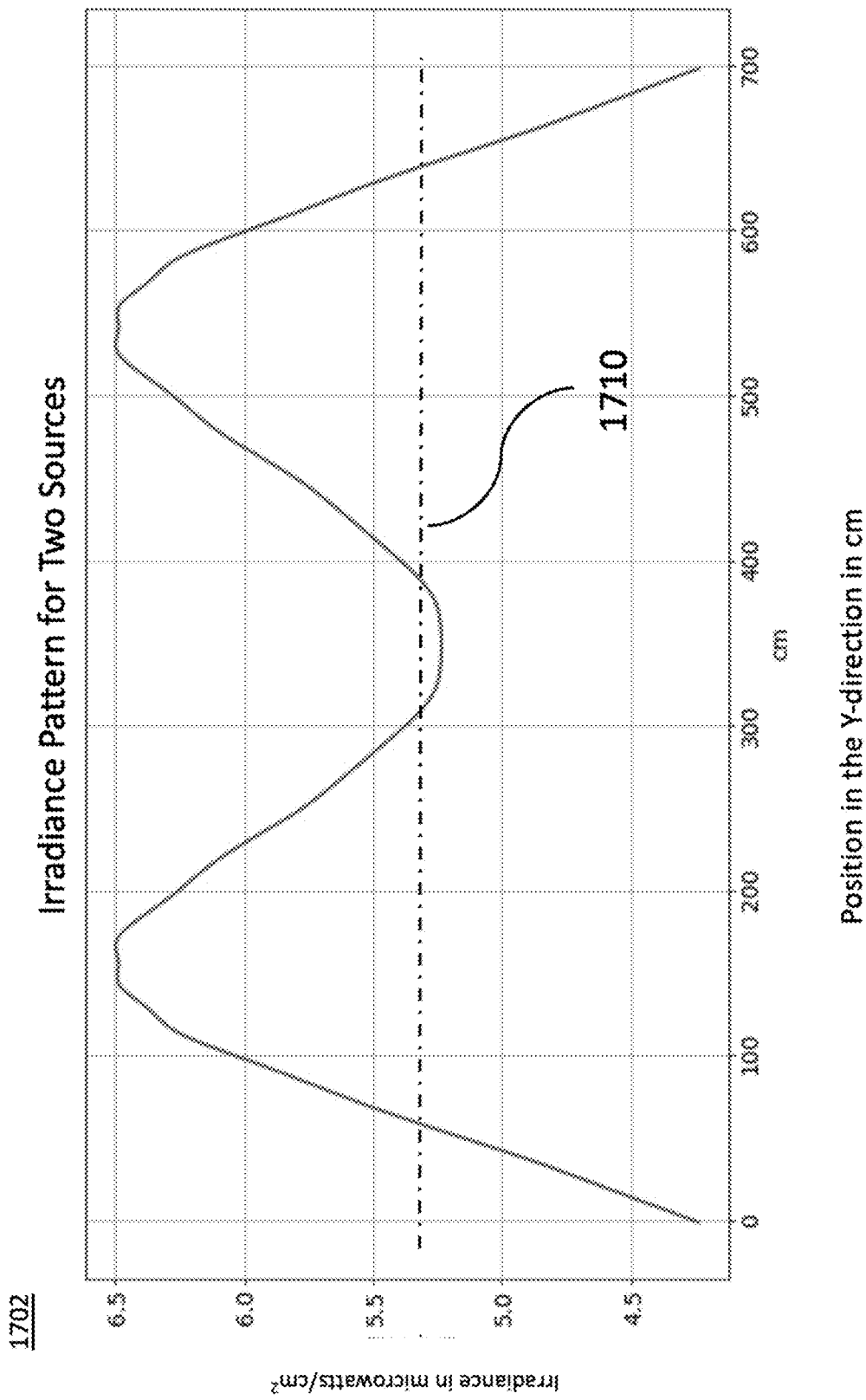
FIG. 17B provides a graph plotting irradiance in $microwatts/cm^2$ as a function of position within an environment for irradiance emitted by two sanitizing devices, in accordance with some embodiments of the present invention.
Figure 17C:
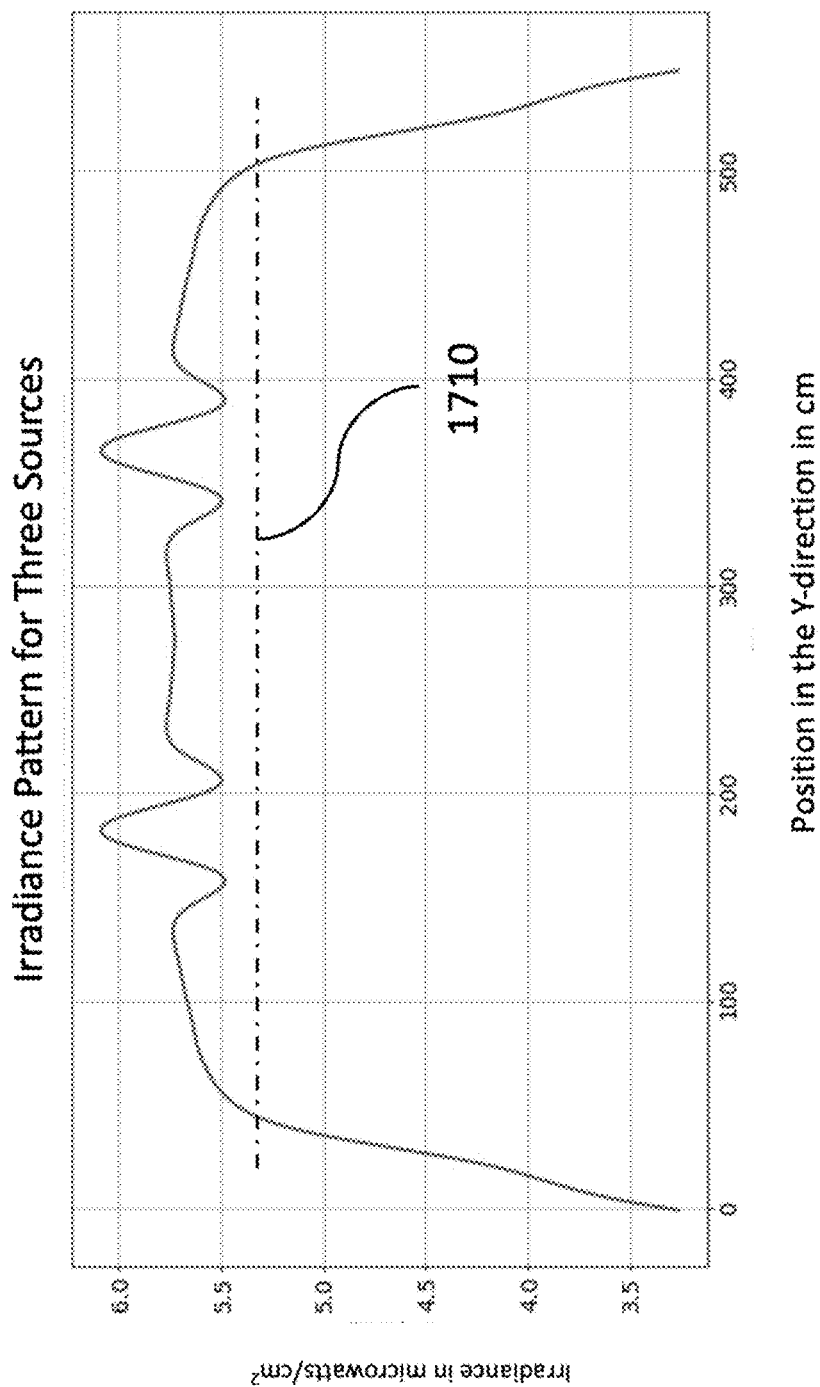
FIG. 17C provides a graph plotting irradiance in $microwatts/cm^2$ as a function of position within an environment for irradiance emitted by three sanitizing devices, in accordance with some embodiments of the present invention.

FIG. 17C provides a graph 1703 plotting irradiance in microwatts/cm$^2$ as a function of position in the X- and/or Y-direction within an environment where there are three sanitizing device emitting sanitizing radiation within the environment at a position of approximately 100 cm, 270, and 360 cm. Threshold irradiance value 1710 of 5.4 microwatts/cm$^2$ is also provided by graph 1702. Threshold irradiance value 1710 may refer to a target lower threshold for an irradiance value to be delivered to the environment at across a distance within the environment. By viewing graph 1703, a user and/or environment protection plan preparation software may determine that three sanitizing devices are sufficient to provide sanitizing radiation within the environment across a distance of 465 cm ranging from a position at 35 cm through 500 cm.

Graphs 1701A, 1701B, 1702, and/or 1703 and/or the distributions they represent/provide may be used to understand and/or model irradiance of sanitizing radiation through space under varying conditions and/or may demonstrate the conditions under which a target level of irradiance may be achieved over a given area and/or volume of an environment. Additionally, or alternatively, graphs 1701A, 1701B, 1702, and/or 1703 and/or the distributions they represent/provide may be used to develop an environment protection plan for an environment according to, for example, process 1100 and/or 1200 (discussed below with regard to FIG. 12). In some embodiments, graphs 1701A, 1701B, 1702, and/or 1703 and/or the distributions they represent/provide may demonstrate a level of homogeneity of sanitizing irradiance throughout the environment at, for example, a target distance to, for example, achieve an optimally spaced array of sanitizing devices when compared with an angular distribution of a single unit as shown in, for, example, FIG. 17A.

Optionally, in some embodiments, a plurality of protection plans for one or more environment types and/or functions may be predetermined, and a user may be provided with different categories and/or types of predetermined environment protection plans to choose from. For example, a set of predetermined environment protection plans may be associated with different categories of environments such as large rooms, hotel lobbies, corridors, conference rooms, rooms with a standard-size and/or known square footage (e.g., 100-2,000 square feet), and/or rooms of a known height and/or distance between the sanitizing device(s) and the floor and/or a surface within the environment.

In some embodiments, an environmental protection plan may set spacing between sanitizing devices so that a level of irradiance will be incident within a certain portion (e.g., all air 75 cm below a sanitizing device within the environment) is nearly uniform/homogeneous in magnitude. This homogenous magnitude of irradiance may be achieved via, for example, direct and/or overlapping rays of sanitizing radiation emitted by one or more sanitizing devices.

Figure 17D:
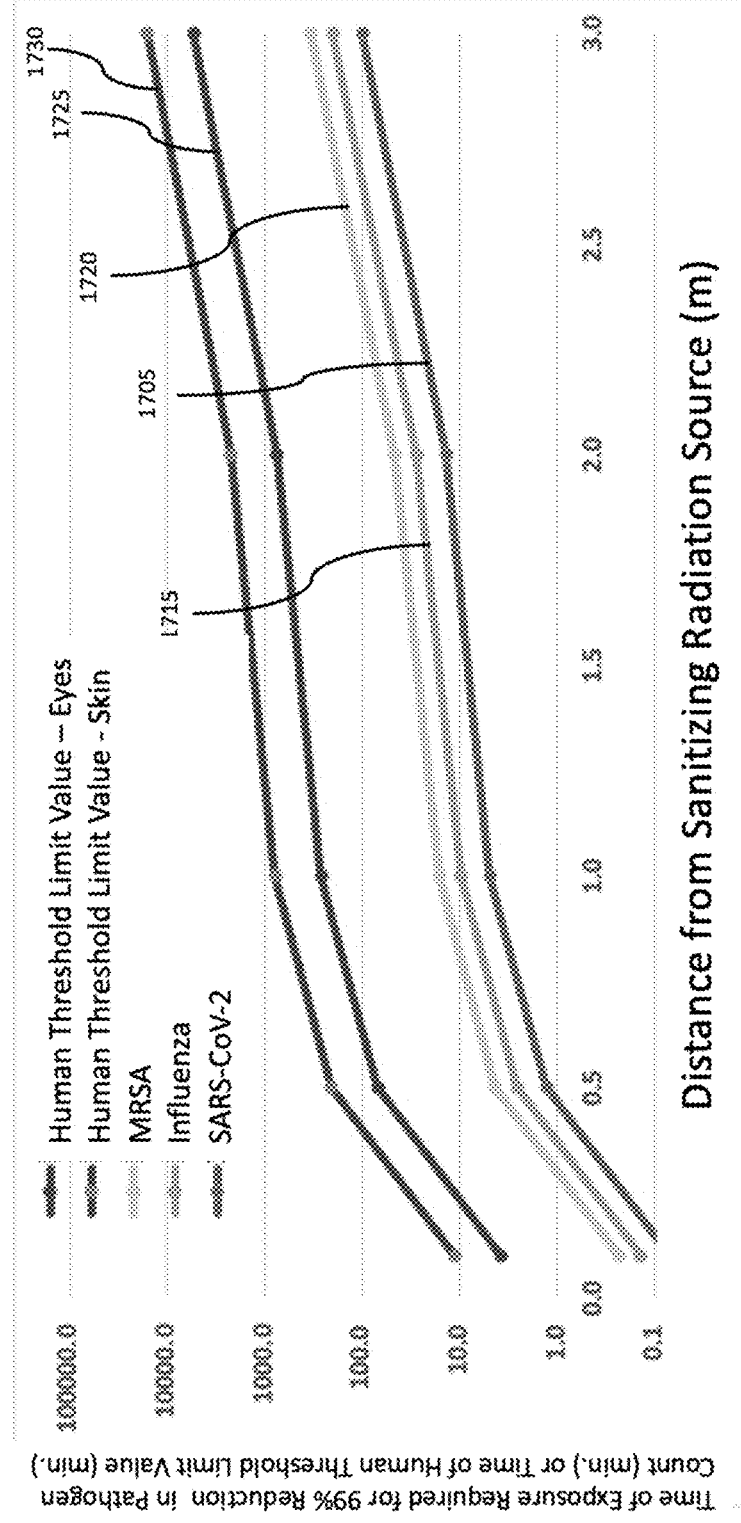
FIG. 17D provides a graph that plots time of exposure required for a 99% reduction in pathogen count (measured in minutes) for three different types of pathogens or time of human threshold limit value for both skin tissue and eye tissue (measured in minutes) as a function of distance from sanitizing radiation source, in accordance with some embodiments of the present invention.

FIG. 17D provides a graph 1704 that plots time of exposure required for a 99% reduction in pathogen count (measured in minutes) for three different types of pathogens or time of human threshold limit value for both skin tissue and eye tissue (measured in minutes) as a function of distance from sanitizing radiation source (measured in meters). In particular, graph 1704 has a first line 1705 drawn through a first set of data points that represent time of exposure required for a 99.99% reduction in pathogen count when the pathogen is the SARS-CoV-2 virus; a second line 1715 drawn through a second set of data points that represent time of exposure required for a 99.99% reduction in pathogen count when the pathogen is the influenza virus; a third line 1720 drawn through a third set of data points that represent time of exposure required for a 99.99% reduction in pathogen count when the pathogen is the influenza virus; a fourth line 1725 drawn through a fourth set of data points that represent a human threshold limit value for exposure of sanitizing radiation for the eye; a fifth line 1730 drawn through a fifth set of data points that represent a human threshold limit value for exposure of sanitizing radiation for the skin. In some cases, parameters for setting and/or achieving a desired level of sanitization for an environmental protection plan (e.g., step 1122) may be established by determining irradiance level(s) and/or threshold(s) required to kill a desired number of pathogens (i.e., pathogen reduction rate) for a required amount of time. These parameters may also set that irradiance levels that do not exceed safety limits for human exposure.

Figure 17E:
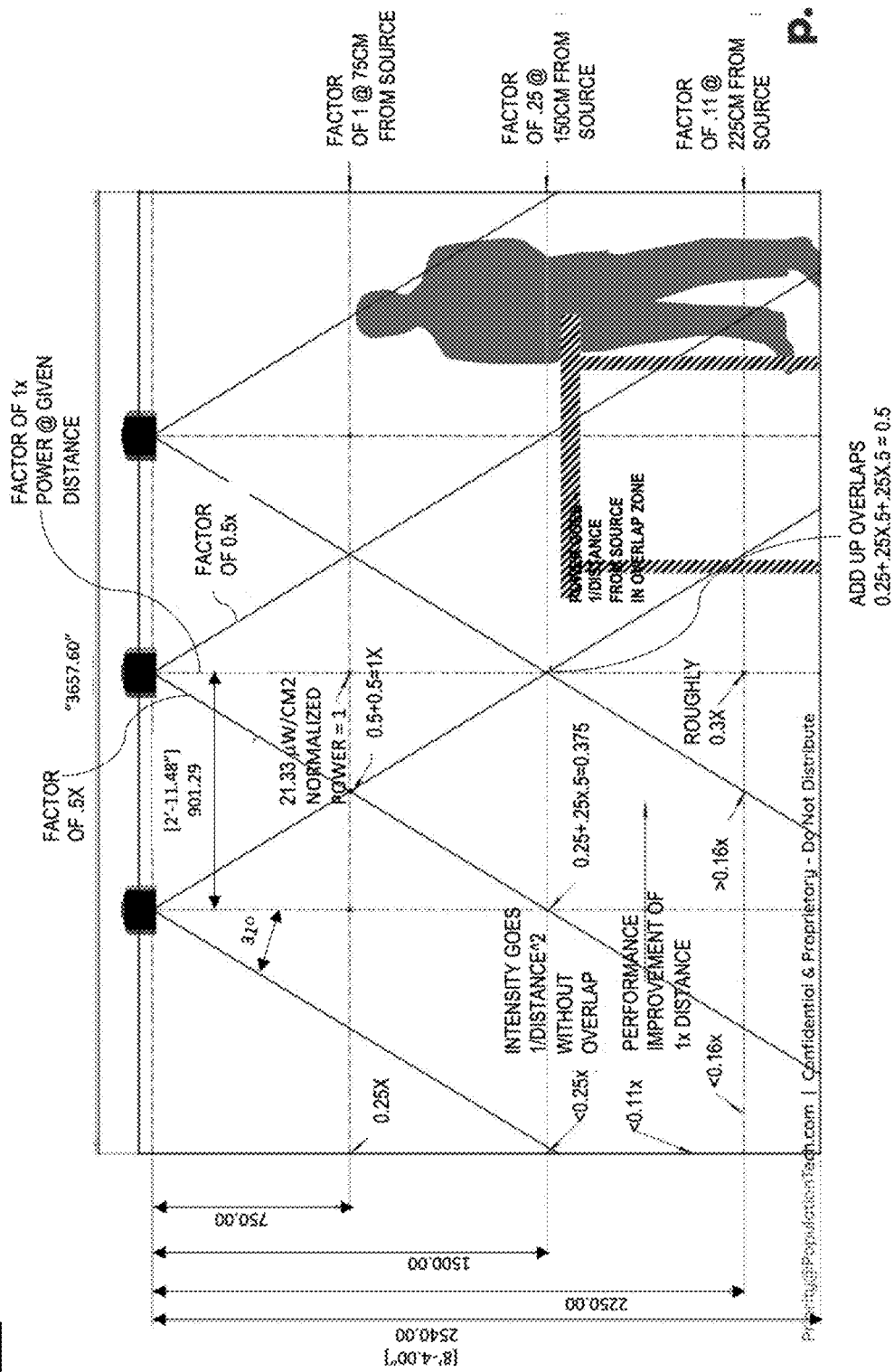
FIG. 17E is a diagram of a set of sanitizing devices positioned with an environment in accordance with an environmental protection plan for the environment, in accordance with some embodiments of the present invention.

FIG. 17E is a diagram 1706 of a set of three sanitizing devices 100 positioned with an environment in accordance with an environmental protection plan for the environment that includes a table 1760 that is approximately 150 cm below (in the X-direction) a lower surface of each sanitizing device 100 and a human being 1760 whose head is approximately 75 cm below (in the X-direction) a lower surface of each sanitizing device 100. Each sanitizing device 100 positioned within the environment projects sanitizing radiation with an angular distribution of 31 degrees as shown to generate a first cone of sanitizing radiation 1770A (emitted by a first sanitizing device 100A) that overlaps with a second cone of sanitizing radiation 1770B (emitted by a second sanitizing device 100B) that overlaps with a third cone of sanitizing radiation 1770C (emitted by a third sanitizing device 100C) to provide a target amount of sanitizing radiation and/or target pathogen kill rate within the environment.

In one embodiment, process 1100 may be executed by receiving environmental layout information in the form of room dimensions and/or dimensions for one or more surfaces (e.g., tables or countertop) for the environment in step 1105. Then, usage information such as a percentage of time humans are standing, sitting, and/or traveling through the environment and/or how long humans are present within the environment may be received (step 1110). Then, information regarding pathogen type (e.g., influenza and/or SARS CoV2) and/or preferred kill rates/percentages (e.g., 70-99.99%) for the pathogens may be received in step(s) 1115 and/or 1122. In addition, information about other factors for the environment such as how often surfaces are cleaned within the environment, air flow rates, doors and/or openings within the environment, and/or air re-circulation rates may be received in step 1115. Then, sanitizing device configuration information (step 1125) may be received. Exemplary sanitizing device configuration information includes, but is not limited to, fluence as a function of distance and/or an angular distribution of fluence as described above with regard to FIGS. 15D, 15E, 16A, 16B, 17A, 17B, and 17C. An amount of fluence of sanitizing radiation that is needed to achieve the desired level of sanitization of step 1122 may then be determined for all, or a portion, of the environment and an environmental protection plan may be generated in step 1135. In some instances, the environmental protection plan may incorporate calculations of, for example, a magnitude of sanitizing radiation that needs to be delivered over a time period to achieve a desired level of pathogen reduction and/or a maximum human-safe magnitude of sanitizing radiation that may be delivered in the environment. Additionally, or alternatively, an environmental protection plan may incorporate options for and/or information regarding a minimum and/or maximum number of sanitizing devices needed in an environment to achieve a desired level of pathogen reduction, a desired lifespan of sanitizing devices within an environment, an amount of electrical power available to sanitizing devices, an ability to specify how one or more sanitizing devices in an environment may operate, and/or limit a distance to an existing power supply conduit.

The environmental protection plan may provide a lay out or positions where, within the environment, one or more sanitizing devices are to be placed in order to achieve the desired fluence of step 1130. In some cases, parameters of the environmental protection plan may plot out positions within the environment for placement of one or more sanitizing devices, configuration settings (e.g., angle of diffusion, intensity, duty cycles, etc.) for the sanitizing device(s) so that an average dose (i.e., magnitude of irradiance over a period of time) of sanitizing radiation is within a range that provides the desired level of pathogen reduction throughout the environment and/or a defined risk zone within the environment (e.g., high-touch surfaces, areas where people congregate, etc.).

Figure 12:
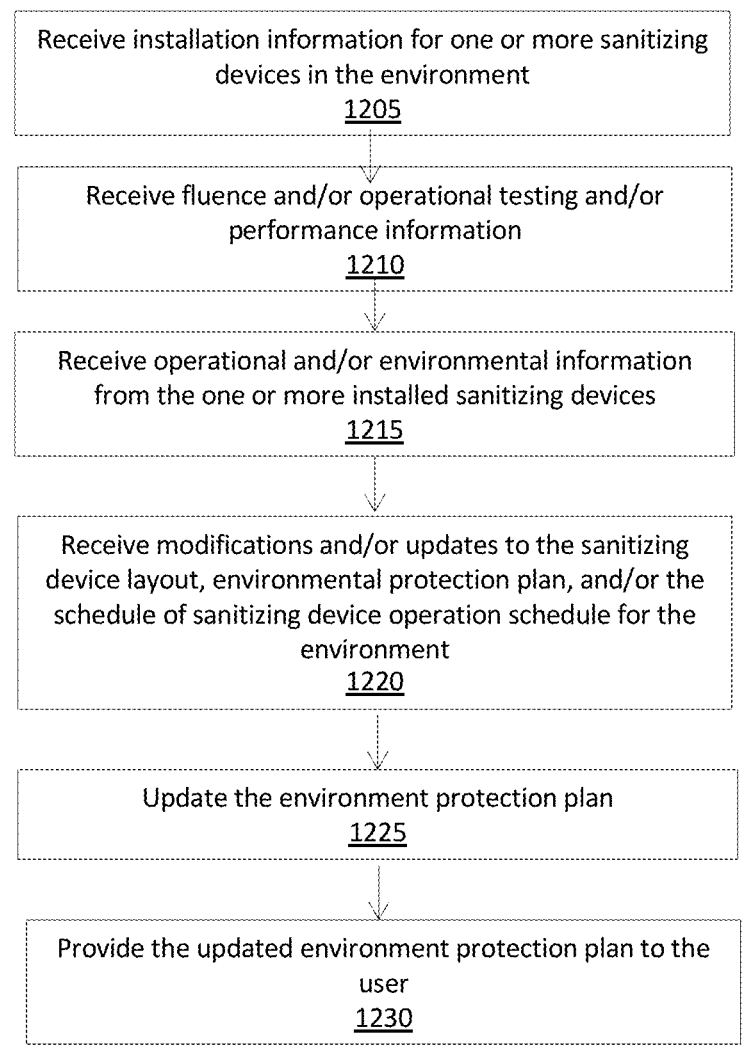
FIG. 12 provides a flowchart showing a process for the updating of a protection plan for an environment, in accordance with some embodiments of the present invention.

FIG. 12 is a flowchart illustrating a process 1200 for updating of a protection plan for an environment generation of a protection plan using one or more sanitizing device(s) like sanitizing device 100 for an environment. Process 1200 may be executed by, for example, any of the sanitizing device(s) and/or systems described herein. In some cases, one or more steps of process 1200 may be performed by and/or using a machine learning network such as a deep neural network.

In step 1205, installation information for one or more sanitizing devices positioned within an environment may be received a processor and/or server. The installation information may be a confirmation that sanitizing devices were installed according to an environmental protection plan such as the environment protection plan designed and/or generated via execution of process 1500. In some cases, the environment protection plan may also include instructions to an installer of sanitizing devices regarding how, where, and which type of sanitizing device to install throughout the environment. Additionally, or alternatively, installation information received in step 1205 may include one or more features of the environment.

In step 1210, fluence, operational, testing, and/or performance information may be received so that, for example, information regarding how the sanitizing devices within the environment are actually performing. The information received in step 1210 may be received from, for example, one or more devices present within and/or exterior to a sanitizing device positioned in the environment such as video cameras, thermal cameras, microphones, sound/noise sensors, temperature sensors, light monitoring sensors configured to monitor an intensity and/or wavelength of light emitted by a sanitizing device, proximity sensors, sensor 140, light meter/camera 330, and light meters/fluence/coverage area detectors 1010. In some embodiments, the fluence and/or operational testing and/or performance information may be received via execution of process 900 and/or a portion thereof. In some embodiments, the fluence, operational, testing, and/or performance information received in step 1210 may include an irradiance map (see e.g., step 1130) and/or a spatial analysis of the environment (see e.g., step 1110).

Optionally, in step 1215, operational and/or environmental information from the one or more installed sanitizing devices may be received. Examples of the operational and/or environmental information received in step 1215 includes schedules of operation, operation times, and/or information regarding any malfunctions of sanitizing devices within an environment.

Optionally, in step 1220, modifications and/or updates to the sanitizing device modifications and/or updates to the sanitizing device layout, environmental protection plan, and/or sanitizing device operation schedule for the environment may be received from, for example, a user. These modifications may be responsive to, for example, changes in how the environment is being used (e.g., how many people are in the environment, whether food is being prepared or served in the environment, whether the windows are open in the environment, etc.) and/or changes to improve operation of the sanitizing devices within the environment that may, in some instances, be responsive to the fluence and/or operational testing and/or performance information received in step 1210.

In step 1225, the information, modifications, and/or updates received in steps 1205, 1210, 1215, and/or 1220 may be used to update the environment protection plan. In some instances, step 1225 may be performed manually by one or more human technicians that may be providing back-end service and/or support to a customer or client executing the environment protection plan. Additionally, or alternatively, step 1225 may be performed as part of a machine learning or artificial intelligence process to improve and/or iterate upon environment protection plans, in general and/or in the case of the particular environment protection plan for which information has been received via execution of process 1200. Exemplary updates to the environment protection plan include, but are not limited to, changing of schedules of operation for one or more sanitizing devices within the environment, changing a manner in which a sanitizing device operates (e.g., adjust focus, position, filtering mode, and/or intensity of sanitizing radiation emitted by the sanitizing device), recommendations for adding more sanitizing devices and/or removing sanitizing devices from the environment, replacing a component of an sanitizing device, and so on. In some cases, updating of the environmental protection plan may include updating the irradiance map and/or a spatial analysis for the environment. The updated environment protection plan may then be provided to the user for implementation in the environment (step 1230).

Figure 13:
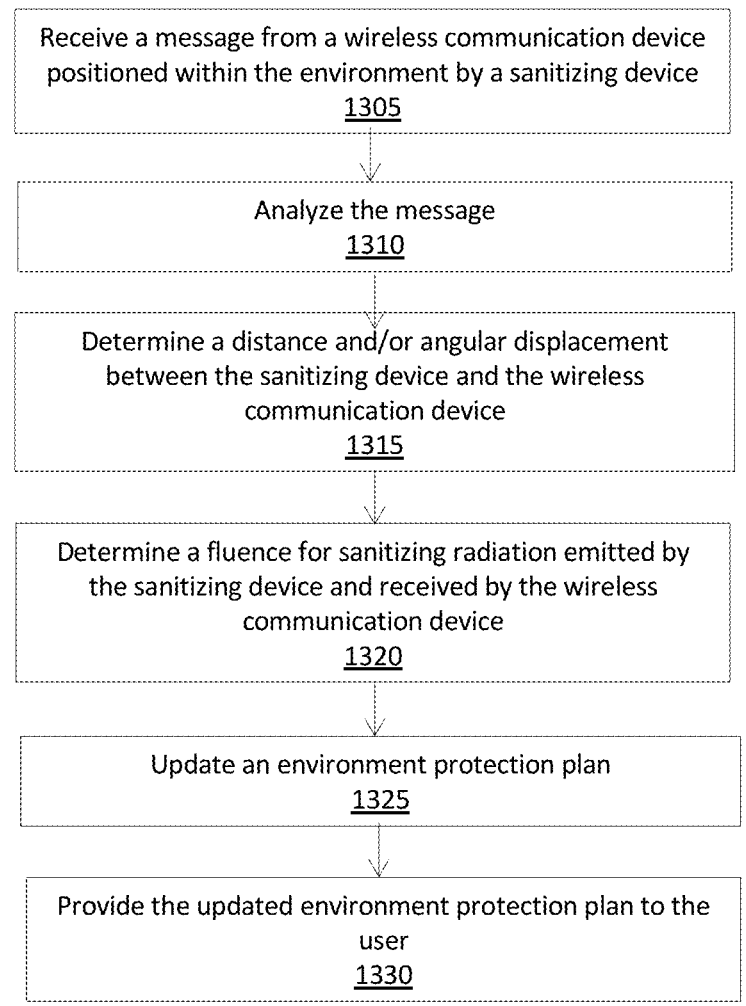
FIG. 13 provides a flowchart showing a process for measuring a distance between a sanitizing device and a position within an environment and/or updating of a protection plan for the environment, in accordance with some embodiments of the present invention.

FIG. 13 provides a flowchart showing a process 1300 for measuring a distance between a sanitizing device and a position within an environment and/or updating of a protection plan for the environment. Process 1300 may be executed by, for example, any of the sanitizing device(s) and/or systems described herein.

In step 1305, a message from a wireless communication device (e.g., computer, radio-frequency beacon, mobile phone, light meter, infra-red communication device, etc.) may be received by a sanitizing device like sanitizing device 100 and/or a component thereof such as a sensor like sensor 140 and/or a transceiver like transceiver 120. Often times, the wireless communication device is positioned proximate to the sanitizing device and/or in the same environment/room as the sanitizing device. In some instances, the wireless device may move about the environment and may send multiple messages from different locations (e.g., the four corners, on a tabletop, on a floor, on a chair, etc.) within the environment as a single or multiple messages that may be received in step 1305.

The message may include, for example, sanitizing device radiation intensity, position information, and/or a time stamp that may be analyzed to determine, for example, how long the message was in transit between the wireless communication device and the sanitizing device so that, for example, a distance between the sanitizing device and the wireless communication device may be determined. The message may be analyzed (step 1310) to determine, for example, a fluence measured by the wireless communication device (step 1320) and/or a position of the wireless communication device when the message was sent. The distance and/or angular displacement between the sanitizing device and the wireless communication device may then be determined (step 1315). In some embodiments, execution of step 1315 may include performing a spatial analysis of the environment (see e.g., step 1110) and execution of step 1320 may include generating an irradiance map for the environment (see e.g., step 1130).

The determinations of step(s) 1315 and/or 1320 may be used to update an environmental protection plan generated via, for example, execution of process 1100 and/or 1200. Updating the environmental protection plan may include, for example, updating and/or modifying one or more pathogen load models, pathogen target reduction rates, sanitizing device duty cycles, sanitizing device placement within the environment, and type of sanitizing device deployed in the environment. Then, the updated environmental protection plan may be provided to a user in a manner similar to, for example, step 1230 as discussed above with regard to FIG. 12.

Figure 14:
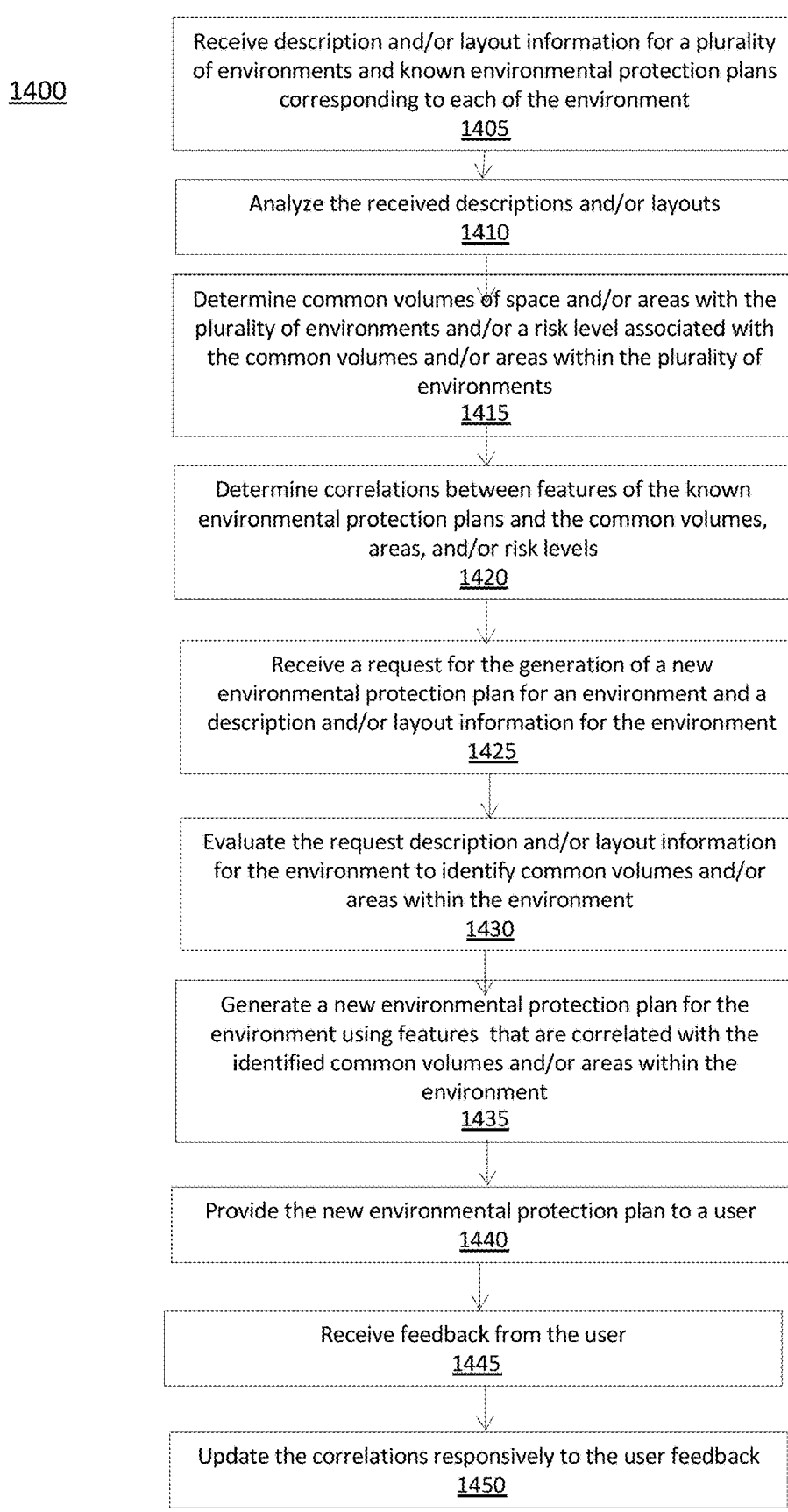
FIG. 14 provides a flowchart showing a process for automating one or aspects of environmental protection plan generation, in accordance with some embodiments of the present invention.

FIG. 14 is a flowchart illustrating a process 1400 for automating one or aspects of environmental protection plan generation using, for example, machine learning and/or iterative computer processing of information including environment layout information and environmental protection plans for the respective environments.

In step 1405, description and/or layout information for a plurality of environments as well as known environmental protection plans corresponding to each of the plurality of environments may be received by, for example, a processor or machine learning architecture. Exemplary description information includes, for example, environment dimensions, positions of various objects (e.g., walls, half-walls, tables, chairs, stairways, doors, windows, HVAC openings, fans, sinks, trash receptacles, etc.) as well as descriptions of those various objects (e.g., size, height, and function). Exemplary layout information includes, but is not limited to, blueprints and environment dimensions.

The received descriptions and/or layouts may be analyzed (step 1410) to determine common, or similar, volumes of space and/or two-dimensional areas between some of the plurality of environments so that, for example, the processor may begin to recognize types of areas and/or volumes within a space (step 1415). For example, description and/or layout information regarding 1000 different kitchens may be received in step 1405 and the analysis of this information may assist with determining common types of areas within a kitchen such as food preparation surfaces, cooking surfaces, sinks, and trash receptacles. And another example description and/or layout information regarding 10,000 different conference rooms may be received in the step 1405 and the analysis of this information may assist with determining common types of volumes or areas within conference rooms such as entryways, chairs, and tables.

Then, correlations between portions of the known environmental protection plans associated with the common volumes of space and/or areas within the environments associated with the respective known environmental protection plans environments may be determined (step 1420) so that, for example, a correlation table between types of volumes of space and/or two-dimensional areas and portions of environmental protection plans associated with these types of volumes of space and/or two-dimensional area maybe generated.

In step 1425, a request for the generation of a new environmental protection plan for an environment and a description and/or layout information for the environment may be received. The request, description, and/or layout information for the environment may then be evaluated to identify any common volumes of space or areas within the environment known to the processor and/or machine learning algorithm (step 1430). A new environmental protection plan for the environment may then be generated by looking up the identified common volumes of space and or areas within the environment and the corresponding portion of known environmental protection plans and inputting the correlated portions of known environmental protection plans into the new environmental protection plan for the environment (step 1435). In some embodiments, execution of step 1435 may include execution of one or more steps of process 1100, 1200, and/or 1300. The new environmental protection plan may then be provided to the user (step 1440). Optionally, feedback regarding the environmental protection plan may be received from the user (step 1445) and this feedback may be used to update the correlations (step 1450). Exemplary feedback includes, but is not limited to, modification of the new environmental protection plan, rearrangement of sanitizing devices within the environment and alteration of duty cycles of sanitizing devices within the environment.

Figure 18A:
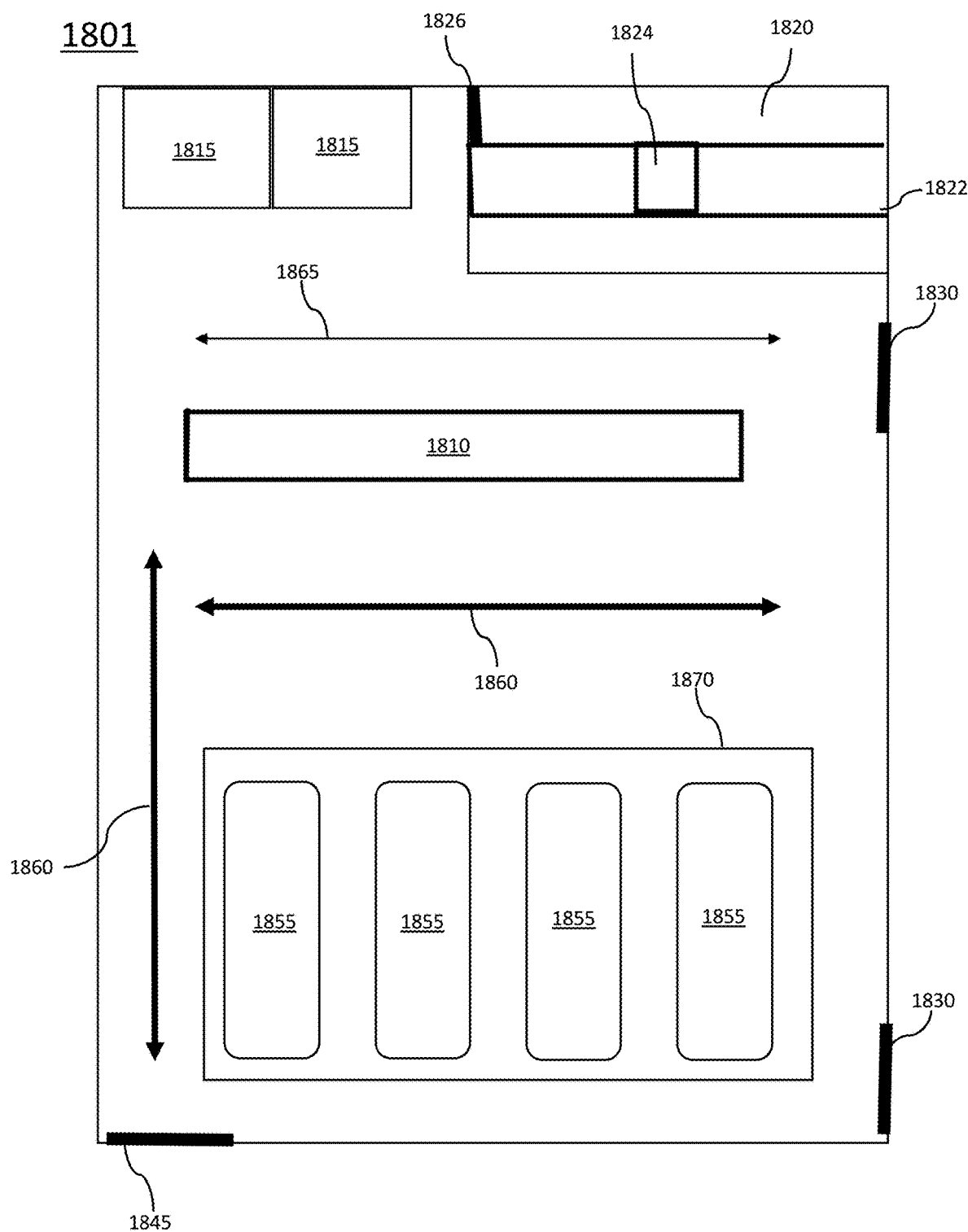
FIG. 18A provides a diagram of an arial view of an exemplary environment in the form of a cafeteria, in accordance with some embodiments of the present invention.

FIG. 18A provides a diagram of an arial view of an exemplary environment 1801 in the form of a cafeteria restaurant for which an environmental protection plan may be developed and/or updated via execution of, for example, process(es) 1100 and/or 1200. Environment 1801 includes a high-touch area 1810 in the form of a buffet and/or food service area, two restrooms 1815, an area 1870 of sustained human interaction with environment 1801 that includes four eating areas (e.g., tables) 1855, two high-volume human traffic pathways 1860, one low-volume human traffic pathway 1865, a plurality of sources of air circulation and/or ventilation 1830 (e.g., heat and/or cooling ducts, fans, windows, etc.), an entrance door 1845, and a kitchen/food preparation area 1820 that includes a food preparation table 1822, a sink with a drain 1824, and a kitchen entrance door 1826. The position, size, and/or measured and/or modeled projected pathogen loads for each of these features and/or portions of environment 1801 may be utilized to generate an environmental protection plan for environment 1801 that achieves a target rate of pathogen neutralization for particular regions within environment 1801, objects within environment 1801, and environment 1801 as a whole. The information used to generate diagram 1801 may be gathered from, for example, blueprints of the environment, measurements taken within the environment, and/or dimensions that may be provided with manufacturing and/or selling information for one or more objects (e.g., high touch area 1810 and/or eating areas 1855) positioned within the environment.

High-volume human traffic pathways 1860 may represent areas within environment 1801 through which a relatively large number (e.g., 20-400) of human beings travel within a given time frame (e.g., 1 hour, 8 hours, etc.) and/or spend relatively little time in (e.g., 1-20 minutes) and low-volume human traffic pathways 1865 may represent areas within environment 1801 through which a relatively small number (e.g., 5-20) of human beings travel within a given time frame (e.g., 1 hour, 8 hours, etc.) and/or spend relatively little time in (e.g., 1-20 minutes). Human beings may remain in area 1870 sustained human interaction with environment 1801 for a sustained period of time (e.g., 10-120 minutes).

In some embodiments, diagram 1801 may include and/or be associated with two- and/or three-dimensional field data matrices of, for example, human traffic flow, air circulation rates, and/or air refresh rates within environment 1801. These matrices may be incorporated into an environmental protection plan and/or may be used to determine, for example, areas within environment 1801 with an elevated need of sanitization (also referred to herein as a "risk zone") and/or areas within environment 1801 to which particular doses of sanitizing radiation may be delivered to achieve, for example, sanitization of environment 1801 and/or risk zone and/or reduce pathogen load within environment 1801 and/or a risk zone within environment 1801.

In some embodiments, information regarding one or more of the plurality of sources of air circulation and/or ventilation 1830 may be received. This information may include, for example, duty cycle information, volumes of air that are exchanged via one or more of the plurality of sources of air circulation and/or ventilation 1830, and/or a temperature of the air introduced into environment 1801 via one or more of the plurality of sources of air circulation and/or ventilation 1830.

At times, multiple types of information and/or matrices may be combined to generate an environmental protection plan for environment 1801 using, for example, process 1100 and/or 1200. For example, a two-dimensional matrix representing human traffic flow through environment 1801 may be combined (e.g., superimposed upon and/or multiplied by) a three-dimensional matrix representing air flow within environment 1801 to identify risk zones and/or model pathogen load within environment 1801.

Additionally, or alternatively, information about staff members who may work in and/or spend sustained time within environment 1801 may also be received when designing an environmental protection plan for environment 1801. For example, information regarding how many staff members are working in kitchen 1820 and/or how closely they are positioned to one another may be used to model pathogen load within kitchen 1820 and/or determine one or more parameters of an environmental protection plan.

Additionally, or alternatively, information about usage parameters for an area of environment 1801 may be used to model pathogen load and/or generate an environmental protection plan for environment 1801 and/or a portion thereof. For example, if kitchen staff work with raw meat, chicken, or fish on, for example, table 1822, then table 1822 would be defined as a high-risk zone for not only air-borne pathogens but also pathogens that are transmissible via surface contamination. In addition, the types of pathogens that may be present within environment 1801 and/or kitchen 1820 especially upon, or near, table 1822 and/or sink 1824 may be incorporated into the environmental protection plan for environment 1801 and/or kitchen 1820. For example, if pathogens present within kitchen 1820 have a high disease load (e.g., severe disease or even death) an intensity and/or fluence of sanitizing radiation and/or duration of time during which kitchen 1820 (or a region thereof) is exposed to sanitizing radiation may be increased.

Figure 18B:
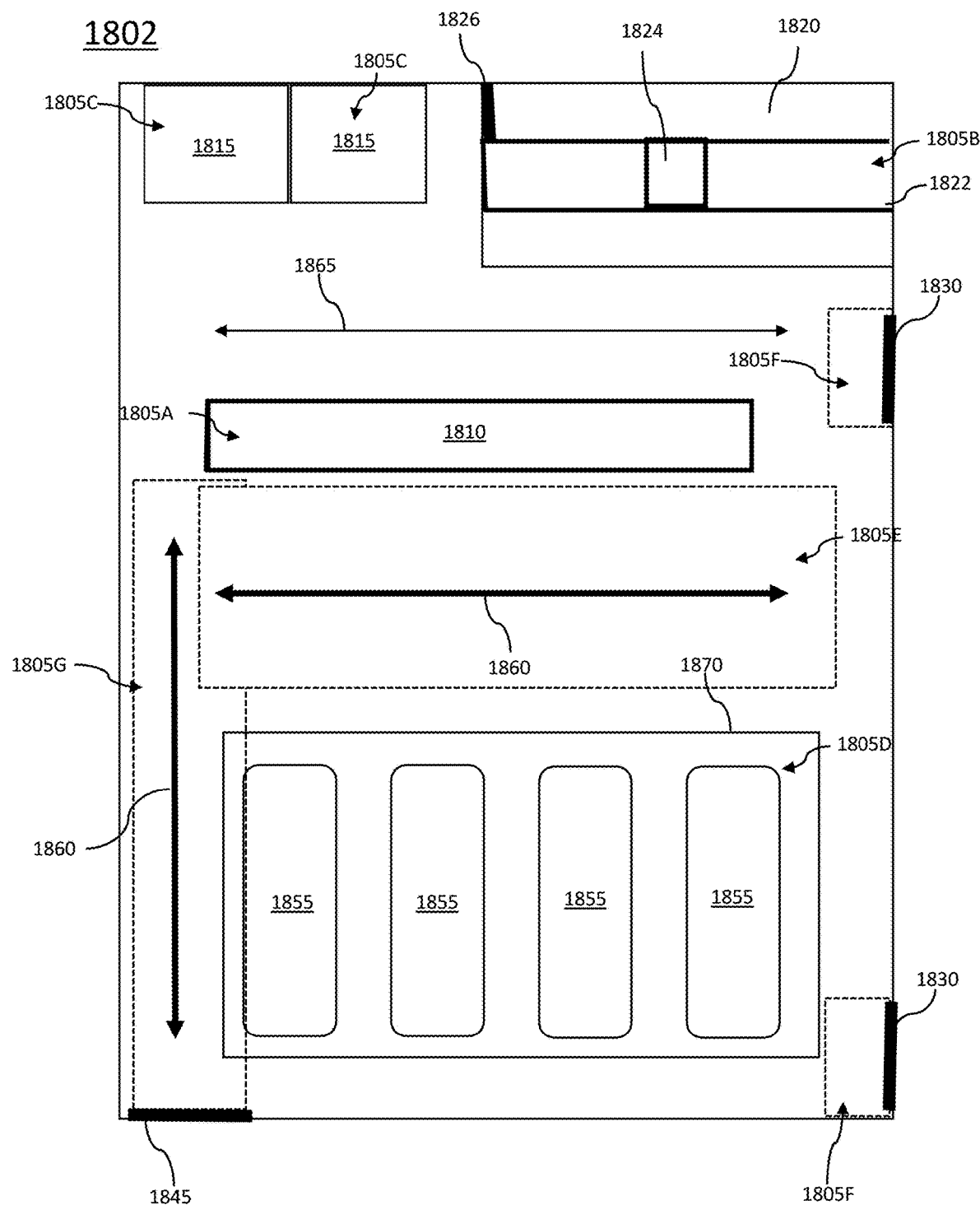
FIG. 18B provides a diagram of an arial view of the environment of FIG. 18A divided into a plurality of risk zones, in accordance with some embodiments of the present invention.

FIG. 18B provides a diagram 1802 of an arial view of environment 1801 divided into a plurality (in this case, seven) of risk zones according to one or more processes disclosed herein such as process 1400 and/or process 1100. A risk zone may be an area within an environment that has particular sanitization needs that may be defined and/or understood using one or more criterion (e.g., what the zone is used for, potential pathogens that may be present within the zone, a disease load (i.e., how sick a person may become following infection with the pathogen) associated with pathogens that may be present within the zone, a count of people traveling through the zone, and/or a duration of time people are likely to stay within the zone) that according to, for example, one or more processes described herein. A length of time within a risk zone may indicate, for example, a probability of disease transmission and/or infection.

For example, first risk zone 1805A is associated with high-touch area 1810 and the environmental protection plan for environment 1801 may incorporate one or more factors, parameters, and/or criterion associated with high-touch area 1810 such as how long individual people are likely to be present within first risk zone 1805A, one or more types of pathogens a person may encounter while within and/or touching something within first risk zone 1805, and/or how likely a person will touch an object (e.g., spoon or spatula) that may be contaminated with a pathogen.

Second risk zone 1805B is associated with both kitchen 1820 and, in particular table 1822 and sink 1824 within kitchen 1820 and the environmental protection plan for environment 1801 may incorporate one or more factors, parameters, and/or criterion associated with the kitchen such as how long individual people are likely to be present within second risk zone 1805B, one or more types of pathogens a person may encounter while within and/or touching something within second risk zone 18056, a probability that a pathogen present within kitchen 1820 come into contact with a person, and/or a probability that a person will touch an object (e.g., knife, plate of food, etc.) that may be contaminated with a pathogen.

Third risk zone 1805C is associated with both restrooms 1815 and the environmental protection plan for environment 1801 may incorporate one or more factors, parameters, and/or criterion associated with bathrooms such as how long individual people are likely to be present within third risk zone 1805, ventilation within the kitchen, temperature and/or humidity within the kitchen, one or more types of pathogens a person may encounter while within and/or touching an object (e.g., sink or door handle) that may be contaminated with a pathogen while within third risk zone 1805C.

Fourth risk zone 1805D is associated with area 1870 of sustained human interaction with environment 1801 that includes four eating areas (e.g., tables) 1855 and the environmental protection plan for environment 1801 may incorporate one or more factors, parameters, and/or criterion associated with a seating area like area 1870 such as how long individual people are likely to be present within fourth risk zone 1805D, and/or one or more types of pathogens a person may encounter while within and/or touching an object (e.g., table top, chair, fork, etc.) that may be contaminated with a pathogen while within fourth risk zone 1805D.

Fifth risk zone 1805E and seventh risk zone 1805G are associated with both high-volume human traffic pathways 1860 and the environmental protection plan for environment 1801 may incorporate one or more factors, parameters, and/or criterion associated with a high-volume human traffic pathway like high-volume human traffic pathways 1860 such as how long individual people are likely to be present within fifth risk zone 1805E and/or seventh risk zone 1805G an and/or a likelihood of disease transmission and/or contamination while a person is traversing one, or both high-volume human traffic pathways 1860.

A sixth risk zone 1805F is associated with each of the plurality of sources of air circulation and/or ventilation 1830 and the environmental protection plan for environment 1801 may incorporate one or more factors, parameters, and/or criterion associated with air flowing through each of the plurality of sources of air circulation and/or ventilation 1830 such as a volume of air flowing through each source of air circulation and/or ventilation 1830 and/or a likelihood of contamination of air circulated source air circulation and/or ventilation 1830 with an air-borne pathogen.

Figure 18C:
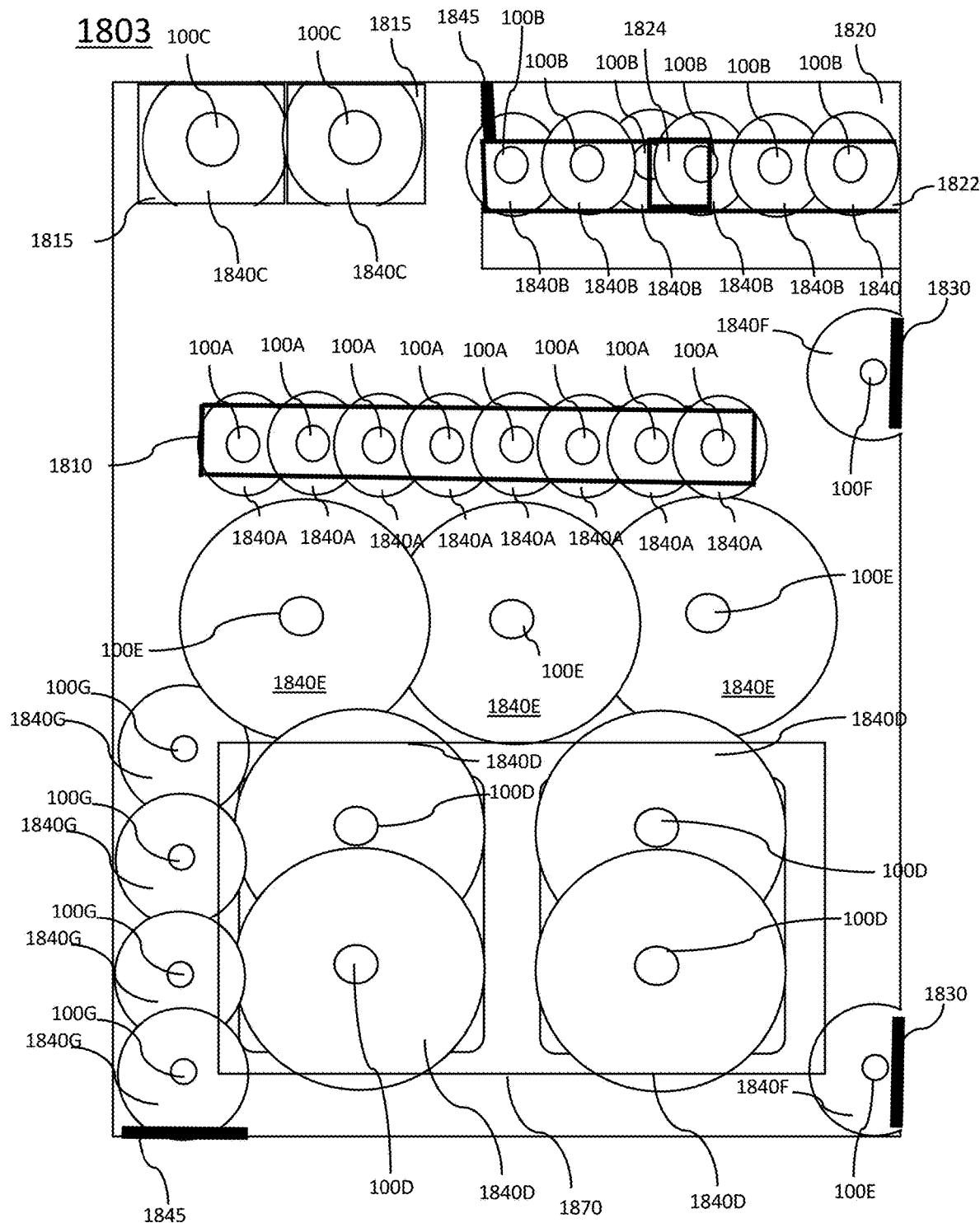
FIG. 18C provides a diagram of an arial view of the environment of FIG. 18A with sanitizing devices positioned therein in accordance with an environmental protection plan for the environment, in accordance with an environmental protection plan for cafeteria, according to some embodiments of the present invention.

FIG. 18C provides a diagram of an arial view of environment 1801 with sanitizing devices positioned therein in accordance with an environmental protection plan for environment 1801 that has been generated via execution of one or more processes described herein. Placement of sanitizing devices 100 within environment 1801 has been set according to one or more parameters and/or criterion for a risk zone in which the sanitizing device 100 has been placed. As shown in FIG. 18C, each sanitizing device 100 is represented by a circle and has a fluence area 1840 that is represented by a larger circle with the circle representing sanitizing device 100 positioned in an approximate center of the fluence area 1840.

As shown in FIG. 18C, a plurality of first sanitizing devices 100A are arranged within first risk zone 1805A in a tight configuration so that a corresponding first fluence area 1840A is continuous and overlapping across high-touch area 1810. In addition, a size of first fluence area 1840A is relatively small so that the amount of sanitizing radiation delivered to high-touch area 1810 is concentrated to this area.

A plurality of second sanitizing devices 100B are arranged within second risk zone 1805b in a tight configuration so that a corresponding second fluence area 18406 is continuous and overlapping across table 1822 and the area above sink 1824 has particularly concentrated/overlapping second fluence areas 1840B because, for example, a likelihood that a pathogen may grow and/or be put into sink 1824 is high when compared with the rest of kitchen 1820 and/or environment 1801. A duty cycle for the plurality of second sanitizing devices 100B may be relatively constantly one when kitchen 1822 is in use due to a relatively high probability of pathogens being present in the kitchen. In addition, a size of second fluence areas 18406 relatively small so that the amount of sanitizing radiation delivered to table 1822 is concentrated to this area, which may limit human exposure to such high fluence rates of sanitizing radiation.

Each restroom 1815 of third risk zone 1805C has a third sanitizing device 100C positioned therein. Third sanitizing devices 100C may be configured to have sanitizing radiation fluence and/or duty cycles that are configured to deliver nearly continuous sanitizing radiation 1840C to their respective restroom 1815 so that, for example, the surface and/or aerosolized pathogens that may be present within restroom (s) 1815 may be reduced by a target reduction rate and/or according to the one or more the factors, parameters, and/or criterion associated with third risk zone 1805C.

Fourth risk zone 1805D has four fourth sanitizing devices 100D positioned within it; two fourth sanitizing devices 100D positioned between the first and second tables 1855 and two fourth sanitizing devices 100D positioned between the third and fourth tables 1855. Each fourth fluence area 1840D, representing sanitizing radiation emitted by a fourth sanitizing device 100D, is relatively broad, which may indicate a reduced magnitude of fluence emitted by fourth sanitizing devices 100D relative to, for example, first fluence area 1840A and/or second fluence area 1840B. This relative reduction in the magnitude of fluence delivered within fourth fluence area 1840D may be responsive to an assumption that a higher magnitude of sanitizing radiation fluence may not be necessary to reduce pathogen loads within fourth risk zone 1805D because the humans positioned in this area are not likely to be exposed to a large number of high disease-load pathogens (e.g., *salmonella, listeria*, etc.) as may be present in, for example, kitchen 1820 when the humans therein are preparing raw meat or chicken and/or a restroom 1815, where humans may be exposed to excretory pathogens. Duty cycles for fourth sanitizing devices 100D may be set using, for example, the times of day when humans are likely to congregate in fourth risk zone 1805D.

Fifth risk zone 1805E includes three fifth sanitizing devices 100E set to provide a relative broad fifth fluence area 1840E so that the area is broadly covered with sanitizing radiation to reduce pathogen load within the area and thereby limit, in particular, a number of air-borne pathogens circulating in the air within environment 1801.

Each sixth risk zone 1805F includes a sixth sanitizing device 100F that is configured to deliver a sixth fluence area 1840F configured to kill air-borne pathogens that may be present within air that is circulated each of the plurality of sources of air circulation and/or ventilation 1830.

Seventh risk zone 1805G includes four seventh sanitizing devices 100G set to provide a relative narrow seventh fluence area 1840G to accommodate the relative narrowness of the associated high-volume human traffic pathway 1860 within seventh risk zone 1805G so that the area of seventh risk zone 1805G is covered with sanitizing radiation to reduce pathogen load within the area and thereby limit, in particular, a number of air-borne pathogens circulating in the air within environment 1801.

Figure 19A:
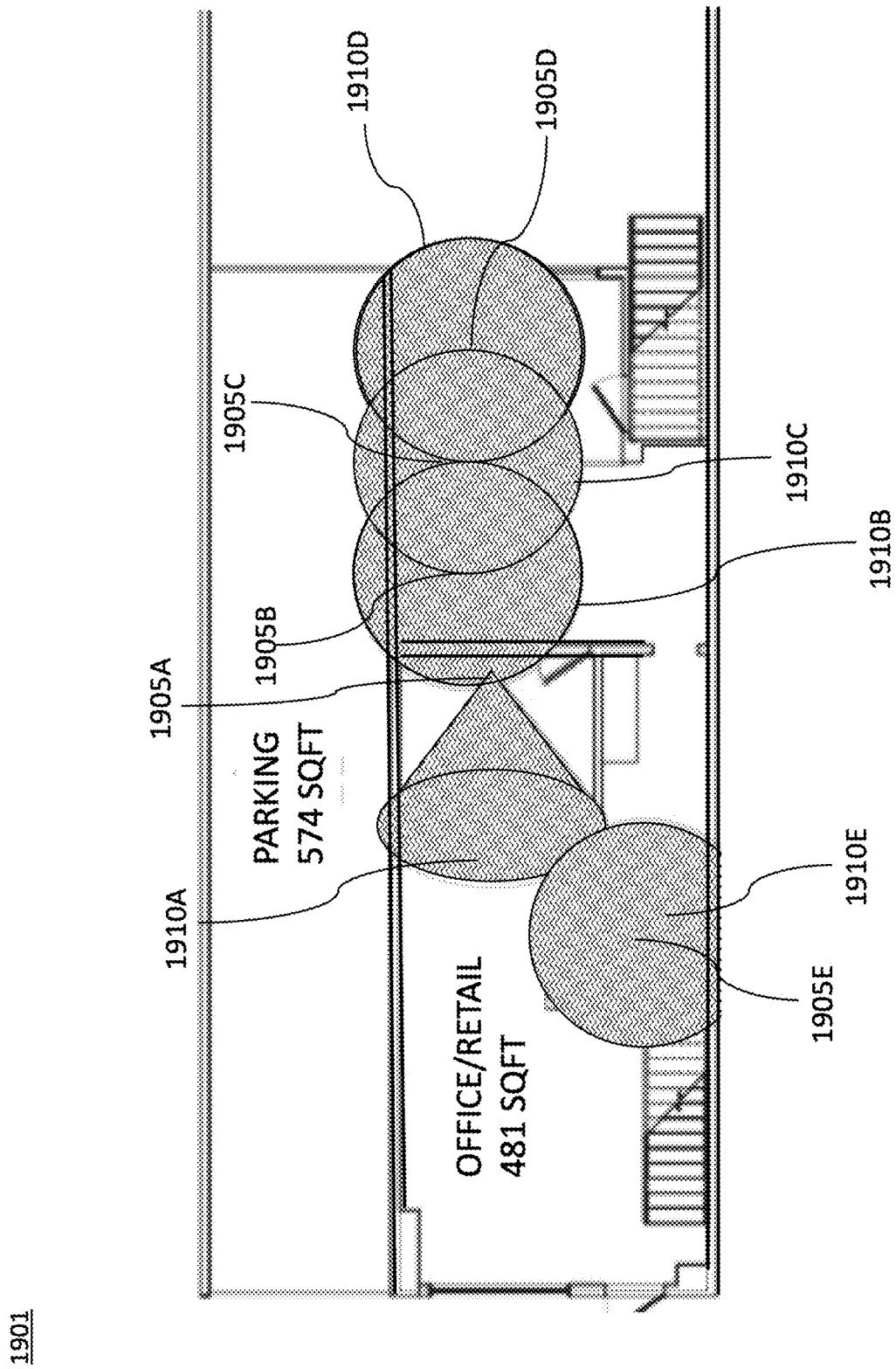
FIGS. 19A and 19B provide top-view diagrams of exemplary environment protection plan plans that include positions and dimensions for projected half-power cones that represent and/or indicate a distribution of sanitizing radiation emitted by sanitizing devices, in accordance with some embodiments of the present invention.
Figure 19B:
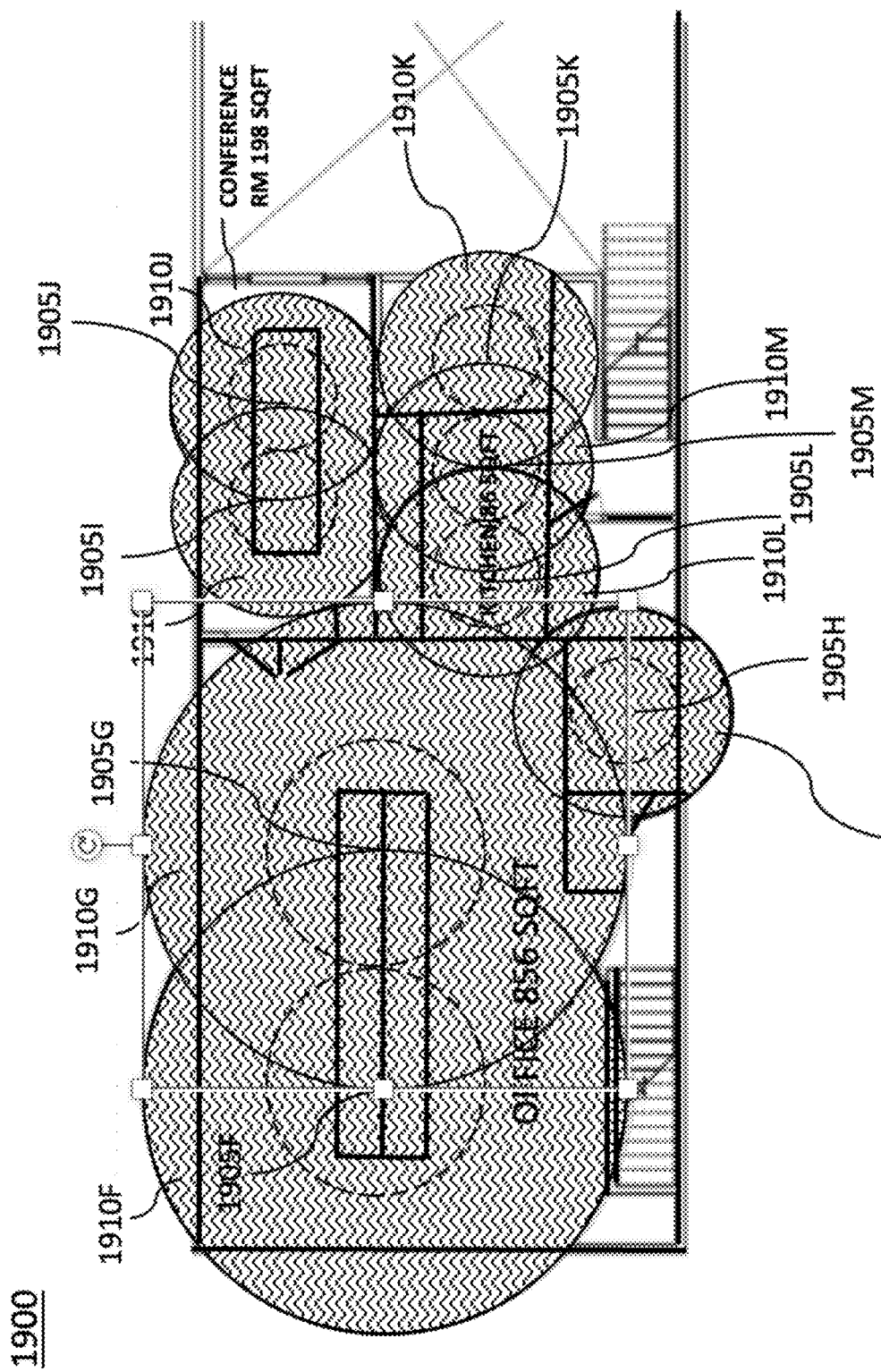

FIGS. 19A and 19B provide top-view diagrams of exemplary layouts generated by environment protection plan plans that include positions and dimensions for projected half-power cones that represent and/or indicate a distribution of sanitizing radiation 1910 emitted by sanitizing devices 2015 (e.g., any of the sanitizing devices described herein) for a first environment 1901 and a second environment 1902. In first environment 1901, five projected cones of sanitizing radiation 1910A, 1910B, 1910C, 1910D, and 1910E as emitted by five sanitizing devices 1905A, 1905B, 1905C, 1905D, and 1905E are shown along with areas where the projected cones 1910 of sanitizing device overlap, at an optimal spacing computed from target distance and target pathogen reduction rate. The diagram of FIG. 19A also shows how a first sanitizing device 1905A is oriented in an approximate parallel direction to the ceiling/floor so that first projected cone of sanitizing radiation 1910A is projected outward from sanitizing device 2005A at an angle of 180 degrees, or another desired angle, to the ceiling/floor of environment 1901. The remaining sanitizing devices 1905B, 1905C, 1905D, and 1905E are arranged on a ceiling of environment 1901 and emit sanitizing radiation in a direction that is approximately perpendicular, or at an approximate right angle to, the ceiling/floor of environment 1901.

FIG. 19B shows how sanitizing devices of different sizes/intensities/spatial distribution may be used within an environment such as environment 1902 to provide sanitizing radiation therein with sixth and seventh sanitizing device 1905F and 1905G having broader spatial distribution and larger projected cones of sanitizing radiation 1910F and 1910G and eighth, ninth, tenth, eleventh, twelfth, and thirteenth sanitizing devices 1905H, 1905I, 1905J, 1905K, 1905L, and 1905M emit relatively smaller projected cones of sanitizing radiation 1910H, 1910I, 1910J, 1910K, 1910L, and 1910M, respectively.

In some embodiments, machine learning and/or modeling may be used to generate and/or update an environmental protection plan and/or select an environmental protection plan for use in an environment from a plurality of environmental protection plans generated and/or modeled for the environment. For example, a level of effectiveness (e.g., a magnitude of fluence and/or a dose or time period needed to achieve a target pathogen reduction rate) in the environment may be modeled for a variety of scenarios and/or environmental protection plans, and one or more environmental protection plans may be selected and/or tuned to match one or more environmental protection plan criteria. For example, an environment may be an entryway to an office building with a plurality of entrances/exit, an information desk, and a plurality of elevators. User data may be received indicating that human traffic through the entryway environment has peaks between 8-10 am, 11-2 pm, and 5-7 pm and that from 9 pm-7 am, the entryway doors to the environment are locked. Additionally, or alternatively, air flow rates and/or rates of recirculation of air may be measured and/or received from a user and/or an HVAC service provider for the user. User specifications may be received indicating that they wish to have an environmental protection plan that eliminates 90% of all air airborne pathogens at standing height within the environment within 3 minutes and that the "pathogens" to be killed are a standard set of pathogens known to be contagious via air-borne transmission (e.g., SARS CoV2, influenza, etc.) and may also be one or more governmentally-reported and/or locally-reported (e.g., by an employer with employees who use the office building) pathogens not within the standard set of pathogens that are known to be circulating within in a geographic area (e.g., city, county, and/or state) in which the environment is located. Pathogen load for the environment may then be modeled based on, for example, air flow rates and/or patterns within the environment, the human traffic data and other use data, risks of infection (e.g., pathogen count and time exposed to the pathogen), a probability of transmission of pathogens into the environment from infected humans, which may be determined from, for example, employer and/or governmentally-reported infections with various pathogens, and an average length of time humans remain in the environment. One or more environmental protection plans may then be generated outlining various scenarios for the placement of sanitizing devices, the type of sanitizing device (e.g., level of intensity of far UVC light the sanitizing device may emit, diffusion angles provided by the sanitizing device, etc.), duty cycles for the sanitizing devices, and/or scheduling for the sanitizing devices. Optionally, when a plurality of environmental protection plans are generated, each of the environmental protection plans may be evaluated according to one or more user, supplier, and/or operator criteria (e.g., projected rates of pathogen reduction, energy consumption, whether the user is installing new sanitizing devices and/or has sanitizing devices already in place, projected lifespan of sanitizing devices or components (e.g., far UVC light source), time needed to achieve a desired level of pathogen reduction, and/or schedule of operation of the sanitizing devices. Then, an environmental protection plan may be selected from the plurality of environmental protection plans and/or a plurality of the environmental protection plans may be combined to achieve one or more sanitization objectives within the environment.

Figure 20A:
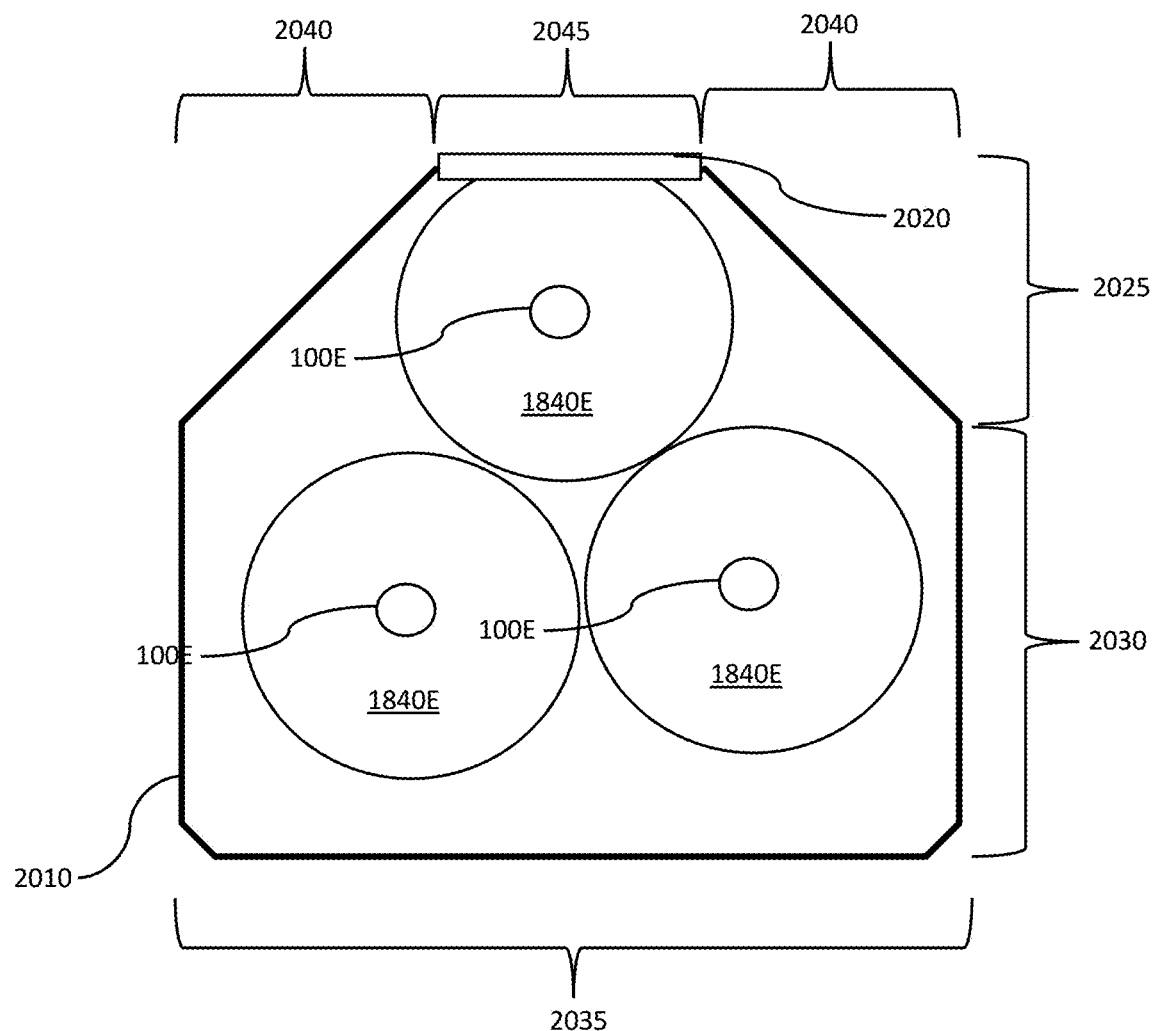
FIG. 20A provides a diagram of an arial view of an exemplary irregularly shaped environment in the form of an elevator with a first plurality of sanitizing devices placed therein, in accordance with some embodiments of the present invention.

FIG. 20A provides a diagram of an arial view 2001 of an exemplary irregularly shaped environment in the form of an elevator 2010 with a first array (i.e., three) of sanitizing devices 100 placed therein in accordance with an environment protection plan as disclosed herein. In particular, three of fifth sanitizing devices 100E, which are set to provide a relatively broad fifth fluence area 1840E are positioned in a triangular formation within elevator 2010. Elevator 2010 has generally trapezoidal shape with a combined width 2035, which is divided into a first segment 2040A, a second segment 2045, and a third segment 2040C and a total length, which is divided into a first segment 2025 and a second segment 2030. This first array of fifth sanitizing devices 100E may be configured to provide sanitizing radiation throughout the elevator during average (e.g., daily average and/or hourly average) transit times for the elevator and/or for average numbers of people that may be in the elevator during the day. For example, first array may be configured to provide a dose of 7-14 microWatts/cm$^2$/second of sanitizing radiation to the space within elevator 2010, which may achieve an average pathogen reduction of 0.3-0.8 for Covid virus pathogen within 30-90 seconds within elevator 2010.

Figure 20B:
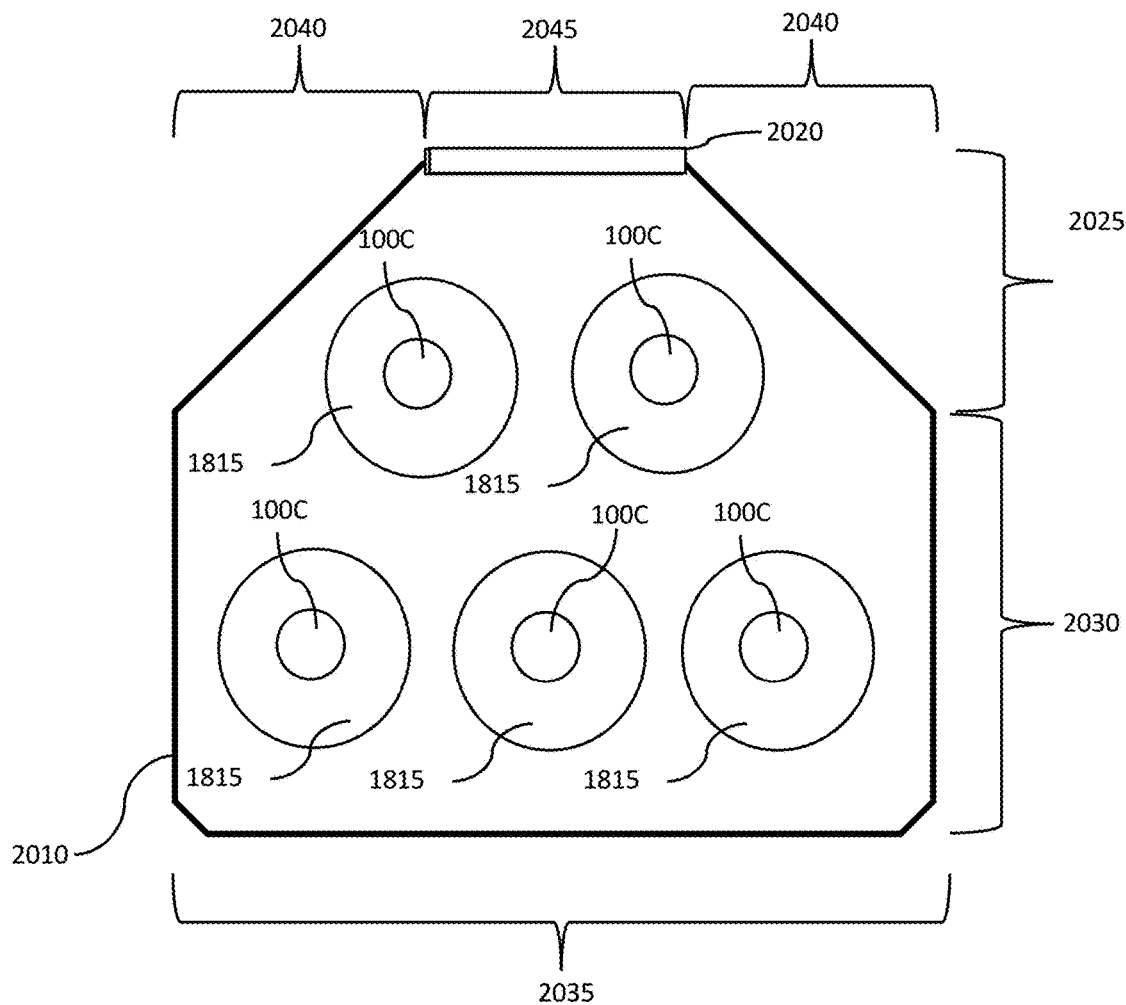
FIG. 20B provides a diagram of an arial view of the elevator of FIG. 20A with a second plurality of sanitizing devices placed therein, in accordance with some embodiments of the present invention.

FIG. 20B provides a diagram of an arial view 2001 of the elevator of FIG. 20A with a second array of sanitizing devices 100 placed therein in accordance with an environment protection plan as disclosed herein. In particular, five of third sanitizing devices 100C, which are set to provide a relatively narrow third fluence area 1840C are positioned in a first row of two third sanitizing devices 100C and second row that includes three of third sanitizing devices 100C. This arrangement provides for more sanitizing devices emitting a more concentrated beam of sanitizing radiation within elevator 2010. For example, second array may be configured to provide a dose of 11-23 microWatts/cm$^2$/second of sanitizing radiation to the space within elevator 2010, which may achieve an average pathogen reduction of 0.5-0.95 for Covid virus pathogen within 30-90 seconds within elevator 2010.

We claim:

1. An environmental protection system, comprising:
   a set (405) of sanitizing devices (100A-100N) communicatively connected to a communication network (430), wherein each sanitizing device is operable to emit sanitizing radiation;
   an information source (415) communicatively coupled to the communication network;
   a plurality of sensors (315) communicatively coupled to the communication network, wherein the sensors are configurable to monitor one or more aspects of an environment in which the sanitizing devices are placed;
   a server (440) communicatively coupled to the communication network, wherein the server is configurable to monitor and/or control operations of the sanitizing devices, said operations determining when the sanitizing devices are on or off, determining what, if any, data sanitizing devices are receiving from one or more sensors, and/or monitoring the sanitizing devices for one or more error conditions; and
   a means for generating an environmental protection plan for the environment;
   proxy means associated with a sanitizing device for emitting and detecting a proxy radiation beam indicative of a coverage area of the associated sanitizing device, the proxy means comprising a non-UV light source (150) configured to emit a narrow beam of visible or non-visible light radiation in a diffraction pattern that resembles a pattern of sanitizing radiation emitted by one or more sanitizing devices
   wherein a first sanitizing device (100) includes a first sensor (140) configured to provide information to cause the system to perform an operation of the first sanitizing device, said operation including one or more of: turning first sanitizing device on or off, increasing sanitizing radiation output of the first sanitizing device, decreasing sanitizing radiation output of the first sanitizing device, and/or setting a time duration for the operation of the first sanitizing device; and
   wherein data generated by the system is usable to develop a pathogen load model.

2. The system of claim 1, wherein the first sensor (140) functions as at least one of: a color sensor, a motion sensor, a people and/or head counter, a thermometer, a heat sensor, a sensor to detect pathogens or contaminants, a carbon dioxide sensor, a video camera, a thermal camera, a microphone, a sound/noise sensor, an infrared sensor, a radio frequency sensor, a reflective sensor, an ultrasound sensor, a light monitoring sensor configured to monitor an intensity and/or wavelength of light emitted by first sanitizing device (100), and/or a proximity sensor.

3. The system of claim 2, wherein the first sensor (140) is configured to operate as a color UV exposure strip that detects a color or wavelength of sanitizing radiation emitted by one or more of the sanitizing devices of the set of sanitizing devices incident thereon, the system being further configured to determine an amount of sanitizing radiation incident at least one of the first sensor and a surface within the environment.

4. The system of claim 2, wherein the first sensor (140), operating as a color sensor, detects reflected wavelengths received from the environment and infers a feature of incident sanitizing radiation.

5. The system of claim 1, wherein the first sanitizing device (100) is mounted at a preferred distance from at least one of a surface and an object positioned within the environment such that a preferred amount of sanitizing radiation is incident on the at least one surface and object; and wherein the preferred distance is determined based on a concentration, or intensity, of sanitizing radiation that has to reach the at least one surface and object to sanitize it and/or reach a desired level of pathogen neutralization for the at least one surface and object within a desired timeframe.

6. The system of claim 1, wherein the system is configured to generate data that is usable to develop at least one of a pathogen load prediction and a pathogen load mitigation strategy.

7. The system of claim 1, wherein the means for generating an environmental protection plan are further configured to determine at least one of a distance to and an angle between a sanitizing device of the set of sanitizing devices within the environment and various positions within the environment that correspond to at least one of a height of a person, a height of a surface, and/or a distance between the sanitizing device of the set of sanitizing devices and a floor of the environment.

8. The system of claim 1, wherein the plurality of sensors includes one or more particulate matter sensors configured detect a number of particulates in ambient air of the environment and provide information about the number of detected particulates in ambient air of the environment to the means for generating an environmental protection plan.

* * * * *